United States Patent
Anderson et al.

(10) Patent No.: US 6,533,577 B2
(45) Date of Patent: Mar. 18, 2003

(54) COMPARTMENTALIZED OVEN

(75) Inventors: Bradley C. Anderson, Plymouth, MN (US); Stephen P. Carlson, Minneapolis, MN (US); Travis R. Chezick, Minneapolis, MN (US); John T. Leone, Minneapolis, MN (US); Jean Pierre Menard, Hastings, MN (US); Bruce J. Pierson, St. Louis Park, MN (US); James A. Rieck, Brooklyn Park, MN (US)

(73) Assignee: CVD Equipment Corporation, Ronkonkoma, NY (US)

( * ) Notice: Subject to any disclaimer, the term of this patent is extended or adjusted under 35 U.S.C. 154(b) by 0 days.

(21) Appl. No.: 10/062,355

(22) Filed: Feb. 1, 2002

(65) Prior Publication Data

US 2002/0146657 A1 Oct. 10, 2002

Related U.S. Application Data

(60) Provisional application No. 60/265,992, filed on Feb. 2, 2001.

(51) Int. Cl.[7] .................................................. F27B 9/06
(52) U.S. Cl. ........................ 432/128; 432/133; 228/200
(58) Field of Search ......................... 432/77, 173, 128, 432/133, 206, 207; 228/200, 199, 230; 219/388, 390

(56) References Cited

U.S. PATENT DOCUMENTS

| | | | |
|---|---|---|---|
| 3,879,164 A | 4/1975 | Haldopoulos et al. | 432/10 |
| 3,982,887 A | 9/1976 | Kendziora et al. | 432/128 |
| 4,160,893 A | 7/1979 | Meyen et al. | 219/85 |
| 4,395,233 A | 7/1983 | Smith et al. | 432/176 |
| 4,586,898 A | 5/1986 | Orbeck | 432/122 |
| 4,698,774 A | 10/1987 | Abe et al. | 364/477 |
| 4,756,091 A | 7/1988 | Van Denend | 34/4 |
| 4,780,040 A | 10/1988 | Petersen | 414/157 |
| 4,876,437 A | 10/1989 | Kondo | 219/388 |
| 4,909,430 A | 3/1990 | Yokota | 228/102 |
| 4,927,068 A | 5/1990 | Naka et al. | 228/103 |
| 4,938,410 A | 7/1990 | Kondo | 228/180 |

(List continued on next page.)

OTHER PUBLICATIONS

Holger, M. Heat and Mass Transfer between Impinging Gas Jets and Solid Surfaces. *Institut für Thermische Verfahrenstechnik der Universität Karlsruhe (TH), D 75 Karlsruhe, Kaiserstrasse 12, Germany.*

*Primary Examiner*—Gregory Wilson
(74) *Attorney, Agent, or Firm*—Kinney & Lange, P.A.

(57) ABSTRACT

An oven compartment in an oven for subjecting items to a selected heating sequence having a compartment container with a transport opening therein to permit selectively entering such items adjacent to first plenum structure at a perforated surface to allow providing heating fluid thereon. The first plenum structure has a material mass and a specific heat such that a rate of change of temperature of that structure exceeds one degree Centigrade per second for a selected maximum temperature differential between heating fluid and any entered items positioned adjacent to the perforated surface at selected heating fluid pressures at that perforated surface. A method for heating such items with a heating fluid previously heated by a heater, to an extent determined by operating a heater control, directed onto such items is based on obtaining a control representation of a selected set of values for the heater control versus time based on a heating specification for a selected kind of item to be heated. Heating fluid is directed onto such an item with this heating fluid having been previously heated by the heater through operating the heater control to follow the control representation but as adjusted based on measurements of heating fluid near the perforated surface.

18 Claims, 58 Drawing Sheets

U.S. PATENT DOCUMENTS

| | | |
|---|---|---|
| 5,031,818 A | 7/1991 | Gieskes .................... 228/42 |
| 5,066,850 A | 11/1991 | Kondo .................... 219/388 |
| 5,069,380 A | 12/1991 | Deambrosio .............. 228/42 |
| 5,128,506 A | 7/1992 | Dahne et al. .............. 219/85 |
| 5,141,147 A | 8/1992 | Yokota .................... 228/219 |
| 5,192,582 A | 3/1993 | Liedke et al. ............. 228/206 |
| 5,261,166 A | 11/1993 | Seeley et al. ................ 34/1 |
| 5,263,265 A | 11/1993 | Melgaard .................. 34/17 |
| 5,433,368 A | 7/1995 | Spigarelli .................... 228/8 |
| 5,440,101 A | 8/1995 | Cox et al. ................ 219/388 |
| 5,492,265 A | 2/1996 | Wandke .................... 228/205 |
| 5,515,605 A | 5/1996 | Hartmann et al. .......... 29/840 |
| 5,562,243 A | 10/1996 | Marcantonio ................ 228/8 |
| 5,573,174 A | 11/1996 | Pekol .................... 228/219 |
| 6,015,966 A * | 1/2000 | Rehm .................... 432/128 |
| 6,423,945 B1 * | 7/2002 | Yokota .................... 219/388 |

\* cited by examiner $D_{Dopt} = 1.84H$ $L_{Qopt} = 1.324H$ $L_{Dopt} = 1.423H$ $P_2$ is lower than $P_1$ because of loses to friction in the air duct.

$V_2$ is lower than $V_1$ because of airflow out of the duct. If friction is ignored, $P_2$ is higher than $P_1$ because of the loss in velocity in accordance with Bernoulli's theorem.

CONTOURS OF GOOSENECK MANIFOLD FOR CIRCULAR CROSS SECTION (Calculated for f = 0.00052 and fg = 0.01674.)

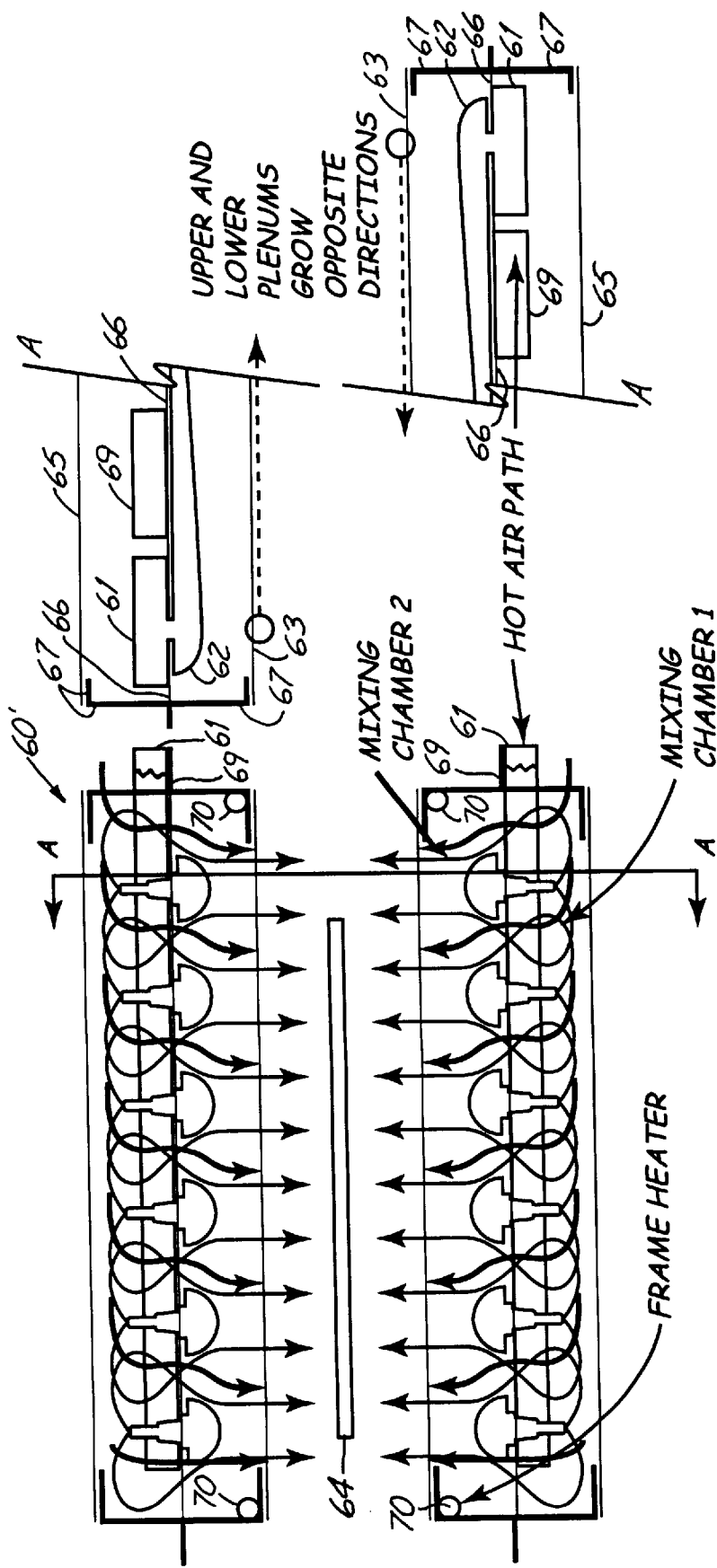

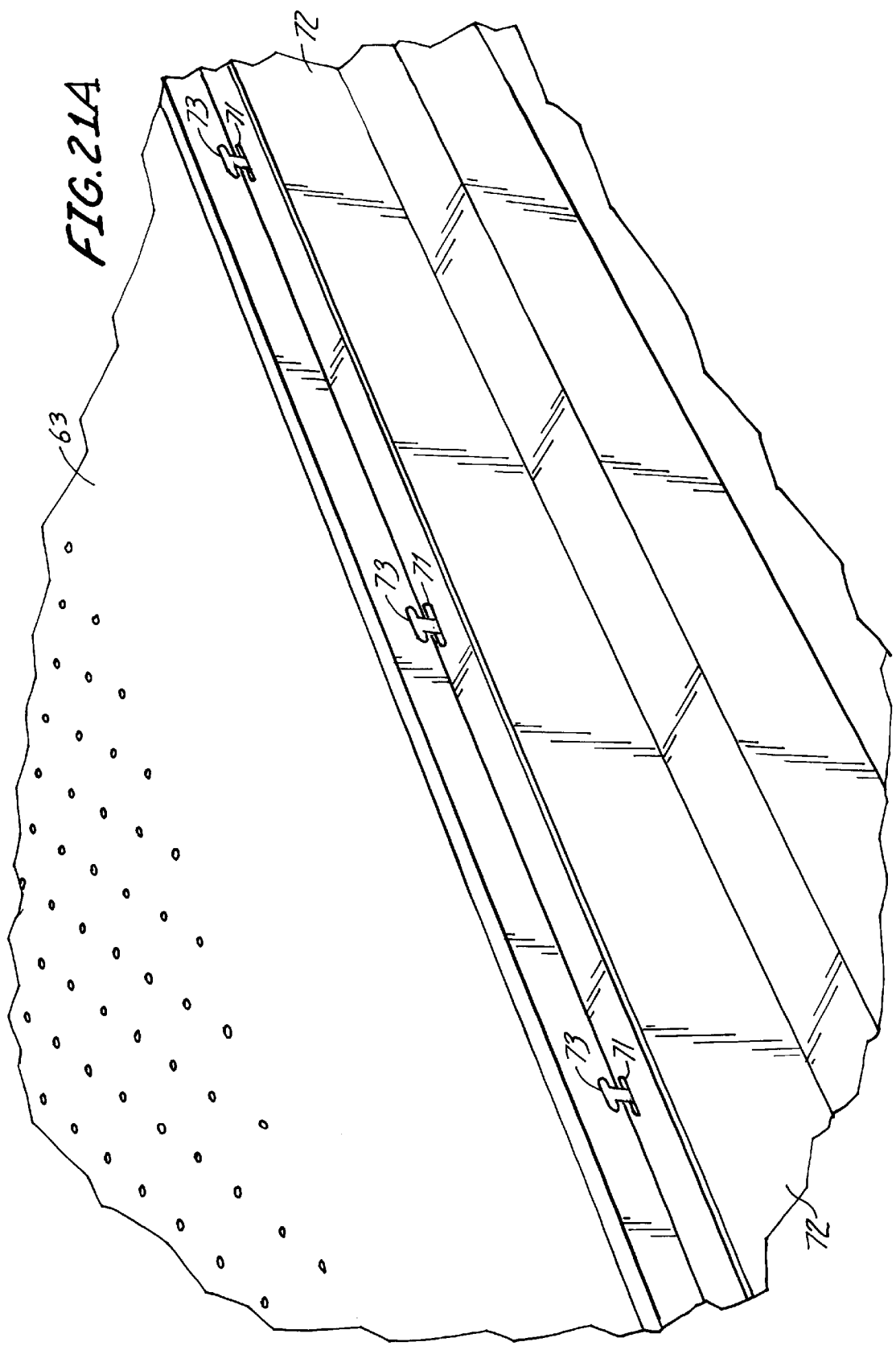

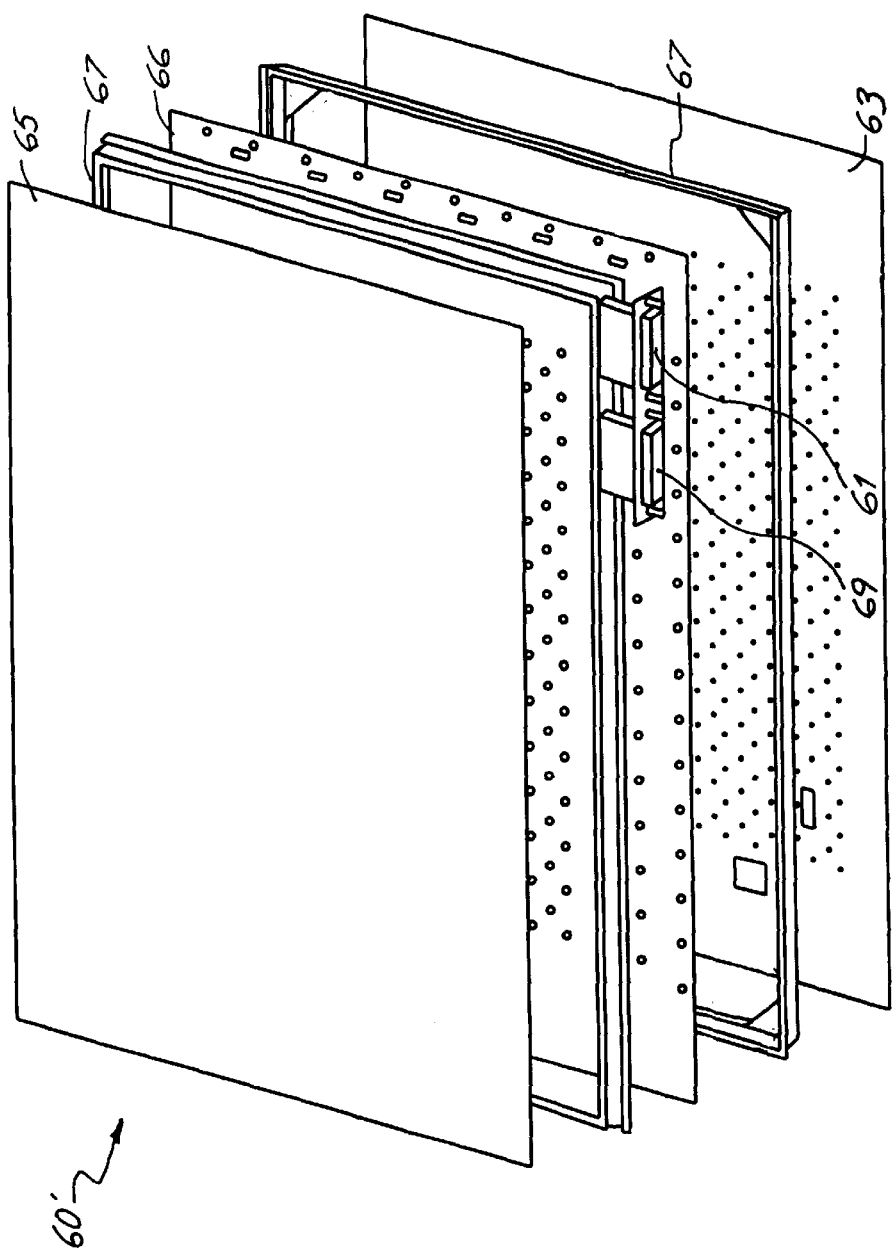

Parallel Flow
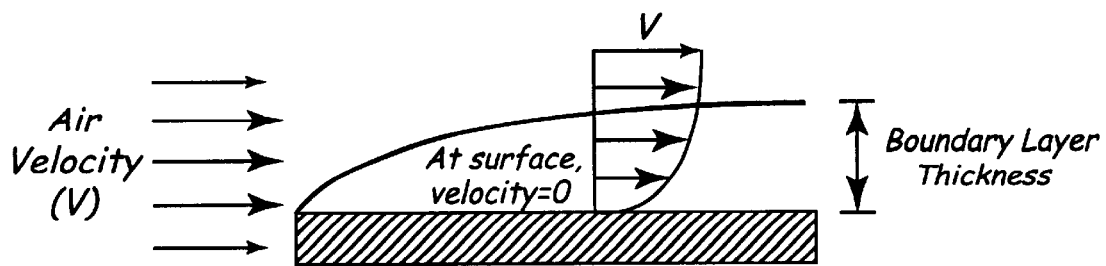
Perpendicular Flow
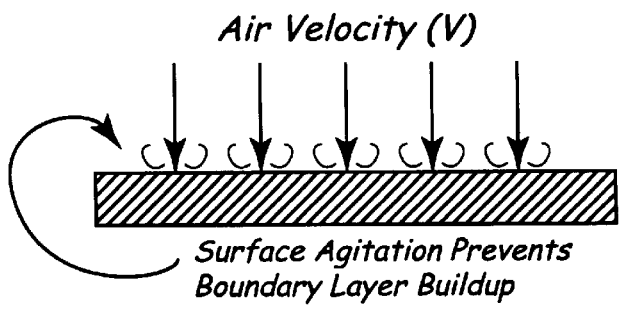
FIG. 25

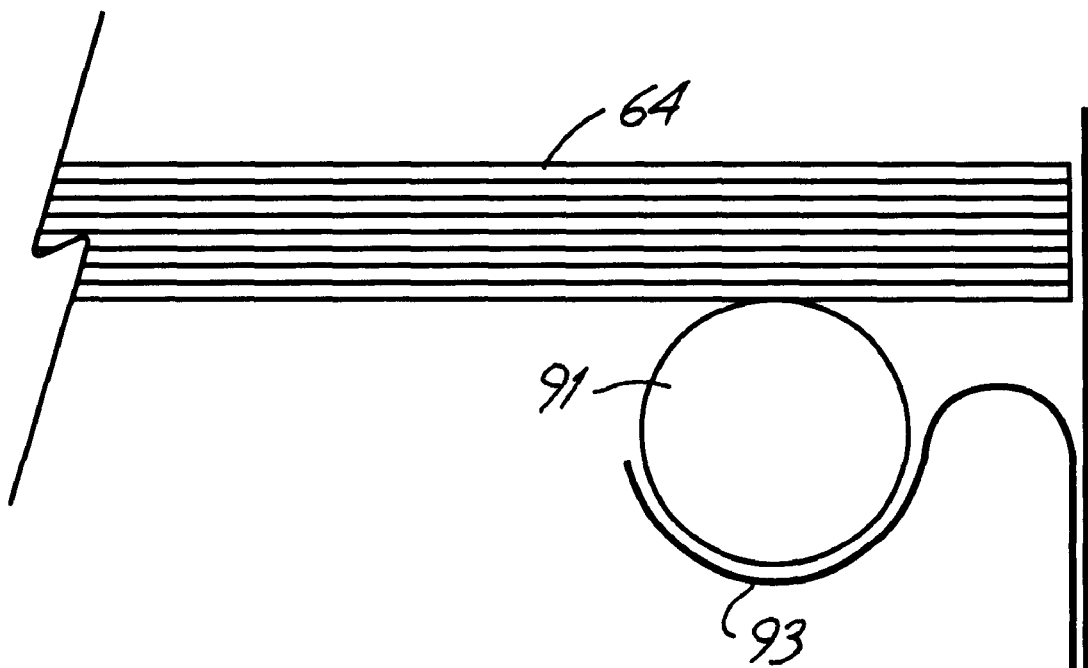
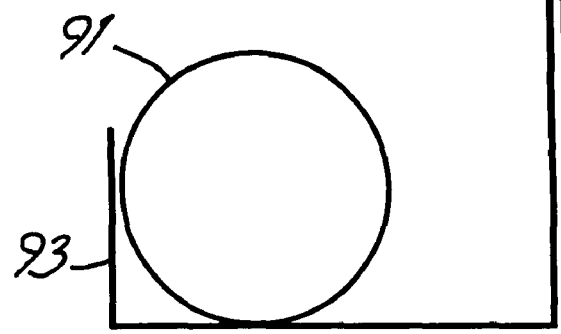
FIG. 33

COMPARTMENTALIZED OVEN

CROSS-REFERENCE TO RELATED APPLICATIONS

This application claims priority from Provisional Application No. 60/265,992, filed Feb. 2, 2001, entitled "Compartmentalized Oven".

BACKGROUND OF THE INVENTION

The present invention relates to industrial ovens used for heating objects involved in processes such as fabrication processes and, more particularly, to ovens for heating such objects in compartments while motionless.

There are many operations in fabrication processes that require heating of the product being fabricated or the heating of some intermediate structure or portion that will be in or involved in the final product. Some common heating operations in processes for fabricating electronic devices include solder reflowing operations in which solder, provided as a paste on printed circuit board (PCB) assemblies between terminals of circuit-components to be mounted on the board and conductive interconnections provided on the board, is melted to form electrical connections therebetween, curing operations to complete the bonding and solidification of adhesives and fills used in mounting components and the like, and ball bonding operations to attach solder spheres formed on circuit components to ball grid array structures.

Currently, in-line mass reflow ovens-dominate as the heating device for such operations such as that shown in U.S. Pat. No. 5,440,101 hereby incorporated herein by reference. Ovens of this type melt the solder paste by transporting PCBs with the paste and circuit components thereon through multiple, consecutive heating zones in the ovens of differing temperatures to thereby apply heat at differing rates to the PCBs and components. Such ovens transfer heat to the PCBs and components via radiant dominant heating, convection dominant heating, or a combination of both, in either an air atmosphere or, alternatively, an inert atmosphere to thereby control the degree of resulting oxidation of the PCBs and the circuit components thereon. To integrate the oven in the production line, the PCBs with components are passed via a conveyor arrangement into the oven in which the solder paste thereon is melted, and thereafter further pass the PCBs with the components now soldered thereon to further downstream process operations. Since the specified heating profile (temperature as a function of time) recommended for melting the solder has not changed significantly over the last decade, the increases that have occurred in that time in product throughput in upstream process operations have also lead to longer and longer ovens to thereby provide enough capacity to deal with the resulting faster conveyor speeds.

To reduce the concomitant need for more floor space, oven manufacturers have previously tried two approaches: 1) multi-lane ovens with special shuttle conveyors (based on the theory that a two lane highway can move more cars than a single lane); and 2) elevators inside vertical process chambers. However, such vertical process chambers were unable to adequately control the resulting heating profile occurring therein because the convection flow of the heating fluid did not directly impinge on each board in the same manner and it was too difficult to overcome the natural vertical convection flow, i.e. "heat rises." Thus, there is a desire for an oven taking relatively little floor space which has the capacity to accommodate rapid influxes of PCBs with circuit components thereon provided thereto in a production line and subject them to relatively precise temperature profiles during the heating and cooling thereof before passing them on to the remaining portions of the production line, and do so at a reasonable cost.

BRIEF SUMMARY OF THE INVENTION

The present invention provides an oven compartment in an oven for subjecting items to a selected heating sequence having a compartment container with a transport opening therein to permit selectively entering such items into portions of container interior regions and with a first heat flow opening therein to permit forcing a heating fluid into a first plenum structure located in the interior regions of the compartment container. The first plenum structure has a perforated surface next to which an entered item from the transport opening can be positioned with there being a first heating duct extending between the first heat flow opening and the first plenum structure to allow providing heating fluid at locations near the perforated surface. The first plenum structure has a material mass and a specific heat such that a rate of change of temperature of that structure exceeds one degree Centigrade per second for a selected maximum temperature differential between heating fluid and any entered items positioned adjacent to the perforated surface at selected heating fluid pressures at that perforated surface.

A method for heating such items entered into the compartment container next to the perforated surface of the first plenum structure with a heating fluid previously heated by a heater, to an extent determined by operating a heater control, directed onto such items is based on obtaining a control representation of a selected set of values for the heater control versus time over a selected heating duration based on a heating specification for a selected kind of item to be heated. Heating fluid is directed over the heating duration onto such an item with this heating fluid having been previously heated by the heater through operating the heater control to follow the control representation as selectively further adjusted based on measurements of heating fluid near the perforated surface performed in the heating duration.

BRIEF DESCRIPTION OF THE DRAWINGS

FIG. 20 shows a cross section view of a further alternative plenum arrangement for a oven chamber, FIGS. 21A, 21B and 21C shows a partial views of portions of the plenum of FIG. 20 as assembled and supported in an oven chamber, FIG. 22 shows an exploded perspective view of the plenum of FIG. 20, FIG. 25 shows a representation of convective fluid flow about an item heated thereby, FIG. 33 shows a cross section view of a chamber conveyor carrier support.

DETAILED DESCRIPTION

Figure 1:
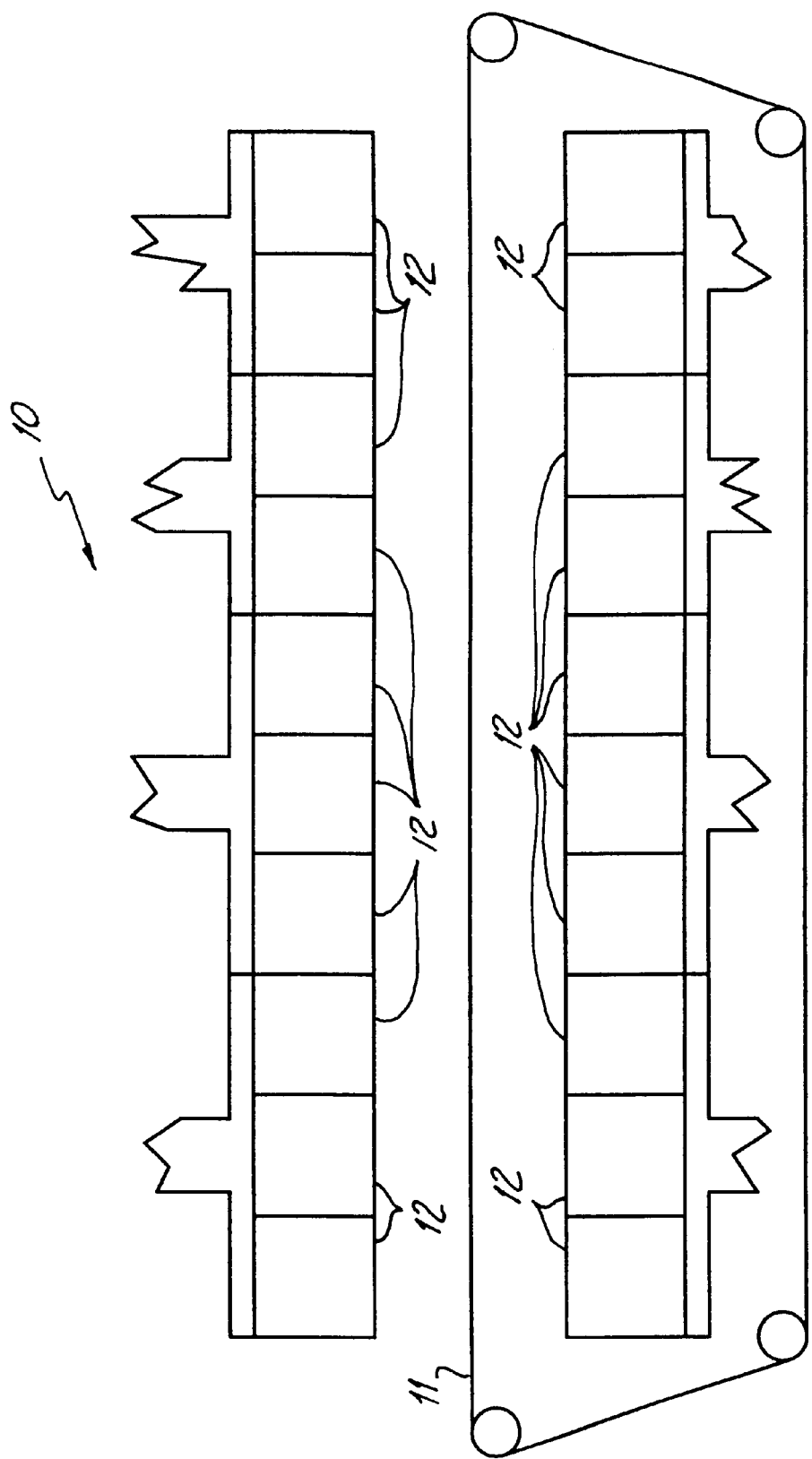
FIG. 1 shows a representational side view of a previously known industrial oven.

A new kind of oven is provided requiring a relatively small floor space in a typical production line use based on providing an elevator in a horizontal and vertical transport compartmentalized heat processing, or oven, arrangement that is capable of transporting PCBs and the circuit components thereon at ambient temperature from the preceding portion of a production line to one of several separate processing chambers therein. Each such PCB and the circuit components thereon are subjected to a desired heating profile in a corresponding single chamber, as well as being cooled therein. Thereafter, the PCB with the accompanying circuit components soldered to the circuit interconnections therein is passed back to the elevator that remains at ambient temperature for transport to the remaining portions of the production line.

This transporting compartmentalized oven thus yields production costs that depend primarily on production rates rather than primarily on operating time. In previous ovens used for these purposes, there are associated continually accruing costs regardless of whether or not the oven is being used to process circuit boards. Such an oven has a changeover time during startup following a period in which the oven has been out of use and during periods between changes in the production of different types of boards during which time the oven continues to consume electricity and inert processing gas before it is ready to provide desired heating profiles to the circuit boards to be passed therethrough. Also, loading or circuit board insertion rates (whether boards are close together or far apart) do not significantly impact the cost to operate such an oven. The related oven cost exists whether one board or 20 boards are being processed.

In contrast, in the present oven, production costs primarily accrue only when circuit boards are being subjected to desired heating profiles. Each board is transported to and entered into a cold chamber and heat is applied therein only when a board is present therein. This oven is ready to process any circuit board, once a heat profile has been developed therefor, without any significant associated chamber warm-up or changeover costs. All such chambers in this oven operate independently of one another; therefore, operating costs are in direct proportion to the production rates. That is, in general, a present oven operating at 50% of capacity costs about 50% of the same oven operating at 100% of capacity, i.e. production costs per board do not significantly change relative to production rates.

Furthermore, preventative maintenance, or the need to repair because of an unplanned malfunction, of a single chamber does not cause the whole production line to have to be stopped since the capacity of the present oven is only temporarily reduced. In typical previous ovens, a single oven component failure, (zone, heater, fan, microprocessor . . . ) can halt the entire production line until the oven can be repaired and brought back up to operating conditions. In the present oven, the redundancy resulting from the availability of multiple chambers provides a system in which preventive maintenance, troubleshooting, and repairs can be done with respect to a single chamber while the other chambers continue to process PCB's. Through software based controls, the affected chamber can be disabled until it can be removed or exchanged at a time convenient to the production line. The production line can continue to operate, though at a fractionally reduced capacity, until such a time of convenience.

Changeover times to accommodate different kinds of PCBs can be very short for each chamber once the desired heating profiles for each kind of board are known in the present oven, and this capability makes possible the continual processing of mixed kinds of PCBs which can be controlled through the use of bar-coding indicators on the PCB indicating the heating profile to be used therewith. In previous ovens, bar-coding and similar board identification techniques for boards within the oven have only served as methods for traceability and operator accountability. Any true efforts to adjust the oven heating profile in such ovens based on real time board identification may well severely degrade production because of the high cost of changeovers between kinds of PCBs in a highly mixed type production line board sequence. Changing a heating profile in such ovens means completely processing all the boards currently in the oven at the time of a decision to change types, downloading the new heating profile, and waiting for the oven to stabilize at the new various internal temperatures; typically, this can take 10 to 20 minutes.

In the present oven, the PCB is heated and cooled in the corresponding chamber in which it is inserted and that chamber returns to a cooled state after every board is processed. The next board the chamber processes is not limited to being an exact or a similar board. The heating profile from one heating cycle to the next or from one chamber to the next can differ each and every time making processing of mixed types of PCBs based on real-time board identification feasible. Alternatively, or in addition, the present oven can serve as a flexible platform in connection with multitasking any of the tasks associated with the electronics assembly and packaging industry such as (but not limited to) application of solder paste, component placement and insertion, test and inspection, labeling, with future design changes to the modular chamber. Moreover, a single present oven can more or less concurrently accept different kinds of PCBs from different production lines if the rate of presentation of same from each is sufficiently small.

Previous ovens have typically required that a buffer conveyor be provided immediately thereafter in the production line to store PCBs processed in that oven if operation of any portion of the following production line is interrupted because any PCBs stopped in hot portions of that oven would otherwise be damaged. A production line utilizing the present oven experiencing an interruption in the portion thereof following that oven simply means that such oven is allowed to complete processing of the PCBs that it has already started therein, and is then directed to hold them in the processing chamber after the appropriate cooling of the chamber until the production line is ready to resume operation and accept circuit boards again. This ability of the present oven to serve as a production line buffer has the advantages of (a) there being a further reduction in floor space and capital requirements because a buffer conveyor is not required, and there being a reduction of the work, or number of PCBs, in process (WIP.) The maximum WIP in the present oven is equivalent to the number of chambers provided therein. WIP in previous horizontal in-line ovens is calculated using the following formula:

$$WIP = \frac{length\_of\_oven * percent\_loading}{length\_of\_board}.$$

The solder reflow step in a PCB production line is typically the only step in which a failure of the corresponding production line equipment can cause multiple circuit boards to be destroyed simultaneously. Decreasing the WIP inside the reflow oven thus decreases the exposure to the risk of large board count losses. Also, considering the value-added into the PCB prior to and during the reflow process, reducing the WIP in the oven and the remaining production line portions can have significant cost advantages by preventing at least a portion of the ensuing costly rework if circuit board defects are discovered during testing.

The compartmentalization of the present oven that provides the foregoing advantages also provides for the reduction in floor space taken by that oven over the floor space taken by previous horizontal in-line ovens such as shown diagrammatically in FIG. 1. Such previous ovens, 10, receive PCBs and the associated circuit components from a production line conveyor and transport them on an oven conveyor, 11, through multiple consecutive heating zones of differing temperatures provided by gases of different temperatures flowing through openings in plenums,12, that effectively define each such zone, plenums that are usually provided both above and below the zone locations, as represented in FIG. 1. Thereby, the rate that heat is applied to these PCBs is controlled by the conveyor speed, zone dimensions and zone gas temperatures to result in subjecting the PCBs to a desired temperature profile, including the subsequent cooling thereof, after which they are placed on another production line conveyor.

Figure 2:
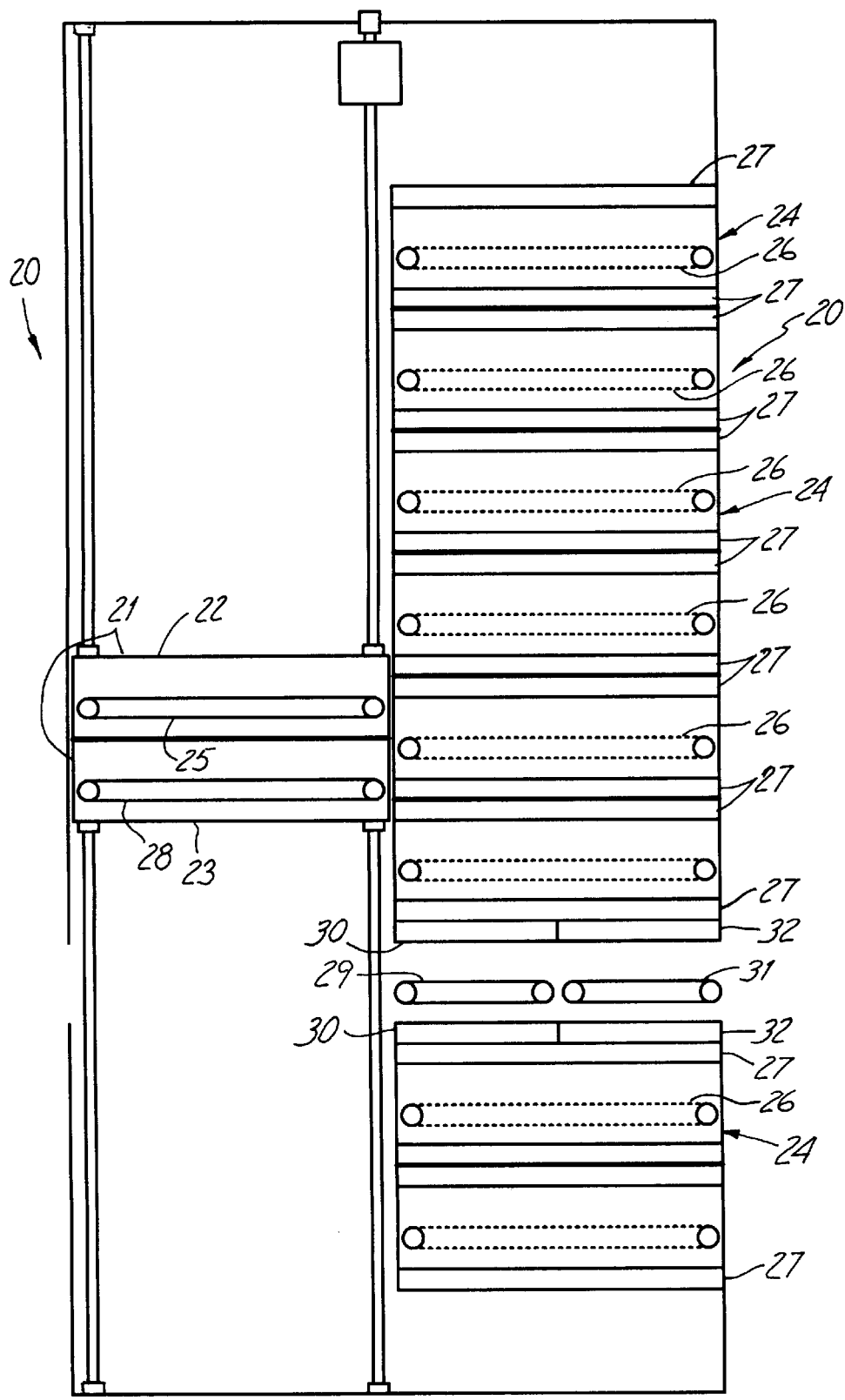
FIG. 2 shows a representational side view of an industrial oven of the present invention.

In contrast, the oven of the present invention, 20, receives PCBs and the associated circuit components of each on the upper level of a two level elevator, 21, as represented on the left in FIG. 2, having an upper level portion, 22, and a lower level portion, 23, from a production line conveyor and then vertically transports each such PCB received on elevator upper level, 22, to an assigned one of several separate, vertically stacked, processing chambers, 24, as represented on the right in FIG. 2. Each PCB so transported is then inserted into that chamber by an upper level conveyor, 25, provided at elevator upper level portion 22 which is operated in conjunction with a low mass bead conveyor, 26, in the chamber to result in the PCB reaching a selected position in the chamber. There, that PCB and its associated circuit components remain in place as they are heated to different temperatures by varying the temperature of gases over time that impinge thereon through openings in chamber plenums, 27, again usually provided both above and below the PCB in the chamber, including some cooling, to thereby provide the desired temperature profile for the particular kind of PCB in the chamber. Thus, elevator 21 and other portions of the oven outside chambers 24 remain at ambient temperatures during the processing of all PCBs.

The PCBs in such chambers, following such temperature processing, are transported back to elevator 21, but at lower level 23 thereof, using chamber bead conveyors 26 and a lower level conveyor, 28, provided at lower elevator portion 23. Elevator 21 then transports each such PCB vertically to the location of the first output conveyor, 29, positioned between processing chambers 24 on the right in FIG. 2 on which such PCBs are placed using that conveyor and lower elevator conveyor 28. There, the PCBs can be cooled by a cooling gas that impinges thereon through openings in cooling plenums, 30, above and below it. The oven can direct PCBs on first output conveyor 29 to move to a second output conveyor, 31, where they can again be cooled by a cooling gas from plenums, 32, above and below to be further cooled before delivery to another production line conveyor.

Although PCB throughput rates in present oven 20 are not dependent on board size, present oven 20 with such vertical stacking can produce at an equivalent throughput rate in a third of the floor space taken by a typical horizontal in-line oven 10 at FIG. 1 often having 10 or 11 feet of heated length when used for processing typical PCBs. Recently, advances in PCB throughput rates have been achieved in production line portions preceding the line reflow oven which leads to demands for greater throughput in such reflow ovens. Because the heating profiles required for the PCBs haven't changed, these in-line ovens 10 were required to become longer to allow more boards in process at any one time if the rate was to be increased. Thus, old production lines being reconfigured with new, modern equipment required more floor space. With present oven 20, old production lines can be reconfigured to increase capacity without requiring additional capital to be spent on re-layout of the factory, factory expansion, or new buildings.

The compartmentalization of present oven 20 with an elevator 21 to transport PCBs to and from processing chambers 24 in which the temperature is varied to provide the desired heating profile additionally allows the PCBs to be subjected to the desired heating profiles while remaining stationary instead of passing through zones of varying temperature. As electronic devices have continued their trend toward miniaturization, electronic system designers continue to increase the sizes of circuit components used on the underside of the PCB mounting boards to have these components accommodate more circuitry therein. Such components on the underside of the PCB must either be small enough that the surface tension of the solder joint is sufficient during reflow to hold the component in place, or an additional process of gluing the component to the PCB must be done before the oven. The formula for calculating whether adhesive is required or not is a function of the mass to lead ratio of the component and the vibration of the transportation mechanism in the oven. However, during reflow in present oven 20, there is no vibration from conveyor motion thereby allowing solder reflow to be used with larger components on the underside of the board without adding an adhesive.

Electronic system designers must also constantly adopt the latest electronic technology to keep their products current in fast changing markets which leads to also needing to use new manufacturing processes. Quite often, staying competitive requires developing designs and associated manufacturing processes simultaneously. Many times, these new manufacturing processes require new adaptations of manufacturing equipment with very short lead times. Present oven system 20 can serve as a flexible platform with multiple chambers of alternative designs to meet the changing needs of the electronics assembler. Some PCB assemblies are sensitive to warping and require support fixturing. In a stationary chamber 24, consistent location of the board makes it possible to add fixturing to the chamber, like a unique pin support to prevent sagging, rather than adding it to each board assembly. Similarly, adding a heat shield or a heat sink to a chamber 24 can protect parts during reflow such as plastic circuit connectors that would be otherwise deformed during the reflow process in a horizontal in-line oven. Thus, such connectors can be added to the PCB prior to its reaching the oven rather than having to be added by a manual operation after reflow.

Typical horizontal in-line ovens 10 minimize temperature differences between high mass and low mass portions of PCBs by varying the convection or radiant heat transfer balance, or both, and extending the length of the heating profile. In an oven where the PCB is stationary, the high mass area of a given kind of PCB will always be in the same location relative to chamber 24. The chamber can thus be configured with a supplementary heater near that region of the PCB to thereby virtually eliminate temperature differences. Alternatively, rather than adding a supplementary heater, modifying the heating gas emission hole pattern in the chamber walls surrounding the PCB, or adding a stencil between the heating gas emission hole pattern in the chamber walls and the PCB, changes the flow of the heating gas and results in a tighter process window than is possible in an oven 10 where the product is moving continuously relative to the heating source. Furthermore, future changes in the fast-paced electronics industry can be accommodated by new chamber designs rather than replacing the entire piece of capital equipment.

In a typical horizontal in-line oven 10, iterative testing with manual intervention is the basis for determining the desired heating profile for any one kind of PCB and verifying its acceptability. After each iteration and subsequent change to another heating profile to be tried, a typical oven has a 10 to 20 minute wait period associated with the changeover. In the situation of a new PCB design, there can be an associated cost of 4 to 8 hours production downtime during which time an engineer is determining the best heating profile. In present oven 20, the desired heating profile is the input, and feedback from the PCB is used to allow the oven to determine the heating steps necessary to reach correct profile and its settings to provide these steps. After the desired heating profile is provided, the oven typically operates unattended for usually less than 1 hour to determine the correct settings therefor.

Many production processes are proved out in a research and development laboratory and then transferred to the manufacturing floor including production heating operations. Because of the high cost of capital equipment and the associated loss of production floor space, few companies can provide their process engineers with an identical horizontal in-line oven for developing desired heating profiles for each kind of PCB to be processed on the production floor. Once a heating profile has been developed in the R & D lab, it thus needs to be recreated on the factory floor in a production environment, i.e. in the horizontal in-line ovens previously used. A single chamber oven 20 of the present kind, or a profiling station, makes economical the providing in the research and development laboratory of a process chamber identical to those used on the manufacturing floor. As a result, the desired heating profile can easily be transferred to the production floor with no changeover costs being associated therewith, and this transfer can be part of the transfer of a larger portion of the production process developed in the laboratory to the production floor around the heating step because there can also be identicality between these lab and floor process portions. In addition, the profiling station can also serve as a short term spare parts kit for the production oven.

This transporting compartmentalized oven 20 of the present invention can provide the advantages just described only by providing a chamber 24 that is capable of delivering uniform heating and cooling in a controllable fashion at the necessary rates of change. In properly forming an electrical interconnection solder joint reliably, every part of a PCB and the components provided therewith need to be heated and cooled to the solder paste manufacturer's temperature vs. time recommendations.

Figure 3:
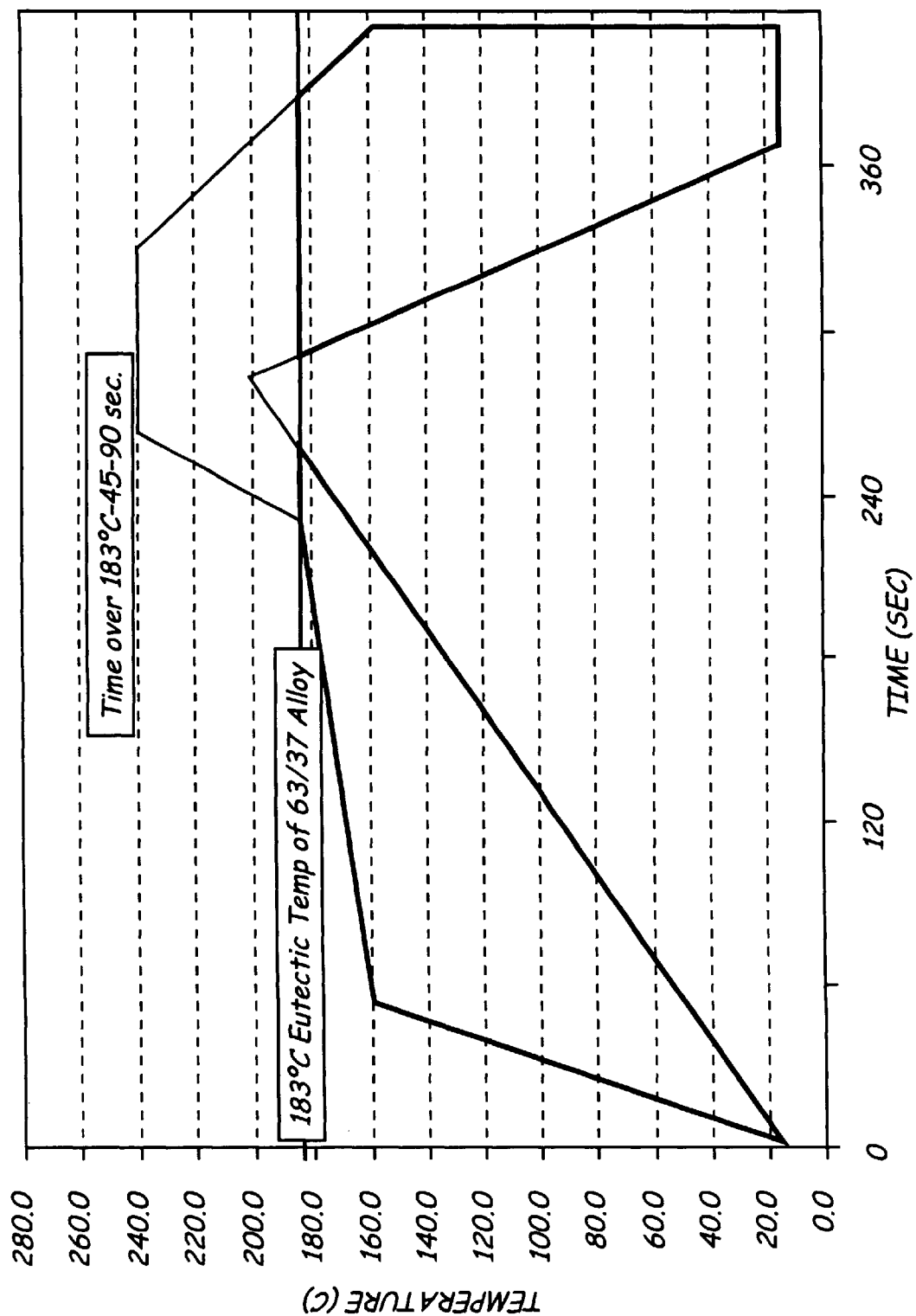
FIG. 3 shows a plot of a typical temperature sequence desired for the heating pf printed circuit boards.

Considering present day typical solder pastes, the required profiles generally fall into a profile range, or a profile window, approximated by plot shown in FIG. 3 occurring between the upper and lower temperature limits plotted as a function of time. At the upper limit, for instance, a PCB with circuit components thereon is heated at approximately 2° C./sec for the first 60 seconds and then is slowly warmed at 0.1 6° C./sec. for the next 120 seconds. Assuming, typically, a PCB with a mass of one pound and heating efficiencies of 15%, the first part of the profile requires generating 26,000 Btu/hr, and then, at the first abrupt change in slope, the heat needed to be generated sharply drops to 2,000 Btu/hr. This change in heat transfer rate to the board would be accomplished in a horizontal in-line oven by transporting the board from a heating zone with a high temperature setpoint to a subsequent heating zone with a setpoint close the PCB temperature. In a chamber 24 used with oven 20 of the present invention, to accomplish this same heat transfer rate change requires cooling the heat source in a matter of seconds by approximately 100 to105° C. There are very few choices of heat sources that can be reliably heated and cooled at such high rates of change.

Figure 4:
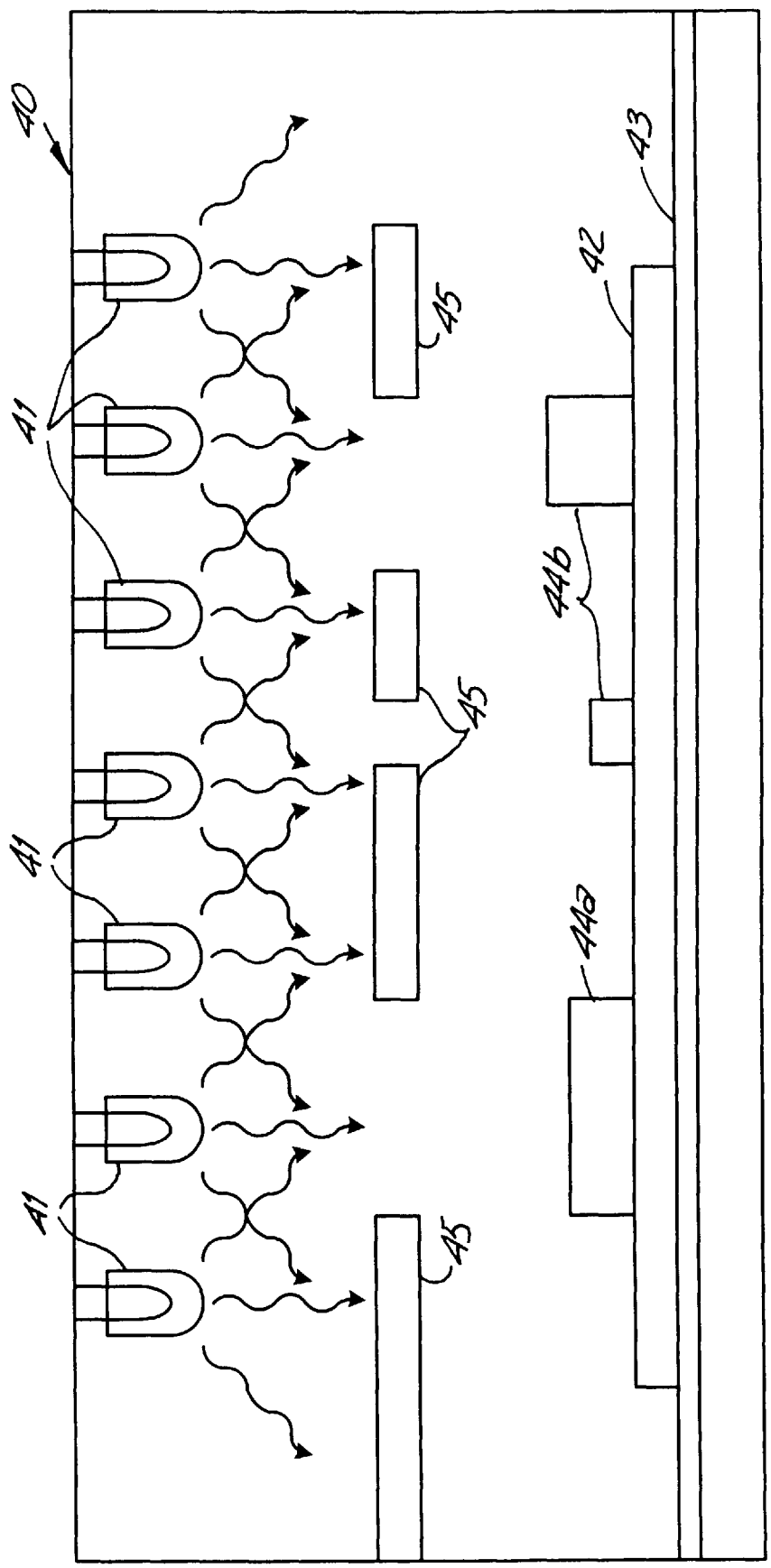
FIG. 4 shows a representational side view of an industrial oven using an alternative heating source.

One possibility is an oven compartment, 40, with an array of short wave length infrared heating lamps, 41, having fast heating change response time to changes in electrical currents through its low mass heating element which are easily controlled such as a T3 quartz lamp. Although the mass of the lamp heating element is very low allowing changes in temperature to occur very quickly, generating sufficient heat to melt solder on a PCB, 42, carried on a conveyor, 43, requires a very high heater temperature (2000° C.). Such a lamp, however, produces large temperature differences between low and high mass areas of PCBs because the low mass areas of the board respond quickly to the high element temperatures while the high mass areas of the board lag significantly behind. After the finite amount of time recommended by the solder paste manufacturer, the temperature differences on PCBs become so great that the low mass circuit components, 44$a$, are damaged by overheating while the solder paste does not even melt at the locations of high mass circuit components 44$b$. Introducing a stencil, 45, between the lamps and the PCBs being heated to reduce the radiant heat reaching the low mass circuit components as shown in the representation of FIG. 4 reduces these temperature differences to acceptable levels as radiant heat is partially reflected away from low mass board areas while preferentially reaching high mass board areas.

However, stencil 45 adds substantial complexity to the manufacturing process. A PCB specific stencil is required to be fabricated for each kind of PCB manufactured, and then that stencil must be mounted in the chamber or chambers that are to be used in processing that kind of PCBs. This stencil fabrication can perhaps be automated, but automatically generating a stencil requires accounting for many variables that may not always be sufficiently known.

Convection based heat transfer, heat transfer via a fluid by typically air or nitrogen, is an alternative but exhibits low heating efficiencies. Convection heating is inefficient because first the air or nitrogen (considered an insulator) needs to heated, and then the heat needs to be transferred from that fluid to the PCB. Only the hot fluid molecules making contact with the PCBs result in transferring heat them. On the other hand, heating with T3 quartz lamps (infrared radiation) initially appears very efficient, but the need to use a stencil results in inefficiencies being introduced by the stencil reflecting unwanted heat that are similar to the inefficiencies of convection heat transfer. A convection-heating based chamber generally does not require a stencil because the heating temperatures occurring therein are closer to the desired temperatures to be reached by PCBs processed therein.

The convection based heat transferred to PCBs is the heat transfer rate times the temperature difference between the convection fluid or gas and the PCBs. Therefore, the same amount of heat can be transferred to a PCB either with a low heat transfer rate and a high temperature difference, or a high heat transfer rate and a low temperature difference. All areas of a PCB must reach solder melting temperatures during reflow to provide reliable solder connections between the circuit component terminals and the board supported interconnections. A high material mass region heats more slowly than does a low material mass area. If the temperature of the convection gas is kept relatively close to the desired board temperature, low material mass regions will not overheat even while high material mass regions continue to heat to reach solder melting temperatures. A general rule of thumb for a typical PCB is that the heat transfer rate must be high enough to keep fluid temperatures surrounding PCBs in the oven within 100° C. of the desired PCB temperature. Achieving heat transfer rates this high thus negates the need for stencils between the heat source and most kinds of PCBs.

The heat transferred convectively must also be delivered substantially uniformly to the PCBs being heated so that regions thereof having similar material masses predictably reach the same temperatures. This is particularly needed for the oven chambers of the present invention since PCBs are stationary in the chambers in which they are being heated so that there is no motion with respect to the chamber heating sources to aid in averaging heats delivered to each part of the board despite any occurrences of heat source differences. The convection fluid, once having delivered heat to a PCB, must be removed completely from the chamber to avoid adversely affecting subsequent heating of the PCB therein by further fluid later introduced, and do so without the removed fluid entering the space around the oven in which operators and other production line equipment are present.

In addition, to achieve substantially uniform heating results, the oven control system must deliver the same amount of heat to each PCB of the same kind being processed in a convection based heating chamber regardless of the starting condition of that chamber, and must also do so for each different chamber that is processing that kind of PCB so that the results for each of that kind of PCB are independent of the chambers that such PCBs are processed in. Furthermore, the PCB transport system through the oven and chambers therein must reliably load and unload PCBs in and out of corresponding processing chambers, consistently placing each PCB of a kind in the same position relative to its processing chamber. At the same time, the transport system must neither adversely affect heat transfers to PCBs in a chamber nor the removal therefrom of the convection fluid used in the heating of a PCB in a chamber. Also, the transport system must be easily adjusted to allow for a large range of board sizes which typically can be as small as 5"×5" to as large as 14"×18", and which board dimensions range may broaden in the future.

The convection based heating in oven 20 of the present invention, as indicated above, is to more or less match the throughput of previous horizontal in-line ovens 10 of FIG. 1 in a third of the floor space taken by those previous ovens while providing such heating and transport conditions for the PCBs being processed. Given a typical 14" long board loaded in the preceding portion of the production line to have a typical 2.5" spacing between successive boards (85% loading), and needing a typical 4 minute heating profile, the conveyor speed needed in a standard reflow board production line would be, $$11 \text{ ft} * \frac{12 \text{ in}}{\text{ft}} * \frac{1}{4 \text{ min}} = 33 ipm$$

resulting in a board presentation rate of $$\frac{bd}{16.5 \text{ in}} * \frac{33 \text{ in}}{\text{min}} * \frac{60 \text{ min}}{\text{hr}} = \frac{120 bds}{\text{hr}}.$$

Duplicating this production rate in oven 20 of the present invention requires $$\frac{120 bds}{\text{hour} \cdot \text{system}} * \frac{4 \text{ min} \cdot \text{chamber}}{1 bd} * \frac{\text{hour}}{60 \text{ min}} = \frac{8 \text{ chambers}}{\text{system}}$$

as shown in the oven 20 representation of FIG. 2. Of course, there will be other practical conditions for an oven to be used in typical production line settings such, as examples, a maximum electrical current source capability of up to 200 Amps at 480V, and a maximum compressed fluid source, such as air, capability up to 10 cfm at 50 psi.

Raising or lowering the temperature of a PCB with its associated circuit components and a chamber 24 in which it is situated for processing requires adding heat to, or removing heat from, those items, respectively, as described by $$Q = m \cdot C_p (T_{final} - T_{initial}),$$

where Q is the heat transferred (Btu), m is the mass of the object (lbm), and $C_p$ is the specific heat (Btu/lbm·° F.), a thermal property defined for all substances. At room temperature as examples, $C_p$=1.0 for water, $C_p$=0.24 for air, $C_p$=0.25 for Nitrogen, and $C_p$=0.3 for a printed circuit board. Thus, for example, to heat a 1 pound PCB at a heating rate of 3.6° F./sec (2° C./sec) requires $$q = 1 lbm \cdot \frac{.3 \text{ Btu}}{lbm \cdot °F.} \cdot \frac{3.6° \text{ F.}}{\text{sec}} \cdot \frac{3600 \text{ sec}}{\text{hour}} = \frac{3888 \text{ Btu's}}{\text{hour}}.$$

The heat added to, or removed from, an object can be transferred in one or more of three ways: radiation, convection, and conduction. Since conduction and radiation will be relatively minor roles in the convective based heat transfer oven of the present invention, considerations of them will be omitted in the following.

Convection based heat transfer requires transferring of heat energy through a fluid, either liquid or gas, and can be described by $$q = h(t) \cdot A (T_{fluid} - T_{product}),$$

where q is the heat transfer rate (Btu/hr), A is the area of the board (ft$^2$), T is the temperature of the chamber and of the PCB (° F.) therein, and h is the heat transfer coefficient. The coefficient h is a function of many factors including velocity and fluid density, and so is difficult to calculate. A typical value of h(t) for natural convection (fluid motion driven only by density differences due to temperature) is 1.5 Btu/hr·ft$^{2°}$ F.

As shown above, 3888 Btu's/hour are required to heat a one pound board at 3.6° F./sec. To generate this heat transfer with convection, assuming the maximum 212° F. (100° C.) temperature difference between the fluid and the one square foot PCB as described above for achieving relative uniform temperatures thereacross, would require the coefficient h to have a value of $$h = \frac{q}{A(T_{fluid} - T_{PCB})} = \frac{3888 \text{ btu}}{\text{hr}} \cdot \frac{1}{1 \text{ ft}^2 (212° \text{ F.})} = \frac{18.3 \text{ btu's}}{\text{hr} \cdot \text{ft}^2 \cdot °F.}.$$

Figure 5:
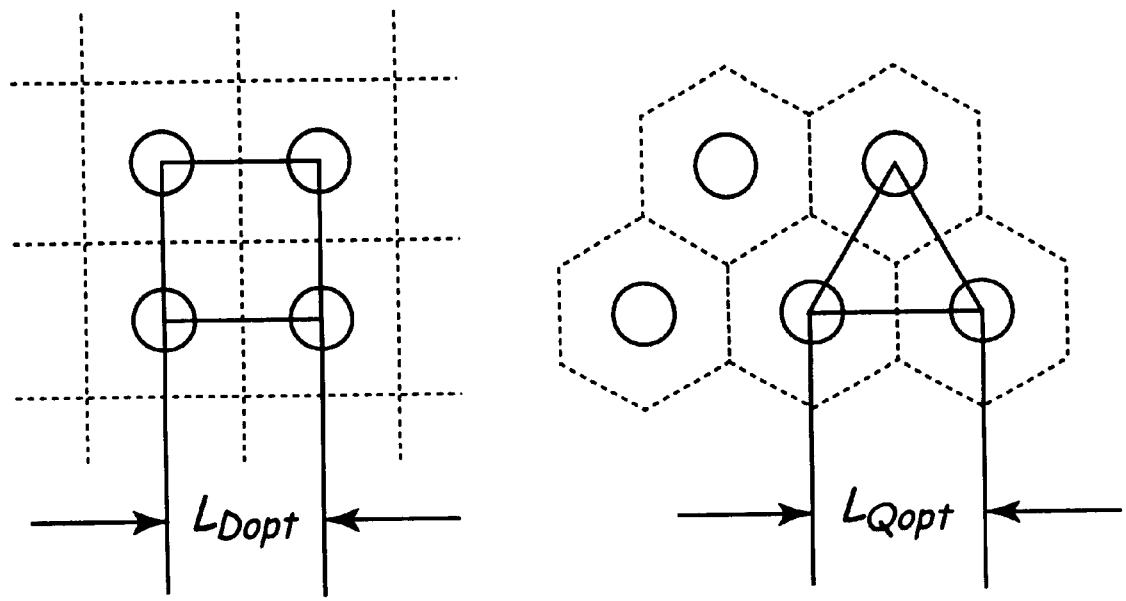
FIG. 5 shows hole patterns for convective heat transfer fluid exits in a convective fluid chamber.

Convective transfer of heat in a chamber 24 to a PCB therein is accomplished through providing a convective fluid under pressure through openings, or nozzles, in a wall in the chamber located in the vicinity of the PCB so that small fluid flow jets result with the fluid flows directed generally at the PCB. The hole or nozzle pattern in the wall and the diameter and spacing of those holes are known to be primary parameters which can be optimized in value to provide maximum heat transfer to objects on which the fluid flows impinge, and so maximum value of the heat transfer coefficient h for such a system. As an example, the maximum transfer of heat for such a nozzle and wall system to and from a film moving thereby for heating and cooling same has been found for the arrangement being in thermal equilibrium with sufficient space between the nozzles for a convection fluid removal means to remove such fluid after it has impinged on the film. The result is $$h = .16 \left( \frac{\overline{\omega} H}{v} \right)^{2/3}$$

where $\overline{\omega}$=nozzle exit velocity (averaged over the open hole area), H=distance from nozzle exit to the film, and v=kinematic viscosity. The optimum values of the parameters for such a transfer are:

optimal nozzle diameter=$D_{opt}$=0.184H,
optimal spacing (hexagonal array)=$L_{Qopt}$=1.324H, and
optimal spacing (orthogonal array)=$L_{dopt}$=1.423H, which are illustrated in FIG. 5.

Although such a system model provides a good start as a basis for designing the chamber in the oven of the present invention, significant differences between that model and the chamber require further considerations. A PCB in a chamber is stationary so that there is no averaging of heat transfer thereover because of its movement with respect to the nozzles with the result hole pattern predicted above leads to unacceptable localized hot spots directly under the impingement jets from each of the nozzles. Modifying the hole pattern can significantly reduce such spot temperature differences but considerations of the removal of the spent convective fluid, or gas, are critical so as to not adversely affect the heat transfer. The convection gas flow maintains good heat transfer rates if it impinges on a PCB with a primary flow direction angle of 90°±15°. However, the effective angle of the impingement jet primary flow can be affected by the horizontal flow of the spent gas removal flow. Once it has impinged on a PCB, the spent gas removal needs to be removed without affecting the angle of the impinging flow.

A further significant difference is that a PCB being heated and cooled in a chamber is subject transient heat transfers (heat transfer that changes over time) rather than being at or near thermal equilibrium. As a result, heat transfer coefficients are much higher than those predicted by an equilibrium model. Therefore, use of such a model, although not completely accurate, overestimates the required heat transfer thereby providing a built in added capacity margin to assure sufficient heat transfer capability.

The ability to heat and cool PCBs in the same chamber requires that either the heat can be added to the air as it is required, or, that a sufficient quantity of preheated air is readily available. Using two Star Wound Heating Elements rated at 8550 Watts, 240 VAC with a single phase electrical power supply and time proportioned control, 1800 SCFH airflow (a value for airflow to be generated by a fan that is well within the capability of commercially available fans) was heated from 40° C. to 316° C. (measured at the exit of the array of holes) in 14 seconds with a 800° C. heater element temperature. However, the electrical power drawn hit a maximum of 100% of the maximum specification therefor given above and required 70% power to maintain 325° C.-output air temperature. Additional heat needs occur in the chamber and distribution system especially when starting from a cold system. As the following equation shows, a heater configuration with an increased number of heaters having the capability of providing 20,000 W requires only 30% power, or $$70\% x \frac{8550 \text{ W}}{2000 \text{ W}} = 30\%$$

The additional heater elements needed to achieve this capability provide reserve heating capacity and more responsive heat control by providing faster heating rates.

Thirty percent energy consumption per chamber left reserve of useable energy but, as the following equation shows, the 333 Amps that would be drawn by operating all 8 chambers 24 simultaneously exceeds the maximum 200 A draw requirement set out above, or $$8 Chambers x \frac{20000}{480 \text{ V}} = 333.3 \text{ A}$$

However, oven 20 of the present invention is not really 8 independent chambers 24, but a system of 8 chambers 24 operable in an integrated manner. In this oven, the heaters are time-proportion controlled with 1-second cycle times each. Applying 100% heater maximum operating power, or 20,000 W, for ¼ second results in providing 25% of heater generating power available for that chamber to that chamber but also results in a current draw of about 42 A (2000 W/480V=41.7 A). To avoid this situation in operating 8 chambers, that is, in having them simultaneously each supply 25% of maximum operating power to result in drawing an over the maximum peak current of 333 A for ¼ second and 0 A for ¾ of a second, the draws of currents by the heaters are instead controlled to be distributed over time to thereby result in the heater currents being effectively averaged over a 1 second cycle period of any of them.

This distribution of current draw times has been found to be most successful when distributed evenly (regular fixed intervals) by having the chambers sequentially operated, with the successive sequential operation start point delays or intervals scheduled by the following formula as $$SequentialDelay = \frac{TimeProportionInterval}{LargestNumericalFactorInCountOfHeaters}$$

This sequential delay, or regularly fixed interval, determines how many chambers, must draw current simultaneously so that they each have an allotted time for operation.

In the case of oven 20 of the present invention, if the number of heaters is the same as the number of chambers (8), and the time proportion interval is chosen as 1 second, the best sequential time delay is then 0.25 seconds resulting in four intervals and four time starts thus requiring that the heaters be operated in pairs to thereby provide for operation of all 8 heaters in those four intervals. A central programmable logic controller (PLC) sends out a pulse every one second to the controller for every chamber; from that mark, each individual chamber PLC applies power to the heaters at mark +0, +0.25, +0.50, +0.75 second delay. So, 8 chambers 24 each providing 25% of maximum available heater power in this scheme will lead to their heaters drawing no more than 84 A at any time during a complete one second cycle started by operation of the first heater and its paired heater. That is, chamber 1 and chamber 5 heaters draw up to 42 A each for up to the first 0.25 second interval, and then chamber 2 and chamber 6 heaters draw up to 42 A each for up to the next 0.25 second interval, and then chamber 3 and chamber 7 heaters draw up to 42 A each for up to the next 0.25 seconds, and finally chamber 4 and chamber 8 heaters draw up to 42 A each for up to the next 0.25 seconds. In meeting the heating profile desired for any one chamber 24, each of the paired chamber heaters can be controlled to either draw a smaller current than the maximum 42 A during its operating interval, or be operated for less than its full interval time, or both. If instead, the heaters of the 8 chambers 24 are to each provide 50% of maximum available heater power, each pair can be operated for two intervals following the same start points so that now two pairs of heaters are operated simultaneously rather than just the heaters in one pair being operated simultaneously in the situation of the heaters providing 25% of maximum available heater power just described. In this situation, the heaters draw no more than 168 A at any time during a complete one second cycle started by operation of the first heater and its paired heater and is equivalent to 4 chambers 24 drawing 100% power, but this draw still falls under the limit of 200 A even though this providing of a greater percentage of maximum available heater power leads to a greater overlap in the number of heaters being operated at any one time.

Utilizing the above described control scheme is successful when all 8 heaters are operated at the lower maximum available heater power percentages used and started at the above determined interval points. However, this regular schedule interval and the fixed simultaneous firing of multiple chambers 24 are incompatible with the random arrival of PCBs from the preceding portion of the production line and the accompanying occurrences of needing to provide in the chambers large percentages of maximum available heater power to satisfy corresponding temperature profiles. Random chamber starting times and variable heat levels during heat processing results in peak current draws that are above the 200 A maximum available current supply as is found in the following example.

Thus, chambers 1 through 8, are required to provide 26, 32, 29, 28, 31, 62, 58, 42 percent of maximum available heater power, respectively. Chambers 1 and 5 are paired to start operating together and are started on the first electrical current cycle in the 1-second time proportioning interval and each is operated for the number of electrical current cycles out of sixty electrical current cycles needed to give the corresponding percentage of maximum available power required for its corresponding chamber temperature profile. Chambers 2 and 6 are paired to start operating together and are started on the sixteenth current cycle in the 1-second time proportioning interval (0.25 s, or 15 current cycles, after the start of chambers 1 and 5 in the first pair), and each is again operated for the number of current cycles out of sixty current cycles needed to give the corresponding percentage of maximum available power required for its corresponding chamber temperature profile. Chambers 3 and 7 start at the thirty first current cycle and chambers 4 and 8 start at the forty sixth current cycle, and each is also operated for the number of current cycles out of sixty current cycles needed to give the corresponding percentage of maximum available power required for its corresponding chamber temperature profile as before. This schedule of operating the chambers will use an average of only 39% of maximum available heater power, and yet the current draws therefor being distributed at regular scheduled intervals will be found to result in the simultaneous operation of chambers of the heaters in chambers 1, 4, 5, 7 and 8. These five chambers being operated simultaneously while each draws 42 A will result in a peak current of 208 A thus exceeding the maximum desired 200 A.

To reduce the peak and valley currents created by fixed regular starting times and variable percentage of maximum available heater power demands during chamber heating operations (fewer or shallower current waveform valleys results in smaller current waveform peaks), a different control scheme for operating each chamber 24 in sequence is employed in which the pairing and the fixed regular starting times are discarded. Instead, the heaters are operated for the same percentage of 60 current cycles (or 1 second) as its demanded percentage of maximum available heating power. However, their current cycles of operation in each 1-second time proportioning interval are selected as though they were started sequentially one after the other (which sequence in time, if actually followed, would carry from the first second into the fourth second) but with those electrical current cycles of operation that any chamber 24 has in the second through fourth sequence seconds in such a sequential start scheme being the corresponding current cycles of operation selected therefor during each 1-second time proportioning interval in addition to whatever electrical current cycles a chamber 24 operates in the first sequence second. That is, the electrical current operating cycles of heaters in the second through to the end of the sequence operation seconds are superimposed on those occurring in the first sequence second to thereby form the heaters operating electrical current cycle basis for each 1-second time proportioning interval.

Returning to the previous example (in which the randomly demanded percentages of maximum available heater power were 26, 32, 29, 28, 31, 62, 58, 42), the heater of chamber 1 is operated for 0.26 seconds, or 16 electrical current cycles of the 60 in the 1-second time proportioning interval, the heater of chamber 2 is immediately operated after the heater of chamber 1 for 0.32 seconds or the next 19 electrical current cycles, and the heater of chamber 3 is immediately operated after the heater of chamber 2 for 0.29 seconds or the next 17 electrical current cycles. Then the heater of chamber 4 is immediately operated after the heater for chamber 3 which would be for 0.28 seconds or the next 17 electrical current cycles but this would require 9 more electrical current cycles than there are in the sixty that occur in 1 second. Thus, the heater of chamber 4 is directed to also be operated during the first 9 electrical current cycles of the first second, i.e. of the 1-second time proportioning interval. Thereafter, the heater of chamber 5 is to be immediately operated after the heater for chamber 4 which would be for 0.31 seconds or the next 19 electrical current cycles but this would require operating during the tenth through twenty eighth electrical current cycle of the second sequence second. Thus, the heater of chamber 5 is directed to also be operated during the tenth through twenty eighth electrical current cycles of the first second, i.e. of the 1-second time proportioning interval, and so on, as governed by the equation $$Chamber(n) = \sum_{Chamber(n-1)\%+1 cycle}^{IfChamber(n)\%+Chamber(n-1)\%<1, then Chamber(n)\%, else=1-Chamber(n)\%}$$

in this distribution scheme, only 3 chambers, chambers 1, 4 and 8 are found to be operated simultaneously. This distribution scheme reduces the current draw from a peak of 208 A found above under the regular interval operating scheme to a peak of 167 A instead.

Additional current draw reductions can be achieved by increasing the number of heaters that the current draws can be distributed among. If a chamber is heating supply is split into 2 heaters, top and bottom, the current draw can be more evenly distributed over time and the peak current reduced further to 146 A. That is, the current draw is more evenly distributed over time as the number of heaters the current is distributed to is increased.

Figure 6:
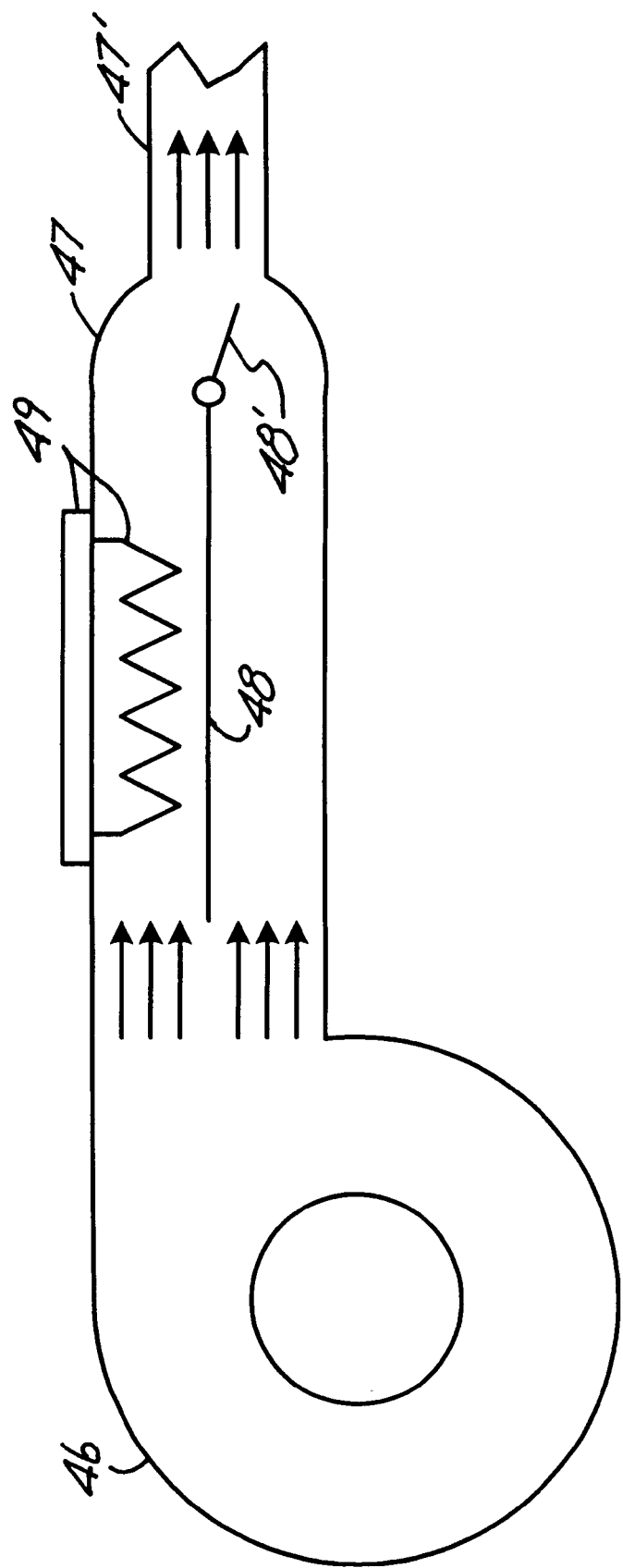
FIG. 6 shows a schematic representation of a convective fluid heater.

The ability of the heater arrangements just described to provide sufficiently heated convection fluid to chambers 24 of oven 20 of the present invention to allow subjecting PCBs to desired temperature profiles still allows alternatives for varying temperatures of that fluid, typically air, into the plenum of the chamber to thereby control the actual temperature profile undergone by a PCB. A first method is to have a high temperature convection fluid flow stream mixed with a cooler convection fluid stream in varying amounts to thereby adjust the output temperature of the fluid after a portion thereof has been heated by the chamber heater as shown in FIG. 6. There, the fluid flow stream represented by arrows is generated by a fan, 46, and forced into a heating duct having a reduced cross section area output portion, 47. Heating duct 47 has a fixed stream divider, 48, therein with a controllable variable stream divider, or flow mixing value, 48', to adjust the mix of the air flow on one side of dividers 48 and 48' heated by an electrical heater, 49, and the unheated air flow from the other side of dividers 48 and 48'. The advantage of this method of control is that the heater element can be kept at a fairly hot, constant temperature. The disadvantages include the need for the output flowrate of the stream to stay constant so as not to add flow variation to the heat transfer variation, and the need for designing a mixing valve that can withstand high fluid temperatures.

Figure 7:
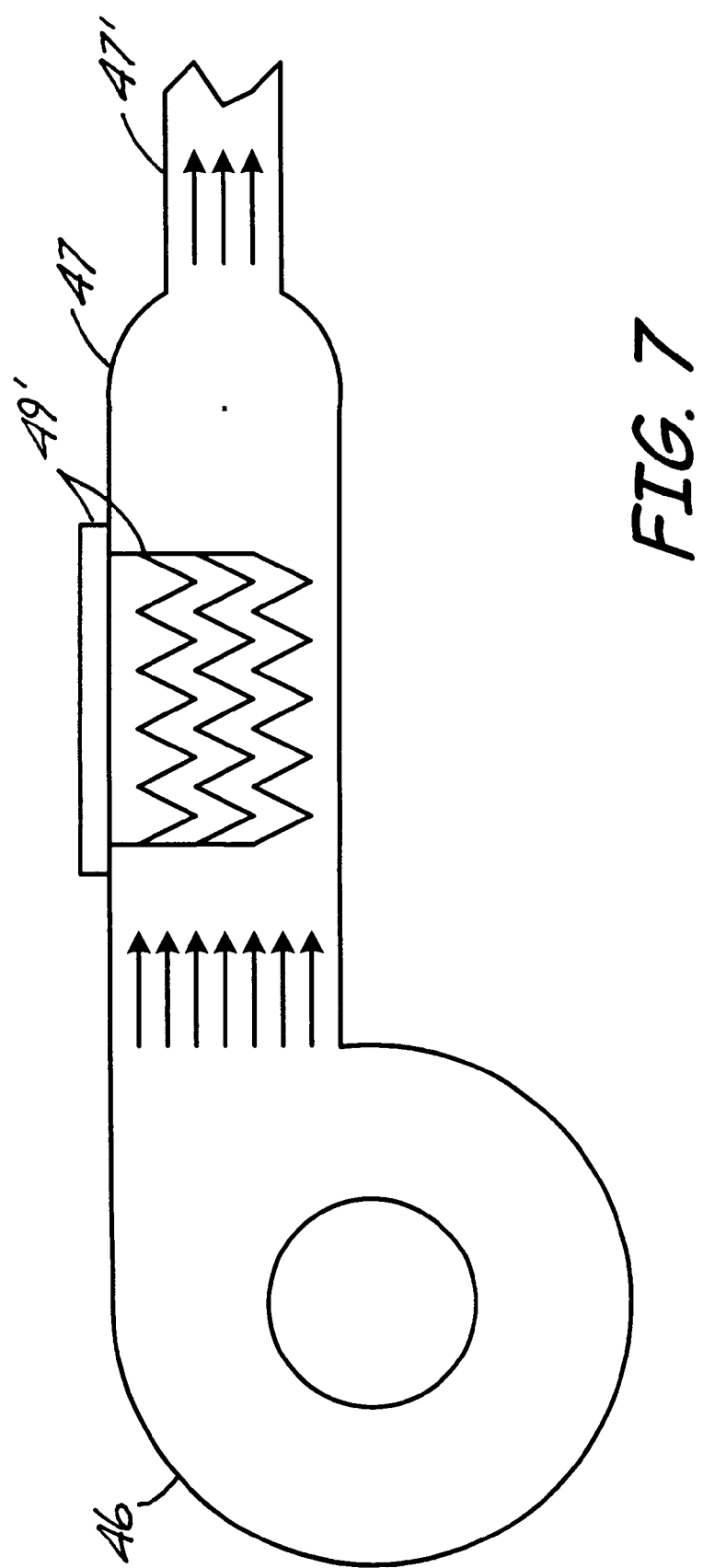
FIG. 7 shows a schematic representation of an alternative convective fluid heater.

A second method varies the percentage used of the maximum available heater power provided by heater 49 during operation while holding the flow rate of the convection fluid through the heater from fan 46 constant as shown in FIG. 7. This method can be successful if a low mass heater element is chosen that exhibits high rate of response. A system of this type does not require a mixing valve but the temperature variable of heater element, 49', must be varied to control the output temperature. This control scheme effectively controls the heating cycle, but a separate path for cooling convection fluid during cooling phases of the temperature profile is required to avoid the delays otherwise arising because of having to also cool the heater elements would contribute to the overall delay in cooling PCB in the chamber. This can be provided by use of a separate cooling fan to provide convective cooling fluid in a separate cooling path, or by adding a stream divider like divider 48 in FIG. 6 to duct 47 in FIG. 7 with a two position only fluid flow valve at the fan 46 end of that divider that directs the output flow of fan 46 either through the duct portion past heating elements 49' or along the opposite side of the divider away from those heating elements so that the fluid flow valve is never heated by heated convective fluid. A second special consideration must be incorporated with this method to avoid causing the heater to fail prematurely by exceeding recommended heater element temperatures A safety circuit to limit current to the heater during occurrences of low or no convection fluid flow through the heater should be used.

Figure 8:
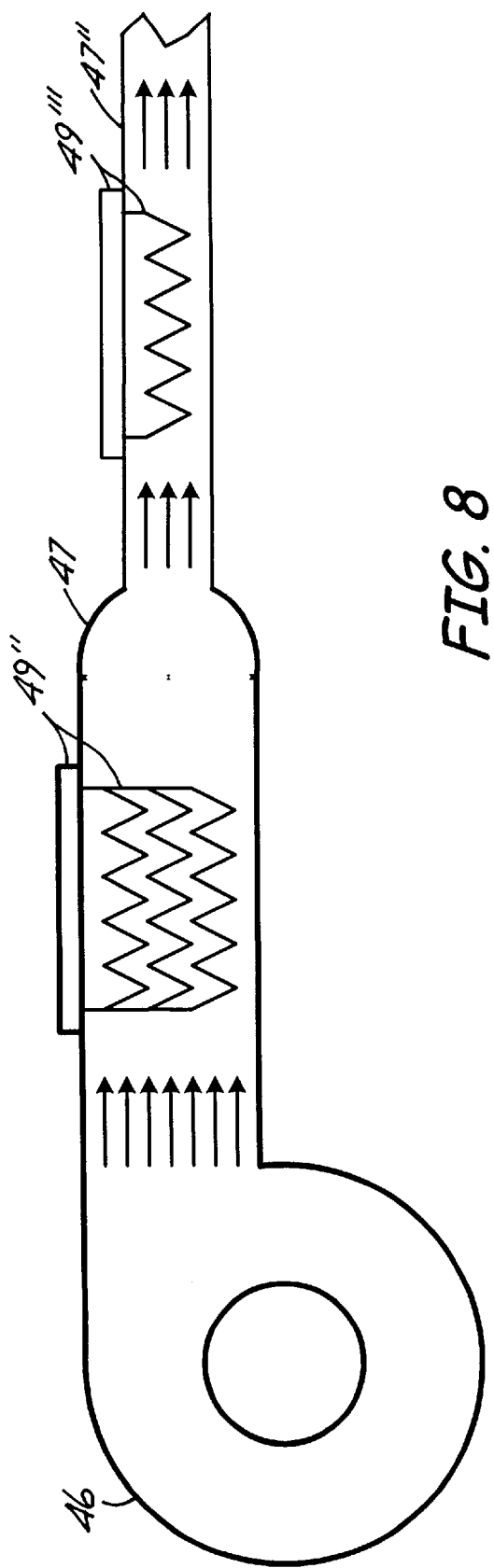
FIG. 8 shows a schematic representation of a further alternative convective fluid heater.

Finally, a third method of control using a first heater, 49", with a high mass element, constant temperature heater element, followed in series by a second heater, 49''', in a suitably modified heating duct output portion, 47", with a low mass heater element highly responsive in rate of temperature change to current changes therethrough as shown in FIG. 8. First heater 49" serves as a pre-heater and does the majority of the heating; the percentage used of the maximum available heater power is varied to the heating element of second heater 49''' to control the temperature of the output convection fluid flow provided by fan 46. The second method controlling the temperature of the convective fluid delivered to chamber plenums seems preferable on grounds of eliminating the need for a mixing valve and two heaters, and their controls, as well the relative ease of providing the convective fluid at a constant flow rate from fan 46. Again, cooling can be provided by either another fan or by a two position fluid flow valve and a duct divider.

The convection fluid, as heated by the heater, is provided to a PCB processing chamber 24 to dynamically change the temperature of the convective fluid provided around a PCB therein to thereby subject it to the desired temperature profile within the ranges shown in FIG. 3. A chamber 24 with a convective fluid that is warmer than the PCB will warm the PCB; a chamber 24 with a convective fluid that is cooler than the PCB will cool the PCB. Because the heat transfer by convection is dominant in the present chamber heating process and follows the convection heat transfer equation given above for the appropriate heat transfer coefficient h, there is a linear relationship between the temperature difference occurring between the convective fluid and a PCB in a chamber 24 and the rate that heat energy is added to that PCB. A chamber 24 of convective fluid changing temperature at 2° C./s (effectively, the fluid plus the chamber distribution plenum) will cause the temperature of a PCB therein to change at 2° C./s. The magnitude of the temperature difference between chamber 24 and the PCB required to heat the PCB at 2° C./s is a function of the thermal mass of the PCB. A higher thermal mass board will require a greater temperature difference between chamber 24 and PCB to meet this heating rate; a lower thermal mass board does not require as great a temperature difference.

The thermal mass of distribution plenum 27 of a chamber 24 is of concern because of how much changes in power (heat) input will in turn change the temperature of the plenum. How quickly changes in the temperature of the plenum can be effected determines how quickly the board temperature can be affected because of the 1 to 1 ratio in heating rates indicated above. The change in temperature of plenum 27 is a function of (a) how much heat energy is put into the plenum (power applied) as shown by $$(T_{final} - T_{initial})/t = \frac{q}{m \cdot C_p}$$

where the rate of change in temperature of the plenum, $(T_{final} - T_{initial})/t$, is a function of the rate heat is put into the plenum, q (power applied), and the mass and thermal properties of the plenum, $mC_p$, (thermal mass), and of (b) how much heat energy is lost to the plenum as the heat energy passes therethrough (determined by its thermal mass).

This latter relationship is expressed as a heat energy transfer rate balance equation for chamber 24 and a PCB therein as $$\underbrace{q_{into\ air} + q_{into\ heater}}_{q_{outside\ of\ chamber}} = \underbrace{q_{into\ plenum} + q_{lost\ from\ plenum} + q_{into\ pcb} + q_{exhausted}}_{q_{inside\ of\ chamber}}$$

The $q_{outside\ of\ chamber}$ has two contributions involving the rate at which heat energy is added to the convective fluid that is passing through the heater, and the rate at which heat energy is added to the heater structure and housing. Given an airflow of 15 CFM (based on the flow rate of 1800 SCFH used above with the heaters but for the one plenum considered here rather than the two used in a chamber), the heat transfer rate into the convective fluid, here assumed to be air, $q_{into\ air}$, can be calculated as a function of power applied to the heaters. Likewise, based on empirical experience, the heat transfer rate into the heater structure and heater housing, $q_{into\ heater}$, can be estimated as a function of power applied to the heaters.

The $q_{inside\ the\ chamber}$ represents where and the rate at which heat energy from the convective fluid goes, and has four contributions. The $q_{exhausted}$ is the rate that heat left in the air goes out after heating up the plenum and the PCB thereby and, of course, the $q_{into\ pcb}$ is rate at which heat is taken up by the PCB next to the plenum. The $q_{into\ pcb}$ and $q_{exhausted}$ terms can be summed together to be combined into a single term, $q_{air\ after\ it\ passes\ through\ the\ plenum}$. As indicated above, the PCB temperature will change at the same rate as the convective fluid surrounding the PCB. Most profiles described in FIG. 3 fall with in a heating rate of 1 to 4° C./s. An aggressive heating rate would be 4 to 5° C./s.

Two terms in the $q_{inside\ the\ chamber}$ rate remain to be determined. The $q_{lost\ from\ the\ plenum}$ represents the rate at which heat energy is lost from the heated plenum and can be estimated based on convection and radiation heat losses at a given temperature. The temperature of the plenum is estimated to be the average temperature of the air exiting the heater and the temperature of the air reaching the PCB. The losses are the highest when the plenum is the hottest, and therefore the temperature was assumed to be 100° C. above the maximum temperature that a PCB in the chamber is to reach, 225° C., from FIG. 3 and in accord with the earlier estimated maximum temperature difference required. The only remaining unknown, $q_{into\ plenum.}$ can then be calculated from the other above determined rates in the rate balance equation and reduced to a given thermal mass for a given heater power.

Figure 9:
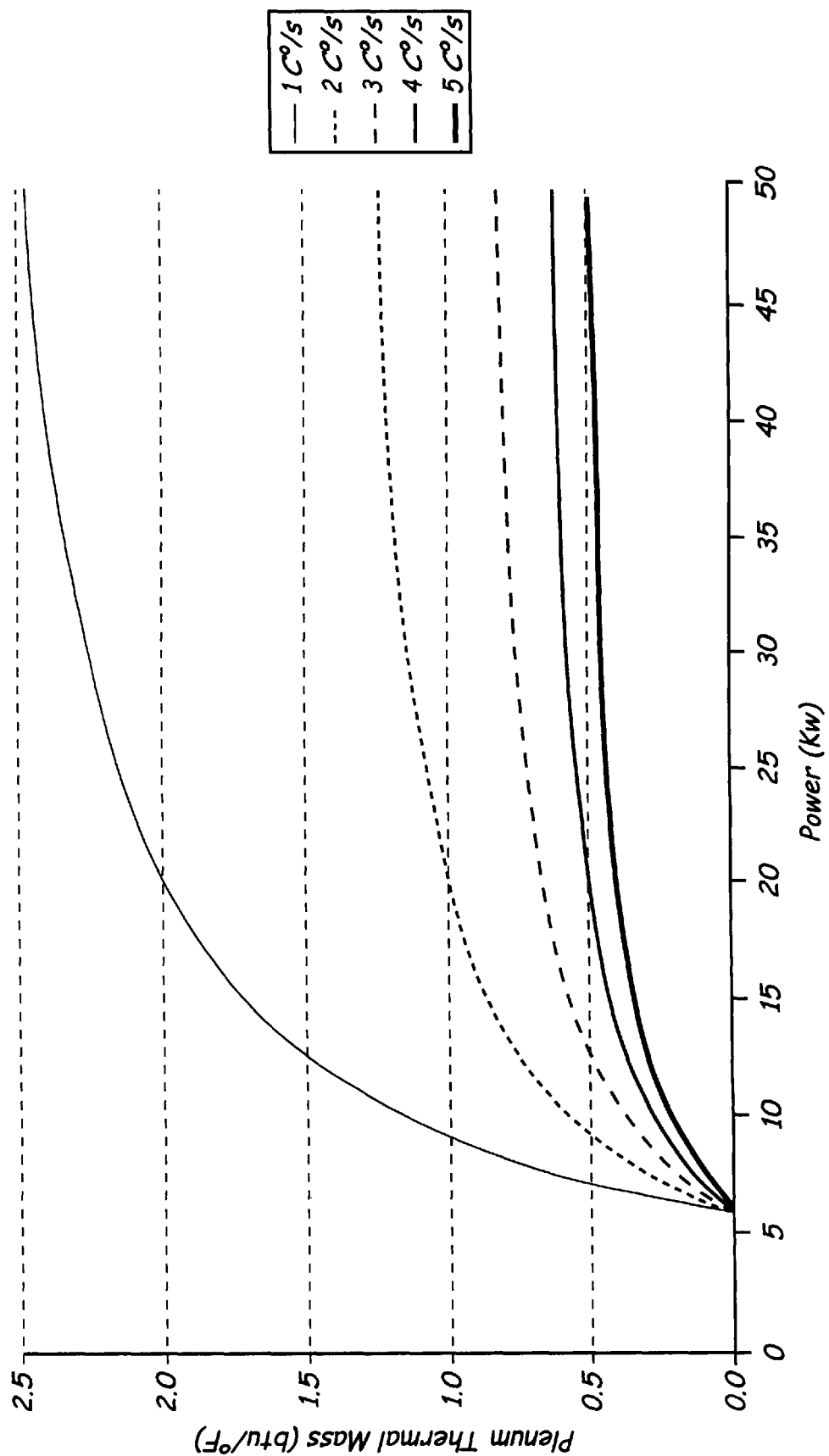
FIG. 9 shows a plot of relationships between plenum thermal mass and heater power for different temperature rate changes.

A graph of multiple solutions showing the relationship between the thermal mass of the plenum and the power of the heaters is shown in FIG. 9 for several different temperature rate changes beginning with the upper plot being for 1° C./s increasing by integer units to 5° C./s for the lowest plot. Two boundaries limit the possible solutions. The minimum heater power is approximately 6 kW given the efficiency of heating air, the losses experience into the heater housing, and accounting for an industry acceptable =10% low line voltage condition. As the thermal mass of the plenum increases, the heater wattage must also increase to affect the desired change in plenum temperature. This solution begins to experience diminishing returns because the size of the heater, and the heat lost to the heater and heater housing become the dominant losses in the system rather than the thermal mass of the plenum. Examining the more aggressive heat transfer rates of 4 and 5° C./s graphically yields respective thermal masses of 0.5 and 0.6 btu/° F. for a 50 kW heater. A thermal mass reduction of only 10%, or thermal masses of 0.45 and 0.54 btu/° F. graphically yields a heater power of approximately 30 kW for the same heat transfer rates. This is a much more reasonable heater power with for a minor reduction in thermal mass. Given a heater wattage of 30 kW, the data points for the thermal mass of the plenum can be curve fitted to a closed solution defining the relationship for the maximum thermal mass of the plenum as a function of the desired rate change of temperature:

Maximum Thermal Mass (30 kW)=0.0188(° C./s)$^4$−0.2827(° C./s)$^3$+1.6018(° C./s)$^2$−4.2402(° C./s)+5.1636

Other such solutions can be created from the graph for different heater powers (watts).

Figure 10:
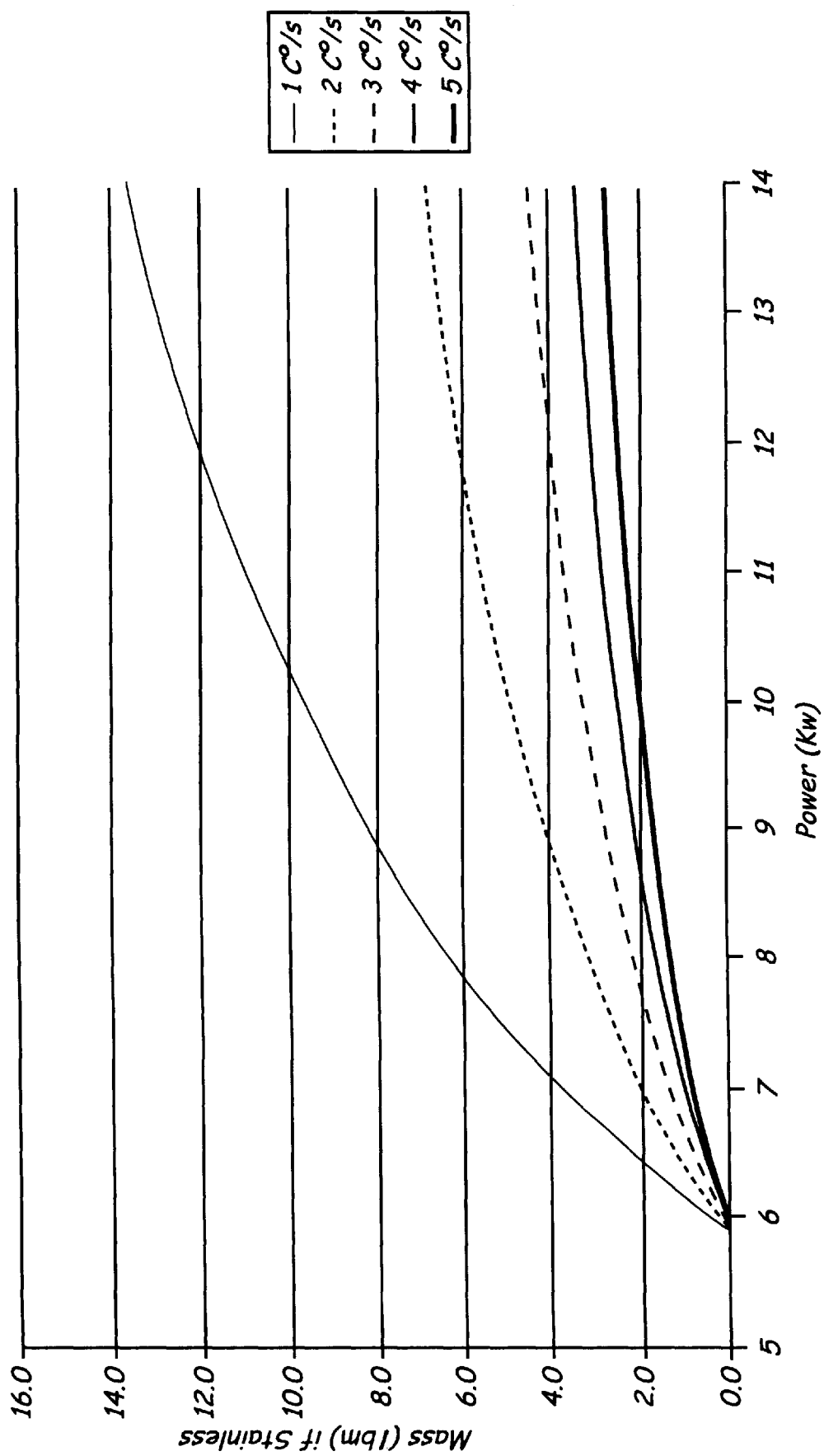
FIG. 10 shows a plot of relationships between plenum mass and heater power for different temperature rate changes.

The well known 300 series stainless steels are an obvious choice for the material needed to build the plenum distribution system because of their general availability, excellent strength vs. mass properties, relatively low thermal mass, low coefficient of thermal expansion and relatively low cost. Using the specific 304 stainless steel material properties ($C_p$=0.12), the graph of FIG. 9 is presented again in FIG. 10 for this particular material showing the relationship between the mass of the plenum and the power of the heaters for several different temperature change rates. Reducing the heater power to 10 kW for half a chamber (one plenum) in accord with the heater power chosen above to meet an aggressive rate of temperature change of 4 to 5° C./s while not exceeding the permitted maximum system current draw, the mass of a single plenum needs to be between 2 and 2.75 lbm. Adding the industry expectation of the capability of at least a 14×18 in. board size, a 16×22×1 in. (780 in$^2$) stainless steel box with a mass of 2.75 lbm has a maximum average material thickness of 0.013 in. The plenum wall structures will, in at least some locations, necessarily have to be thinner than 0.009 in. as structural members and intermediate layers used therewith for achieving uniform distribution of convective fluid flow will also contribute to the mass which must nevertheless remain in the above range to be suitably responsive to demanded temperature changes.

Other strategies may affect this rate change balance; the most obvious is a radical improvement in the heating efficiency of the heater, which would increase the output of the heater while minimizing additional losses outside the chamber. Another strategy is starting with stored energy inside the chamber (a starting temperature of the chamber greater than ambient.) Such a strategy simply becomes a compromise between the traditional heat transfer mode of a heating zone at a stable elevated temperature and heat transfer with a dynamically changing temperature.

Figure 11:
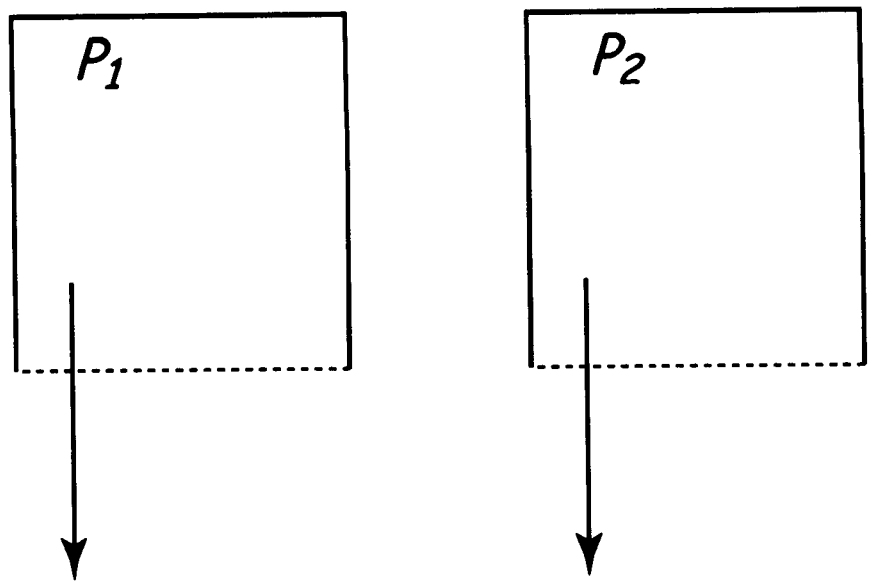
FIG. 11 shows a schematic diagram of fluid flows in alternative plenums.
Figure 12:
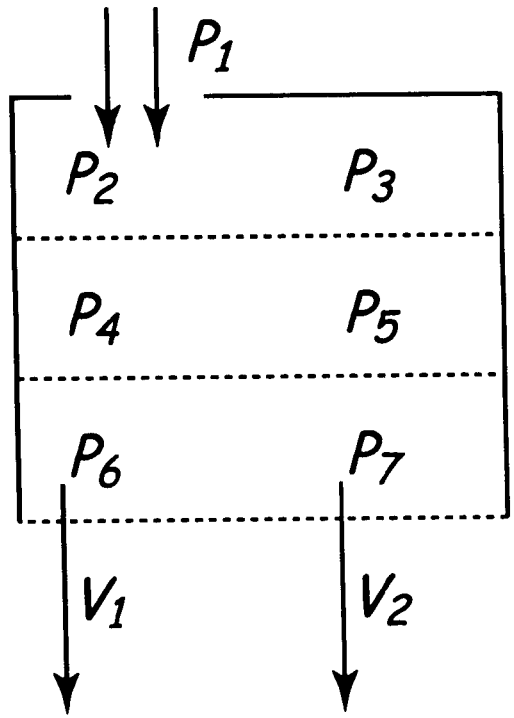
FIG. 12 shows a schematic diagram of fluid flows in combined plenums.

Achieving such uniform distribution of convective fluid flow to thereby heat all areas of a PCB in a chamber uniformly is critical so all the solder present melts and forms consistent good quality joints between the circuit components and the board interconnection paths. To transfer the heat to the board uniformly, the convective fluid flow needs to impinge on the board at the same velocity and angle at all points. Air as the convective fluid is distributed in the present oven 20 from a high-pressure plenum to lower pressure chamber cavity in which the board is ensconced. If the pressure drop across the same geometry (hole pattern) is identical, the velocity of air through the holes in the lower plenum wall represented by a dashed line will be the same as indicated in FIG. 11. In a typical previous in-line reflow oven 10, forcing the convective fluid through a series of plenums with holes in the lower walls thereof as represented in FIG. 12 creates the uniform flow, but each such plenum adds a volume and a mass associated with it to the total plenum volume and mass. The added mass and volume is not a problem in the typical previous oven because the corresponding heating zone comes to an equilibrium temperature during oven operation. However, in the chambers of the oven of the present invention, each distribution plenum that is added decreases the temperature responsiveness of the heating system to convective fluid temperature changes because of the added volume and mass. Increased volume due to multiple plenums would mean increased residence time for the heated convective fluid as the fluid takes longer to get from the heater to the board because of the longer flow path and greater flow resistance. Increased mass due to multiple plenums would lead to the chamber heating up and cooling down at slower rates than the PCB therein.

Figure 13:
FIG. 13 shows a schematic diagram of fluid flows in a duct.
Figure 14:
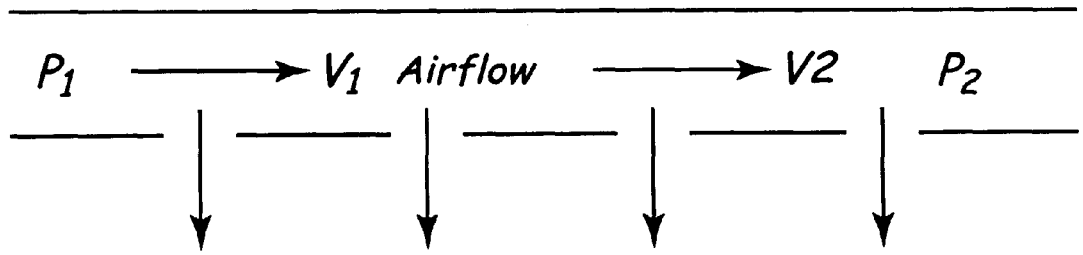
FIG. 14 shows a schematic diagram of fluid flows in a duct with openings therealong.
Figure 15:
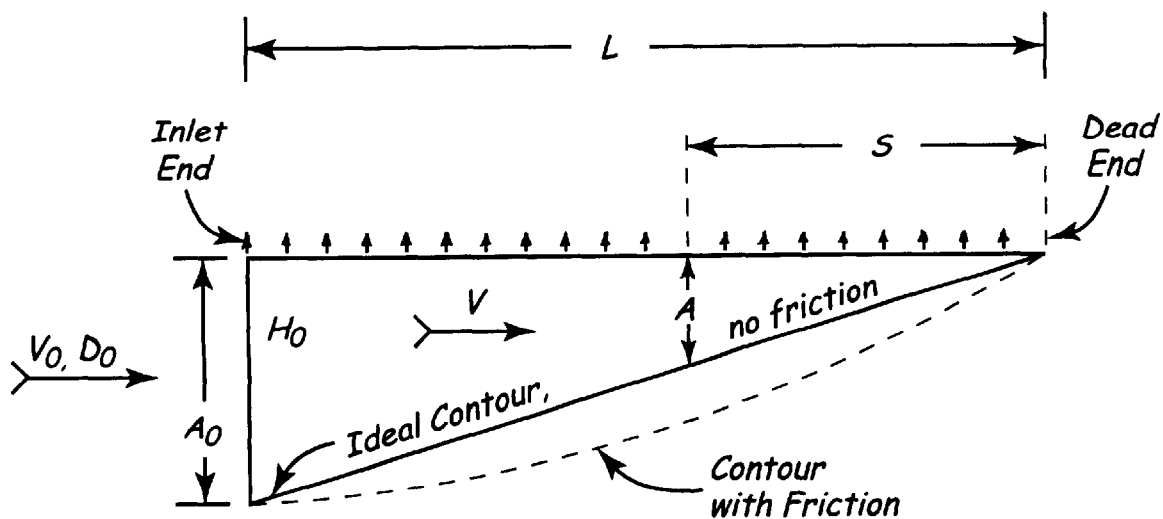
FIG. 15 shows a plot of fluid flows in a varying cross section duct with openings therealong.
Figure 16:
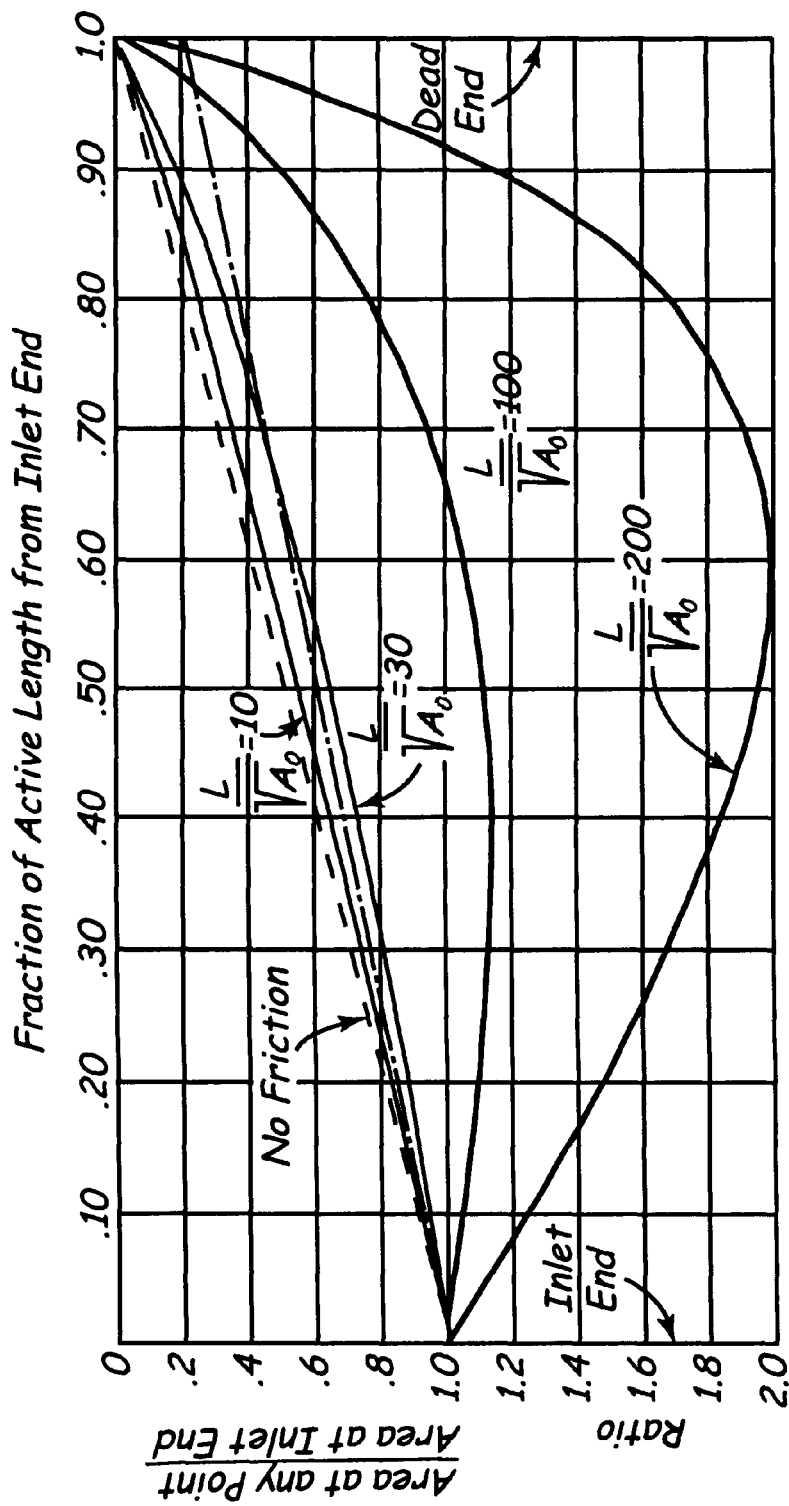
FIG. 16 shows a plot of fluid flows in a varying cross section duct of constant width with openings therealong.

As the convective fluid is moved through ductwork from the heater to the plenum and that ductwork forming the plenum itself with a closed end, the fluid pressure drops due to frictional losses as indicated in the duct represented in FIG. 13. If there is also flow out of the duct en route due to openings therein, the fluid pressure increases because of the loss of fluid velocity in accordance with Bernoulli's equation as indicated in the duct with holes represented in FIG. 14. By varying the duct cross sectional geometry, the pressure decrease due to friction and the pressure increase due to velocity drop can be counterbalanced resulting in equal pressure and flow as indicated in the plot of FIG. 15. Properly designed duct and hole patterns distribute the air uniformly without large pressure drops or added plenum volume. For a rectangular duct of constant width, W, and variable height, H, the value of H must vary with, S, the distance from the duct closed end as indicated in the plot of FIG. 16 in accord with the known equation $$H = Se^{KS}\left[C - Kb\left\{\log e(S) + KS + \frac{(KS)^2}{4} + \frac{(KS)^3}{18} \ldots\right\}\right]$$

where K=fg/2W, f=friction, g=gravity and C is a constant calculated when h=h$_o$ and S=L. This equation can be approximated accurately by a round duct's changing cross sectional area of A, the graphs in FIG. 16 showing the solutions for several ratios of $L/\sqrt{A_o}$, where L is the length of the duct and $A_o$ is the area at the inlet end. Similarly, the height H can be held constant with the width W varying as a function of S, i.e. the variables H and W can be interchanged in the above equation.

The convective fluid plenum distribution system for chambers 24 of oven 20 of the present invention has, in the first stage, a feeder duct of more or less a rectangular cross section to distribute the convective fluid flow to six "finger" ducts extending approximately perpendicularly therefrom all determined substantially on the foregoing basis. The geometry of a varying, but substantially rectangular, cross section for ductwork can be simplified by holding one dimension thereof constant and only varying the other. The finger ducts, in being longer than the feeder duct, would require starting with too great a width dimension for the space constraints of the plenum at the points where they join the feeder duct to provide the necessary finger duct inlet area $A_0$ to meet the requirements for uniform flow if a constant height was chosen for them. So, the fingers are instead formed with a constant width and varied height. Given that the most easily manufactured fingers would result from having all six fingers dimensionally identical, including length, all the fingers would have the same height and width at their inlets. A feeder duct of varying height would be difficult to interface with six fingers each of constant height, so the feeder duct is formed with a constant height and varied width. The interface between the fingers and the feeder duct was further simplified by varying the cross section of the feeder duct through inwardly narrowing only one side of the feeder duct opposite the side to which the fingers are joined to thus ensure that the finger and feeder ducts join at the interface therebetween at a 90° angle.

The size of a chamber 24, and so the size of its plenum, set the needed length dimension for the feeder duct length. The ductwork requirements for the efficient transport of the convective fluid from the heater to the feeder duct set the inlet area needed for the feeder duct leading to $L/A_o^{1/2}=16$. This ratio allows choosing the initial dimensions for the feeder duct from the plot in FIG. 16 approximating the last equation through interpolating a curve on the plot using this duct length to inlet area ratio. Thus, a curve was found on this plot by interpolation based on this ratio for the width dimensions of the feeder duct as a function of the distance from the duct closed end, and a nonlinear regression analysis was undertaken to obtain the second order curve that best fitted this interpolated curve as the duct dimension curve to be followed in forming the feeder duct which was found to be $W=-0.29S^2-0.72S+1.0016$.

However, the feeder duct built following this equation did not result in the pressures being equal at the openings where the finger ducts are to join that feeder duct. Varying the width of the duct to try achieving such equal pressures led to a changed geometry feeder duct represented by a second order curve best fitted to the data giving width dimensions as a function of the distance from the duct closed end as $W=-0.53S^2-0.35S+1$. Feeder ducts constructed following this curve provided the desired fluid pressure at each finger duct opening and all substantially equal to one another. In addition, the ratio of the two curve equations can be considered as providing a transfer function for designing closed end ducts having more accurately equal fluid pressures at openings therein than are provided from the plots of FIG. 16 while allowing an initial duct configuration to be obtained based on using those plots, or $$Tfrfcn = \frac{-.53S^2 - .35S + 1}{-.29S^2 - .72S + 1.002} = \frac{1.82759(-1.08255 + S)(1.74292 + S)}{(-.993838 + S)(3.4766 + S)}.$$

Thus, the finger ducts also have the needed lengths thereof set by the chamber, and so plenum, sizes, and the finger ducts must have the necessary finger duct inlet area $A_0$ to meet the requirements for uniform flow. These requirements lead to a ratio of $L/A_o^{1/2}=30$ for the finger ducts. FIG. 16 yields from this a curve for the height dimensions of the feeder duct as a function of the distance from the duct closed end being $H=-0.53S^2-0.45S+0.99$. Using the above transfer function with this last equation gives the result for the finger ducts of $$H = \left[\frac{1.82759(-1.08255 + S)(1.74292 + S)}{(-.993838 + S)(3.4766 + S)}\right] * (-.53S^2 - .45S + .99)$$

$$= \frac{-.968623(S - 1.00661)(S + 1.74292)(S + 1.85566)}{(S - .993838)(S + 3.4766)}.$$

The varying height of the finger ducts was tapered through a spline to the closed end of the duct in constructing them. The distribution of pressures in the finger ducts constructed on this basis is acceptable. Velocity and kinematic viscosity will increase as the temperature of the convective fluid increases. Assuming the warm flow is more uniform because small pressure differences become less significant as a percentage of the total pressure, the uniformity results with warm fluid should be better than with cooler fluids.

Building the entire plenum out of very thin stainless steel foil would be structurally similar to a Mylar balloon—weak. Some structural strength is required to fasten the foil (to which the feeder duct and finger ducts are spot welded) in minimal tension to keep it from wrinkling and holding it flat as well as insuring repeatability in dimensional integrity. A 0.015" thick stainless steel frame is used to define and support the plenum perimeter having the shape of an open center rectangular shell of a relatively small depth. Thus, two four-sided rectangles with sides joined at the corners are provided as half frames each having a flange extending at right angle inwardly a short distance along one edge and another flange extending at right angle a short distance outwardly along the other edge. A full frame is provided by welding together the outwardly extending flanges to form a centered seam.

There are several alternative configurations for low mass stainless steel plenums, 50, using such a frame therein, and the resulting oven chambers 24 formed by them. In the first, plenum 50 is manufactured in two similar halves. In the first half of a plenum, or the heating half of the plenum, a hot air feeder duct, 51, and six finger ducts, 52, are welded to a stainless steel perforated foil, 53, and joined together at the finger duct openings in feeder duct 51. This perforated foil is welded to a half frame inwardly extending flange for positioning in a completed chamber nearest to PCBs, 54, that are in the chamber for processing in that chamber to get heat to such PCBs as fast as possible and to add some structural strength to that foil to aid in holding it in place during PCB processing. The second half of the plenum, or the cooling half of the plenum, comprises a cold air feeder duct, 55, and six joined finger ducts, 56, welded to another stainless steel foil, 57, that serves as the solid back of plenum 50 which is welded to the other half frame inwardly extending flange. Welding these two plenum halves together by welding the half frames together at their outwardly extending flanges, as indicated above, forms a single heating/cooling plenum supported on a completed frame, 59, with perforations in finger ducts 52 and 56 allowing the convective fluid represented by arrows to be transported into the plenum or mixing space between the two plenum halves to reach the perforations in perforated foil 53 closest to PCBs 54 in the chamber.

Figure 17:
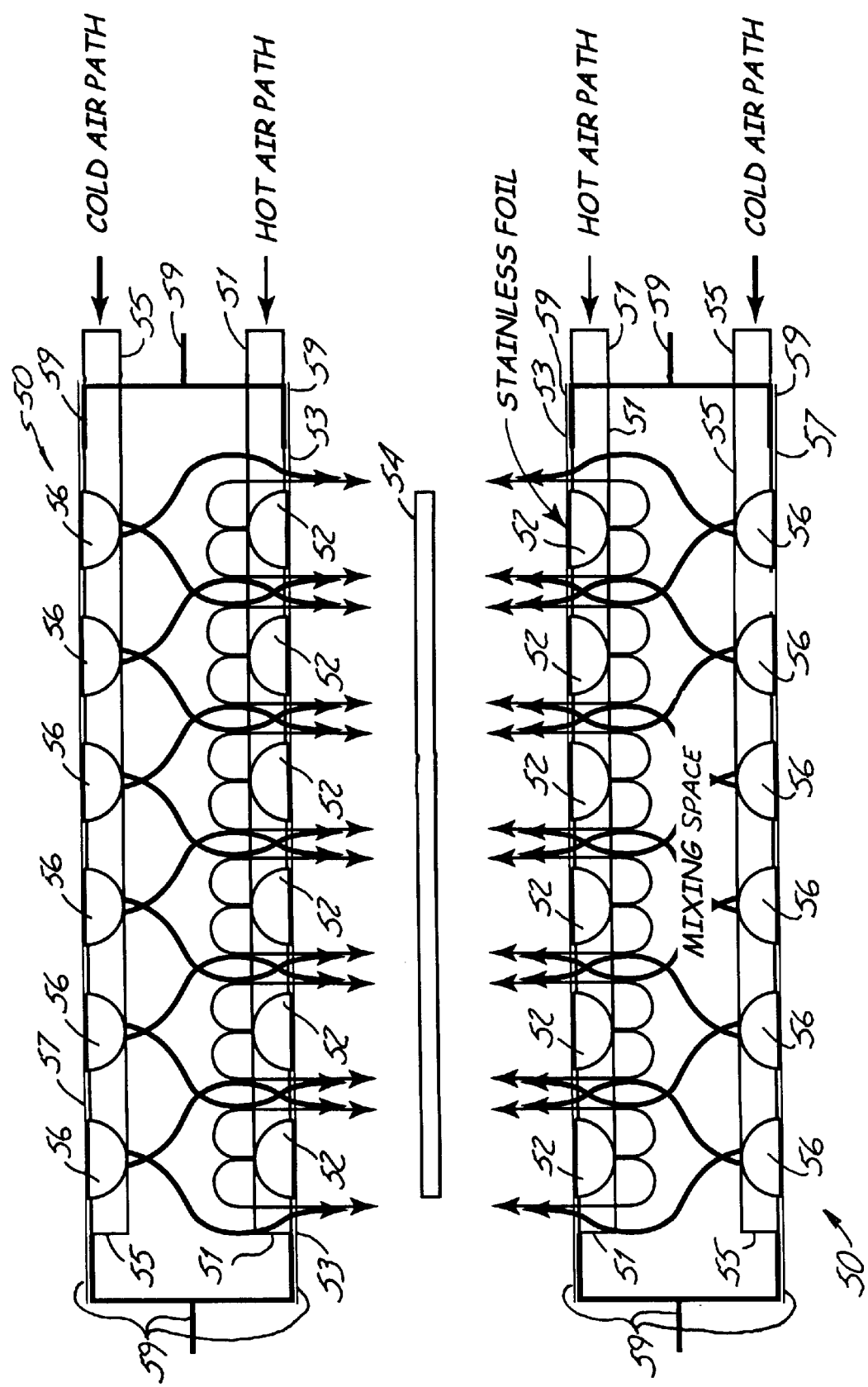
FIG. 17 shows a cross section view of a plenum arrangement for a oven chamber.
Figure 18:
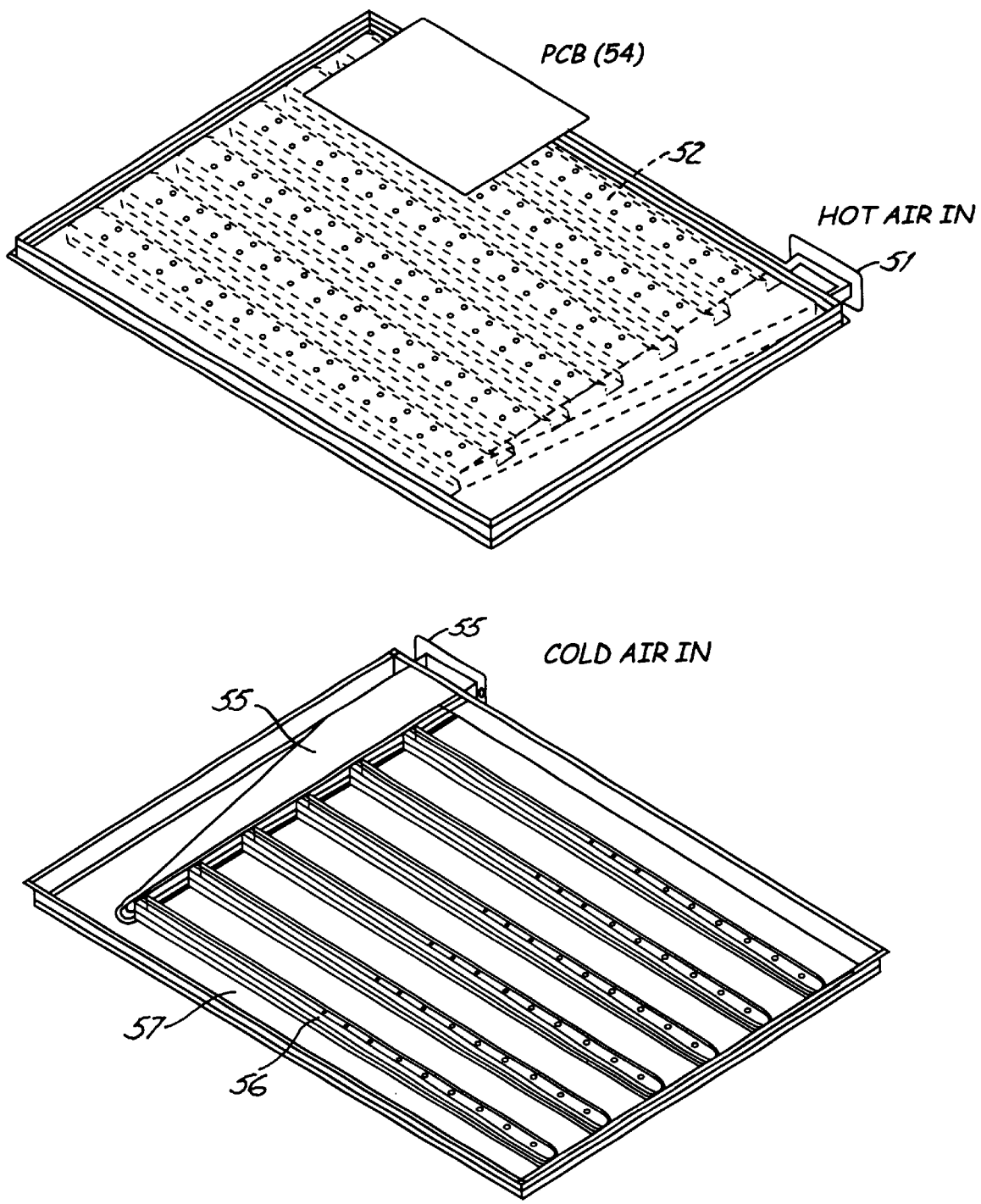
FIG. 18 shows an perspective view of a plenum of FIG. 17 partially disassembled.

Two such heating/cooling plenums 50 are required per chamber 24 to have one on a first side of a PCB in that chamber indicated by the outlined rectangle (and supported on a conveyor not shown) and to have one on the other side of that PCB, as shown in FIG. 17, with a door at one end of the chamber frame of the chamber (not shown) to provide access to the interior space of the chamber between the upper and lower plenums for a PCB. A separate heater is provided for each upper and lower heating plenum to supply the hot convective fluid thereto but at opposite ends so that any nonuniformities in the finger ducts tend to cancel because of the symmetry. A lower plenum 50 of such an arrangement is shown in the perspective view of FIG. 18 with the lower heating and cooling plenum halves separated from one another.

Figure 19:
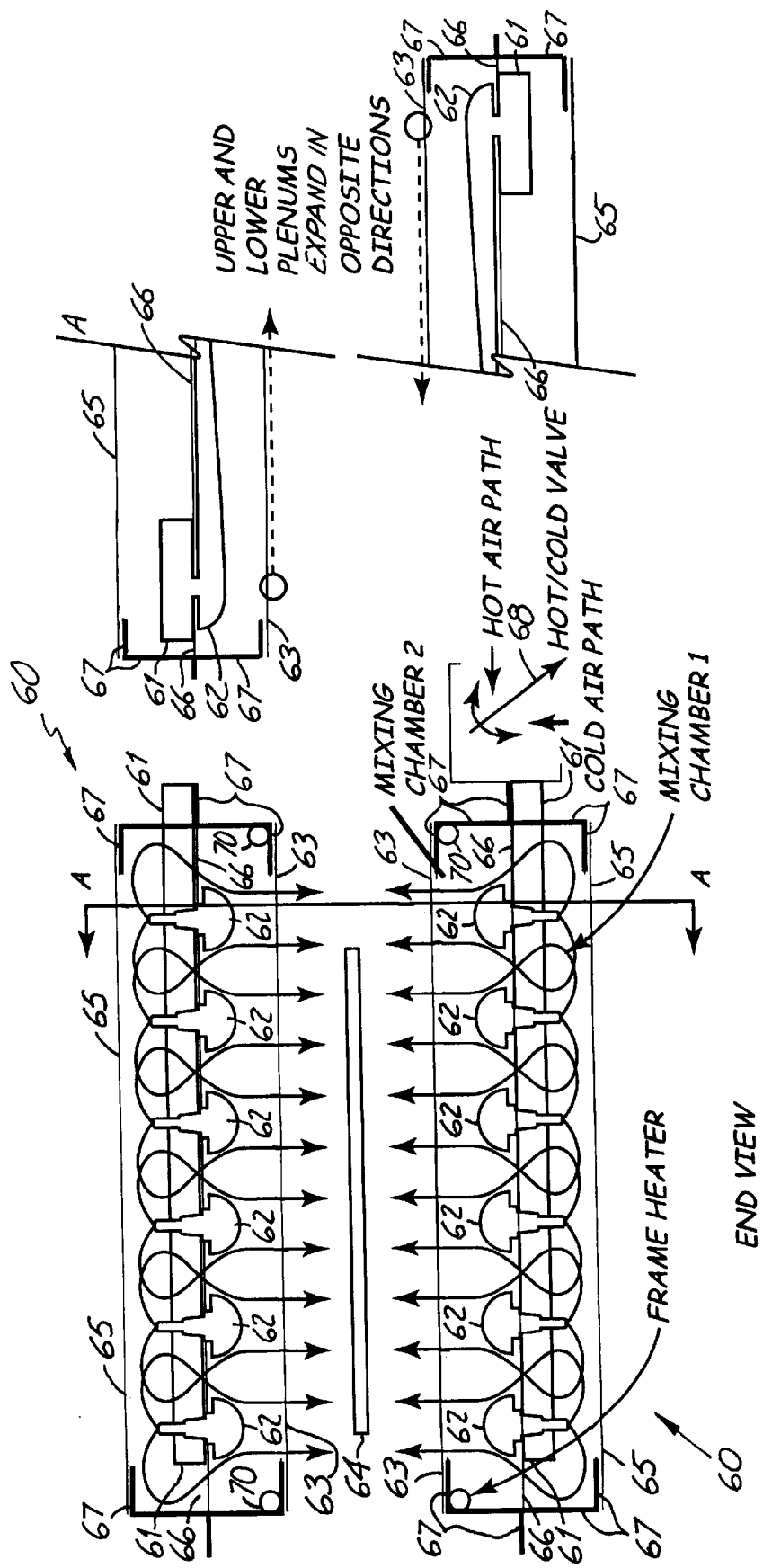
FIG. 19 shows a cross section view of an alternative plenum arrangement for a oven chamber.

In a second configuration, six finger ducts, 62, are mounted on an additional third stainless steel foil at the frame sides centered seam to be between the perforated foil, 63, nearest the PCBs, 64, and the back foil, 65, for the plenums and in the center of the plenum which is also perforated, i.e. the perforated center foil, 66. This perforated center foil is thus located in a position comparable to being located between back foil 57 and perforated foil 53 nearest a PCB 54 in processing in the chamber of the previously described plenum 50 of FIG. 17, and feeder duct 61 is welded on the side of center foil 66 opposite the side thereof on which six finger ducts 62 are welded as shown in FIG. 19. Mounting feeder duct 61 on opposite sides of center foil 66 from six finger ducts 62 has the advantage of controlling the interface between feeder duct 61 and each of fingers ducts 62 by a corresponding orifice in center foil 65 rather than needing to attach each of fingers 62 directly to feeder duct 61. Perforated foil 63 is welded to a half frame inwardly extending flange and back foil 65 is welded to another half frame inwardly extending flange. Center foil 66 is welded to an outwardly extending flange of one of the half frames, and the two half frames are welded together at their outwardly extending flanges to form a full frame, 67. Feeder duct 61, finger ducts 62, and foils 63, 65 and 66 are all made from 0.002 in. thick stainless steel and frame 67 is made from 0.015 in. thick stainless steel (304 stainless steel).

Perforations in center foil 66 across from finger ducts 62 allows the convective fluid to be transported into a first plenum space between center foil 66 and back foil 65. Perforated center foil 66 has additional perforations outside areas thereof across from finger ducts 62 forming a distribution orifice array that allows the convective fluid in the first plenum space to be further transported into a second plenum space between center foil 66 and perforated foil 63 closest to PCBs 64 in the chamber (supported on a conveyor not shown) to thereby improve air flow uniformity by use effectively of a series of two plenums in the convective fluid flow path.

This triple foil, single set of feeder duct and finger ducts results in plenum 60 having only one set of interconnected distribution ducts therein in contrast with the two sets used in previously described plenum 50 of FIG. 17. Again, two such heating/cooling plenums 60 are required per chamber to have one on each side of PCBs 64 undergoing processing therein, and again a door at one end of the chamber frame of the chamber (not shown) to provide access to the interior space of the chamber between these two plenums.

Because these plenums 60 respond so rapidly to temperature changes in the convective fluid, the cooling and heating fluids can be routed through the same distribution ductwork feeder duct 61 and finger ducts 62. This causes a slight delay between the end of heating and the start of effective cooling as feeder duct 61 and finger ducts 62 must cool, but this adverse effect is somewhat offset due to the lower mass of plenum 60 because an entire set of distribution ductwork used in the previously described plenum 50 configuration is eleminated. However, an additional valve, 68, is required between the heater and plenum 60 to switch between hot and cold convective fluid results in an effective cooling delay further compounded by the value mass added to the chamber. A reliable, low mass, valve that operates at the temperatures directly downstream from the heater is a difficult and expensive to provide item.

A possibly easier alternative is to use a separate flow path for the cooling convective fluid, and this arrangement forms a third plenum, 60', configuration shown in FIG. 20. Uniform heating of PCBs 64 being processed in the chamber is critical so that all the solder thereon is reflowed and the joints between the circuit components and the board interconnections are formed reliably. Once the solder joints are formed, however, the remaining temperature profile needs only to be controlled to the point where rapid cooling does not overstress sensitive components. Since the cooling of PCBs need not be as uniform as the heating, the cooling fluid, rather than entering into the chamber through feeder duct 61 as does the heating fluid, can be introduced directly into the first plenum space between center foil 66 and back foil 65 through a cooling feeder duct, 69, and so bypass heating feeder duct 61 and finger ducts 62 altogether. This flow path has smaller pressure losses and so the flowrate from the fan is increased to improve the cooling rate. Otherwise, this plenum 60' configuration is like that of the second plenum 60 configuration described above and shown in FIG. 19, and two of them again are used above and below the path of PCBs 64 in providing an oven chamber 24.

The warping of the perforated foil closest to the PCBs during processing, and of the backing foil, because of expansion during heating is more evident in these latter two plenum configurations of FIGS. 19 and 20 because the structural strength added by the finger ducts in the first plenum configuration of FIG. 17 is no longer present in the absence of further measures being taken in this regard. The root cause of such warping is frame 67 used in supporting these plenums 60 and 60' expanding at a slower rate than these foils because of it being more massive. A supplemental heater, 70, is thus added to frame 67 to heat it up in advance of the heating of the foils as indicated in FIGS. 19 and 20. This kept the foils under tension and flat. Temperature differences were used to create the tension rather than direct mechanical means because changing the temperature differences easily and simply varies the tension, and the tension will remain reletively constant regardless of the expansion of the foil.

Direct mechanical means for tensioning, such as springs, are more practical if needed to keep the foil flat while the oven is cold should the initial state of the plenum have tension inconsistencies due to manufacturing differences. Such means would eliminate the need for powering the frame heater if there are no PCBs in the oven for processing. Using such direct mechanical means to keep the foil flat during heating is possible but would add mass to the chamber even if the majority of the mechanical means mass could be added outside the chamber with connector links to the plenum established. Also, mechanical tension created by springs is proportional to the distance the spring is extended or compressed. As the plenum expands, the tension would be reduced. This is exactly the opposite effect that is desired. Alternatively, tension created by air cylinders does remain constant relative to the air pressure, but this would be an expensive and complicated arrangement.

Subjecting plenums 60 or 60' to repeated heating and cooling cycles can result in permanent yielding of the plenum structure. This result can be avoided by adding holes to center foil 66 around the perimeter of the plenum to direct supplemental convection fluid heating and cooling to the frame. This helps minimize temperature differences between the foil and the frame, especially during switchings between heating and cooling. Further, a corner gusset added to the frame with the corresponding heater mounted to the gusset, but away from the 90° corner, results in the gusset serving as a frame stiffener to add strength where yielding would otherwise occur. The gusset also becomes a heat conduction path to uniformly conduct heat away from the frame heater.

Figure 21B:
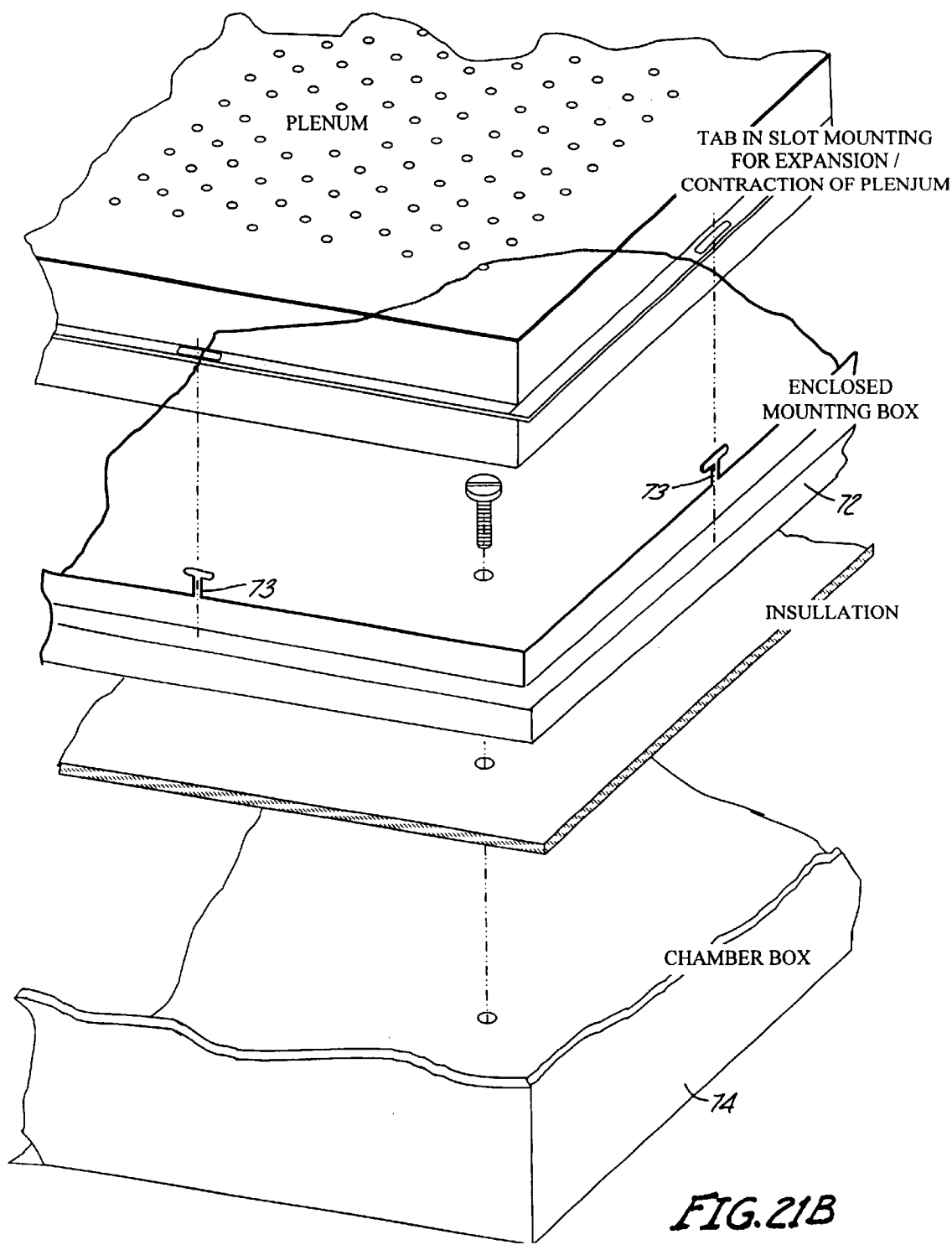
Figure 21C:
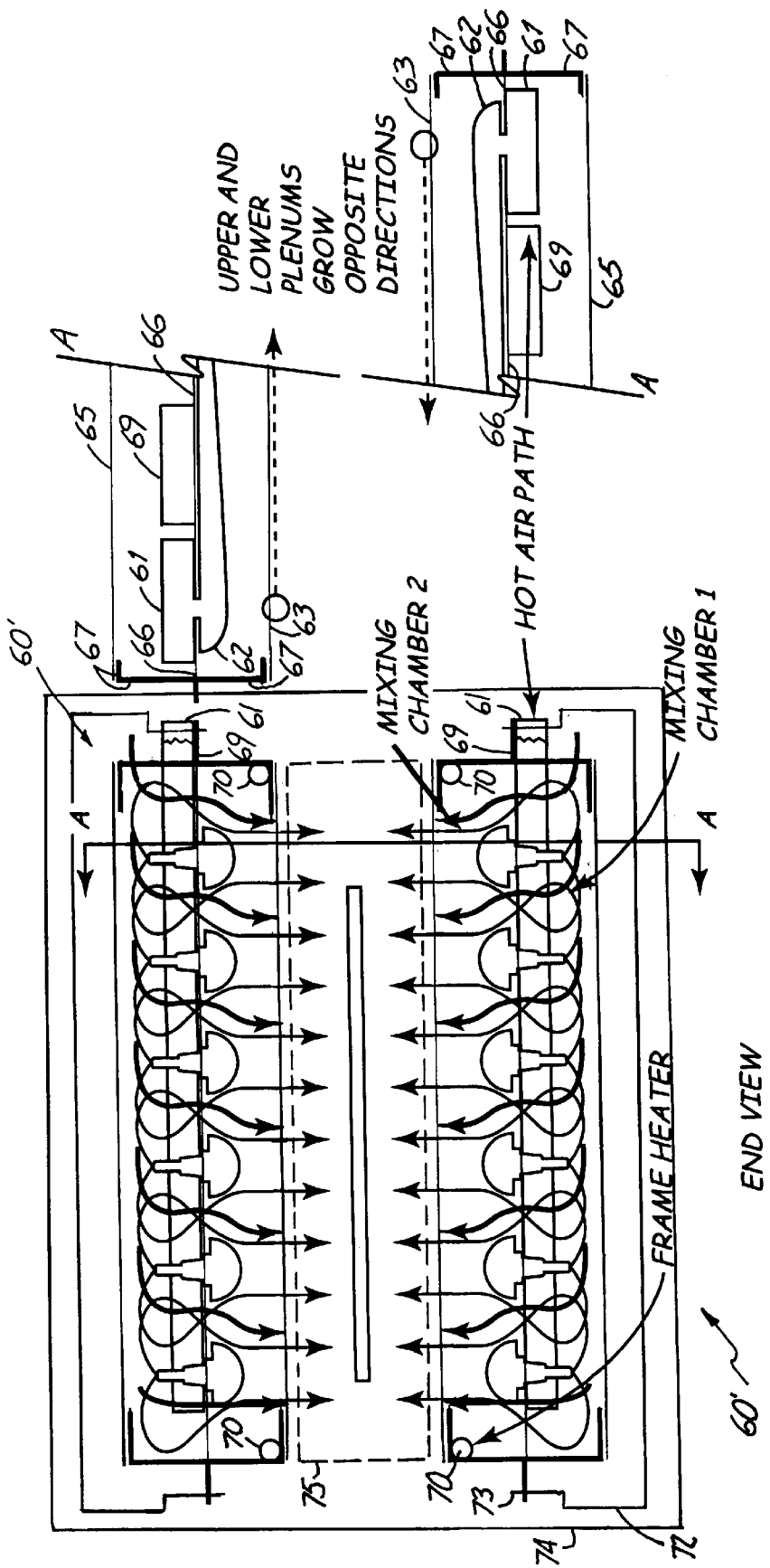

During heating and cooling, plenums 60 and 60' may expand as much as 0.150 in. Plenum mounts allow for this expansion and contraction of the plenums. Slots, 71, are provided through the outside seam flange of frame 67. The plenum is set into a box with its back foil 65 set in turn into a box, 72, supported in the chamber frame in forming a chamber 24, and tabs, 73, extending from the side of box 72 at its edge adjacent the plenum seam flange through these slots are bent over portions of the plenum seam flange to hold the plenum in the plane parallel to the travel of PCBs 64, but to also allow for expansion and contraction, as can be seen in FIG. 21A. FIG. 21B shows the relationship of plenum 60', box 72 and a chamber frame, or container, 74, in an exploded view of a lower fragment thereof. FIG. 21C shows a digrammatic overview of this relationship with the chamber door, 75, shown in dashed lines.

As indicated above, the optimum average heat transfer coefficient that maximizes heat energy transfer to a moving film requires, for a rectangular grid hole pattern positioned to provide a 1 in. distance to PCBs, a hole diameter of 0.184 in. spaced 1.423 in. apart. The heat energy transferred changes dramatically radially outward from the center of each such hole serving as the source of a convective fluid impingement jet. In the first plenum 50 configuration having finger ducts 52 attached to the back of perforated foil 53 closest to the PCBs 54 undergoing processing, i.e. the exit foil, variations to the hole pattern therein were limited because holes could only be placed between those finger ducts. Removing the finger ducts from the exit foil as described for the second and third plenum 60 and 60' configurations allows optimization of the hole pattern in exit foil 63 for stationary PCBs 64 undergoing processing.

Such radial heat transfer gradients can be reduced by modifying the above described hole pattern through decreasing the hole diameter and increasing the number of holes provided which are spaced closer together. The hole diameter/distance between holes ratio must be kept less than 6 as outlined in the following portion concerning the removal of convective fluid after its impingement on PCBs undergoing processing. The hole diameter was reduced to 0.093 in. and the distance center to center of these holes in a rectangular grid pattern was set to be 0.707 in. Also, the hole pattern of exit foil 63 in the plenum above PCBs 64 in the chamber undergoing processing is offset from the hole pattern of exit foil 63 in the plenum below these PCBs.

Although PCBs 64 undergoing processing could be moved a very small amount during such processing to further reduce the temperature differences on those PCBs resulting from the radial heat transfer gradients of the convective fluid impingement jets, the expansion of plenums 60 or 60' due to heating generates sufficient relative motion between the hole patterns in exit foils 63 of the plenums and those PCBs. The hole pattern just described for exit foils 63 in the plenums 60 and 60', and the offset of the holes in exit foil 63 of the upper plenum with respect to the holes in exit foil 63 of the lower plenum results in a distance between the center of an upper plenum convective fluid jet and a lower plenum convective fluid jet of 0.300 in. As indicated above, the upper and lower plenums 60 or 60' and their exit foils 63, in being mechanically unrestricted because of using the plenums supported on bent tabs 73 in a box 72, can each expand from 0.100 in. to 0.150 in. during heating cycles. The mechanical constraint point of plenums 60 or 60' is where the convective fluid input ducts are located since the plenums are there mechanically attached to the ductwork leading to the convective fluid sources. Both the heating input and cooling input of a plenum 60' were located adjacent to one another toward one end of the plenum to thereby provide a single rigid mounting location for each plenum at just that one end thereof. Constraining one end the lower plenum 60' only near the door end of chamber 24 and the upper plenum 60' only near the opposite end of the chanber, or the blind end thereof, resulted in sufficient relative motion of upper and lower exit foils 63 to halve again the distance between an upper plenum jet and a lower plenum jet emanating from holes in the foils.

The mounting of plenums 60' in such a manner has an additional advantage. Box 72 that each is supported in described above to allow for expansion and contraction, created an enclosed space that surrounded back foils 65 of plenum 60'. Thus, if repeatability between successive different temperature profiles applied to successive PCBs 64 become a problem because of the heat accumulation in the chamber leading to different starting conditions, that heat accumulation can be flushed out with controlled cool air flows through this box without adversely affecting the temperature of PCB 64 in processing. Thus, the relative motion between the upper plenum exit foil 63 and the lower plenum exit foil 63 due to the expansion and contraction of upper and lower plenums 60', and the above described hole pattern, results in approximately just a 4° C. temperature differential between the center of where a convective fluid jet impinges on a PCB 64 and the coolest spot on that PCB which is the area of the board that is initially between where that convective fluid jet and its nearest neighbors impinge on the PCB. An exploded view of plenum 60' (with outer dimensions of about 19 in. by 28 in.) is shown in FIG. 22 additionally illustrating the foregoing, and the frame corner gussets and added holes for providing supplemental convective fluid to frame 67 mentioned above.

Figure 23:
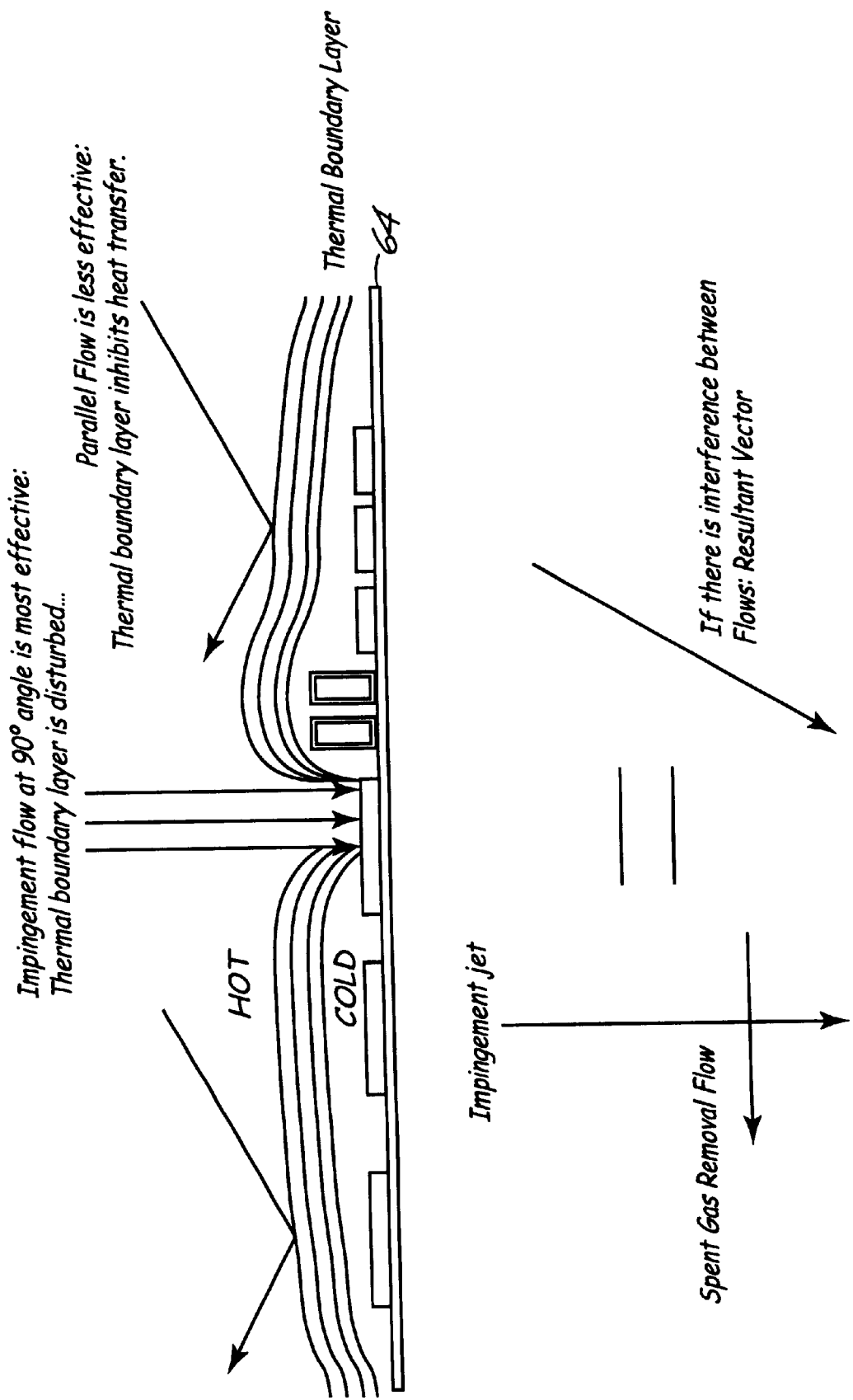
FIG. 23 shows a representation of convective fluid flow about an item heated thereby.

Once the convective fluid has impinged on PCBs 64 positioned for processing in chamber 24 through exit foils 63 of the upper and lower plenums 60', there is a need to remove this fluid. Convection heat transfer is basically conduction heat transfer inside a fluid. Effective transfer occurs only if the hot convective fluid, such as nitrogen or air molecules, makes effective contact with such PCBs. Near a PCB 64 undergoing processing, there is a buffer zone where the temperature is different than the surrounding fluid temperature. This region is termed the thermal boundary layer. Flow perpendicular to the PCB (convective fluid impingement jet flow) has greater effectiveness breaking through this thermal boundary layer. Flows parallel to the PCB (spent, or after impingement, convective fluid removal flow) are not very effective in heating the board because this boundary layer inhibits such flows from contacting the board as indicated in FIG. 23.

In fact, the spent fluid removal flow, formed as a cross flow parallel to the direction of travel of PCBs in being positioned across from exit foils 63, can have a negative effect on heat transfers to a PCB undergoing processing. The highest rate of heat transfer from impingement flow is when the angle between the impingement jet and the product is at 90°. Deviations from 90°, especially when greater than ±15°, cause the heat transfer rates to be sharply diminished as indicated above. Flows parallel to the PCB, i.e. parallel flows crossing through the impingement jets perpendicular thereto, due to the removal of spent fluid can adversely change the angle of the impingement jet flow because the flow reaching the board is calculated by the vectorial addition of the impingement fluid flow and the cross fluid flow as is also indicated in FIG. 23.

Figure 24:
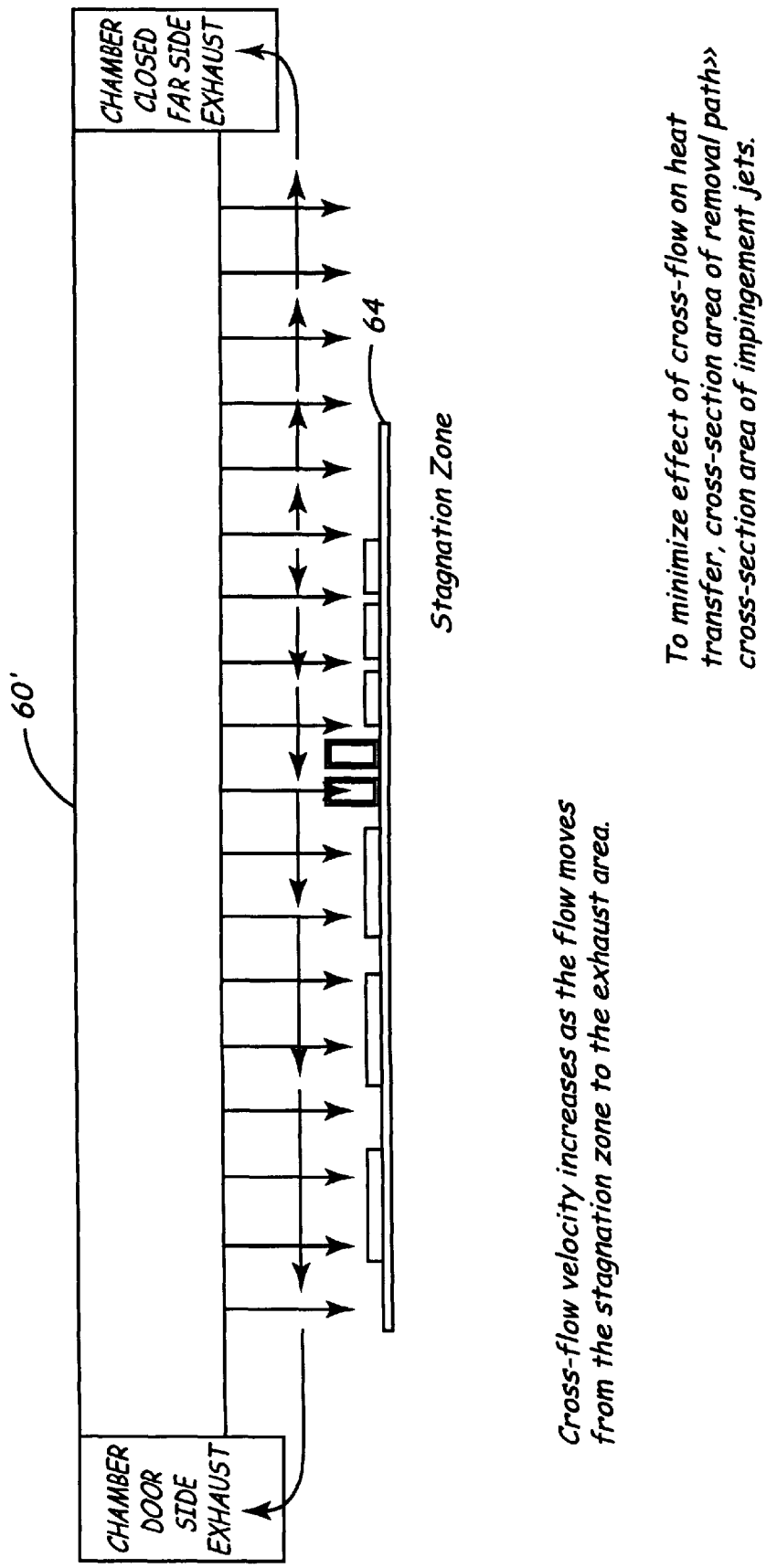
FIG. 24 shows a representation of convective fluid flow about an item heated thereby under a plenum.

High fluid flow velocities in cross flows will have an adverse effect on those impingement jet flows through which such cross flows occur. The velocity of the cross flow is a function of the amount of spent fluid being removed and of the cross sectional area that the cross flow is being sinked through as is indicated in FIG. 24. Increasing the distance between a PCB 64 undergoing processing and an exit foil 63 hole for an impingement flow jet increases the cross sectional area of the space between that PCB and the plenum exit foil, including in a direction oriented toward an exhaust duct through which the cross flow can occur, and which serves to inititate that flow, can thus decrease the velocity of the cross flow. To keep the impingement jet flows oriented within the guidelines of 90°±15°, the velocity of the cross flow is kept under 10% of the velocity of the impingement jet flows. The hole pattern in the plenum exit foil of 605 holes each having a diameter of 0.093 in. results in the exit foil having a total open area of 4.1 in.$^2$, and therefore the cross sectional area through which the spent fluid is removed should be at least 41 in.$^2$ to keep the cross flow velocity about 10% of the velocity of the impingement jet flows. However, sinking the spent gas flow in two opposite directions towards the door and towards the closed far side of chamber 24 halves the flow being sinked through the same cross sectional area, reducing the requirement for a cross sectional area to accommodate the cross flow in either direction to 20.5 in$^2$.

In addition, the maximum velocity of the spent fluid being removed is only reached right before it is exhausted at the sink entrance because contributions to the amount of fluid being removed are continually increased as the spent fluid from more and more fluid impingement jets is collected as that fluid is moving towards the sink entrance. Therefore, the average velocity of the spent fluid is actually half of the maximum velocity attained prior to being exhausted at the sink entrance thereby reducing the cross sectional area requirement to 10 in.$^2$ to maintain the same average flow velocity along the board. Thus, dividing the needed cross sectional area just determined by maximum width of PCBs 64 to be processed in the chamber gives the minimum distance needed between plenum exit foil 63 and PCBs 64 undergoing processing in the chamber, or 10 in.$^2$/14 in.=0.73 in. A distance of 1 in minimum is used to provide some margin for the fluid provided by the fluid impingement jet laterally dispersing after passing through exit foil 63 of plenum 60'.

Sinking one half of the spent fluid on the door side of chamber 24 through an exhaust duct with an opening located outside the hole of exit foils 63 and the other half on the closed far side of the chamber through another exhaust duct with an opening located outside the hole of exit foils 63, while minimizing the cross sectional area needed for spent fluid removal, also has the effect of creating a stagnation zone at the location where the flows of the spent fluid divide as indicated in FIG. 24. The location of this stagnation zone can be moved in chamber 24 by changing the ratio of the door side exhaust flow rate to the blind side exhaust flow rate. This ratio is changed by adjustment of blast gates that are attached to the system exhaust ductwork.

Typically, as indicated above, spent fluid cross flow parallel to the PCB has little effect on heat transfer because of the thermal boundary layer. However, at the leading edge of the board, where the thermal boundary layer is very thin as indicated in FIG. 25, this cross flow can affect heat transfer. If as uniform heat transfer rates as possible are to be maintained, this stagnation zone should be located as close as possible to either the leading edge of a PCB as it enters chamber 24 to undergo processing or the trailing edge thereof. Moving the stagnation zone to a location at either end of the board moves the stagnation zone away from the center of the chamber and requires an increase in the spent convective fluid cross flow velocity through the chamber exhaust outlet located on opposite side of the chamber center from the side to which the stagnation zone is moved. Such a cross flow velocity increase, however, may affect the angle of impingement on PCBs of the fluid in the covective fluid impingement jets as described above.

Instead of centering the position of PCBs 64 undergoing processing and moving the stagnation zone to one or the other of the board ends, the trailing edge of each board is positioned at a fixed location near chamber door 75. Based on the average PCB length in the industry, the stagnation point can instead be moved to a location about two thirds the distance into chamber 24 from the door side thereof. Variations from the average board length will have an effect on the heat transfer to the leading edge of the product, but the magnitude will be small because the velocity of the spent convective fluid flow is quite low in the stagnation zone.

Figure 26:
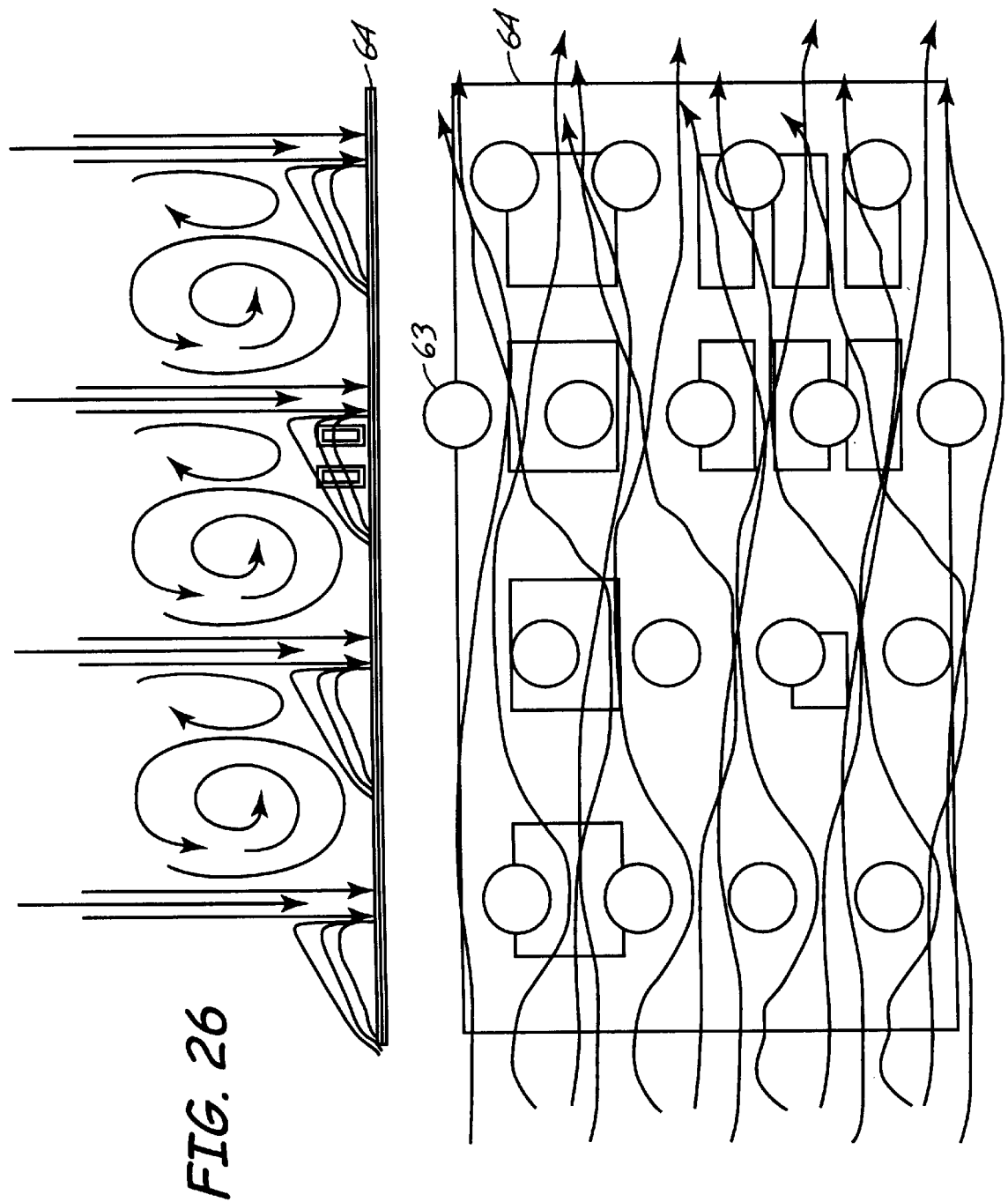
FIG. 26 shows a representation of two views of convective fluid flow about an item heated thereby.

As the equations above for the optimum heat transfer coefficient show, the necessary ratio between the exit foil 63 hole separation distance and the exit foil 63 hole diameter is 7.2. This is the minimum ratio to allow maintaining a sufficient distance between the holes for the spent convective fluid to move between the convective fluid impingement jets rather than being pulled through those impingement jet and thereby affect the angle of impingement on PCBs 64 undergoing processing of fluid in such impingement jets as indicated in FIG. 26. This ratio is exceeded in exit foil 63 of the third configuration plenum 60' which, as indicated above, has a hole diameter of 0.093 in. and hole to hole distance of 0.707 in. giving a ratio of 7.6.

Figure 27:
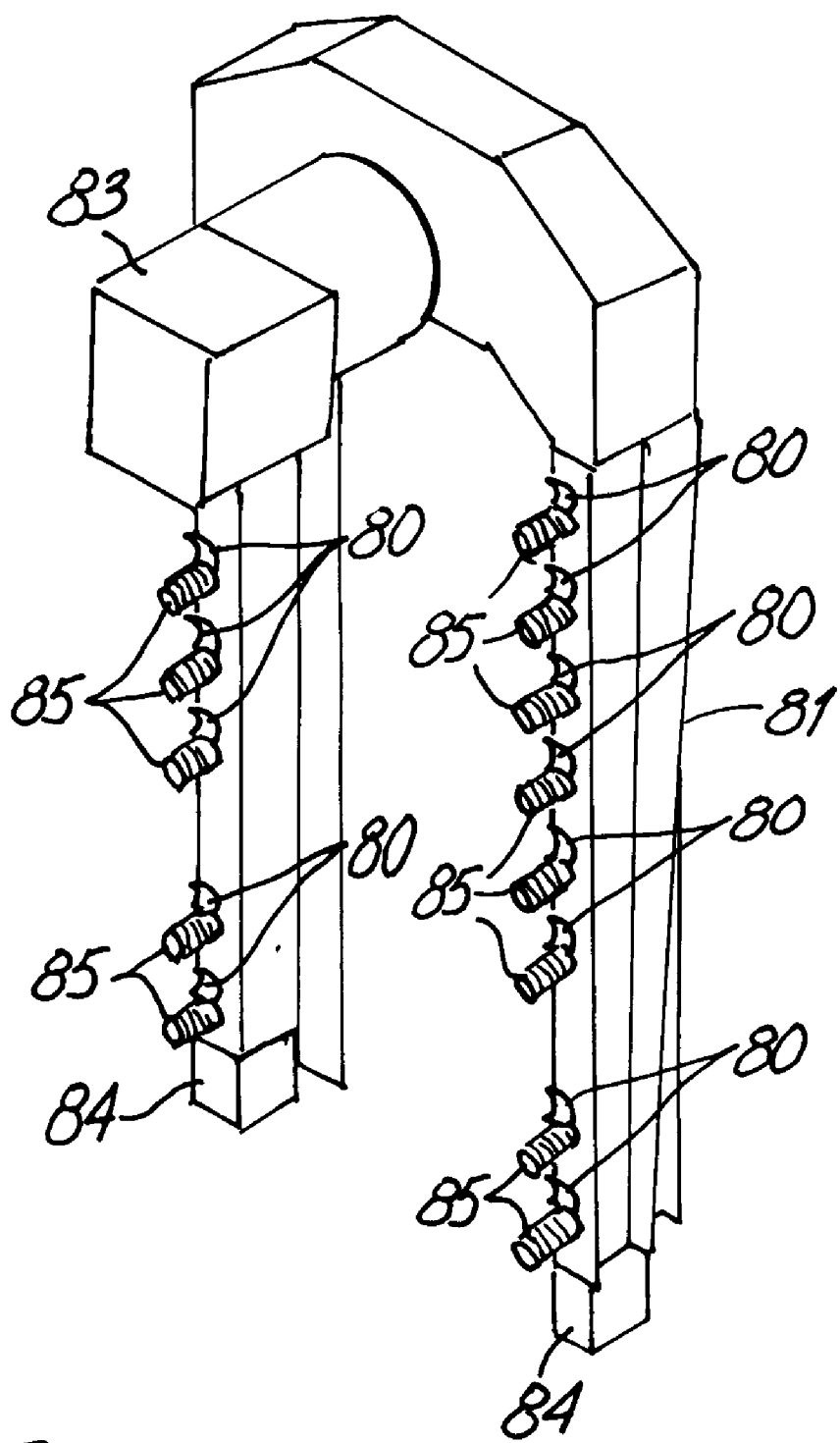
FIG. 27 shows an oven exhaust systems for exhausting oven chambers.

The same blast gates uses to adjust the position of the stagnation zone in chamber 24 as described above are also used to adjust the spent convective fluid exhaust flow rate from chamber to chamber in oven 20. The exhaust flow rate needs to be the same for all chambers 24 so that the processing of a PCB 64 does not change with the selection of chamber for such processing in oven 20 of the present invention. The door side and closed far side exhaust outlets of a chamber 24 are connected through blast gates, 80, to the corresponding one of the door side and closed far side vertical stacks, 81, that merge with one another into a single stack hood, 82, at the top of oven 20 that is connected to an exhaust fan, 83, the oven exhaust system being shown outside of oven 20 in FIG. 27. To create uniform draw, each of the two vertical stacks 81 are tapered from a smaller cross-sectional area at the bottom to a larger cross-sectional at the top where exhaust fan 83 is located as shown in FIG. 27 based on the same principles used above for forming the feeder duct and finger ducts in the plenums to provide uniform flow. Opening and closing blast gates 80 while monitoring static pressure just upstream from the gates serves as fine adjustment to provide for a uniform flow rate from each chamber 24.

This larger cross sectional area with height in these two vertical stacks 81 slows the velocity of the exhausted spent fluid to allow cooling thereof prior to being exhausted into the building exhaust. This cooling, and lower fluid velocities, facilitates removal of solder fluxes that are suspended in the spent fluid exhaust flow. These exhaust fluxes collect on the inside of the exhaust ductwork, and larger solids drop to an easily removable particulate collector, 84, at the bottom of the each vertical stack 81 reachable through large removable panels in the oven wall to provide access for periodic cleaning.

The connections between an oven chamber and the two vertical exhaust stacks is accomplished using flexible tubes, 85. These flexible tube connections are where the initial cooling of the flux laden exhaust fluids will occur. Thus, rather than items that require cleaning, the inexpensive flexible tubes 85 can be economically disposed of and replaced. Also, such a flexible connection interface makes installation and removal of chambers 24 in oven 20 easier because fewer joining locations need to be interfaced to one another accurately between chambers and the remainder of the oven.

The convective fluid, heated and directed at PCBs 64 undergoing processing to reflow solder in solder paste to join circuit components and board interconnections, is contaminated with fluxes from the solder paste. Exhaust systems extract the spent fluid at the entrance and exit ends of a traditional in-line oven to prevent contaminated convective fluid from entering the operator area. PCBs that are wider than half the width of the heater processing cavity, in effect, divide the upper spent fluid exhaust flow from the lower spent fluid exhaust flow as the PCB enters, traverses and exits that heater cavity. This PCB dividing effect requires drawing spent fluid exhaust from both above and below the PCBs to capture all the spent fluid effectively. Because PCBs 64 entering oven 20 of the present invention pass through door 75 of chamber 24 which is opened only when processing is not occurring, no flux laden exhaust gasses escape during the PCB transport sequence. Thus, the spent fluid needs only to be exhausted on one side of PCBs 64 undergoing processing. This allows additional mass reductions in the chamber and more room for board transportation equipment.

The temperature change responsiveness of a low mass plenum 60' could be easily lost if the mass savings of the chosen plenum were simply added back therein by a high thermal mass PCB transport system. Likewise, an otherwise sophisticated heating system would be for naught if the PCB transport system was unreliable. Oven 20 of the present invention must have a PCB transport system capable of reliably transporting PCBs 64 of varying widths in and out of processing chambers through the same chamber opening. Such a system must be of very low thermal mass and be capable of carrying and supporting PCBs 64 with minimal contact between such PCBs and that system to minimize heat conduction by the system away from those PCBs. Lastly, the transport system must work reliably even after flux from the soldering pastes used on the PCBs and the associated circuit components has coated most of the transport system components.

Oven 20 of the present invention must have a reliable PCB transport system to position PCBs 64 in processing chambers 24 to take advantage of the heat transfer capabilities thereof for processing such PCBs. PCBs 64 are received from the preceding portion of the production line from an in-line conveyor system at the standard pass height of 35.5 in.±2 in. After entering oven 20, such PCBs 64 must be transported to the next available oven processing chamber and processed. Once processed, PCBs 64 must be transported to the remaining portion of the production line and placed on an in-line conveyor at the same standard pass height.

The oven PCB transport system must be able to be adjusted for boards of different widths within a range of 4 in. to 14 in. to meet the minimum standards of the industry. Each of the in-line conveyors preceding and following oven 20 will have a moving belt on a fixed conveyor travel path side rail at the front side of the conveyor travel path and a moving belt on an adjustable conveyor travel path side rail on the rear side of the travel path for adjusting the conveyor path width to accommodate this range of board widths. In addition, the oven PCB transport system must accommodate boards of different lengths within a range of 5 in. to 18 in., and the contact locations of the conveyor belts and the boards should be within 0.25 in. of the edge of the boards.

Figure 28:
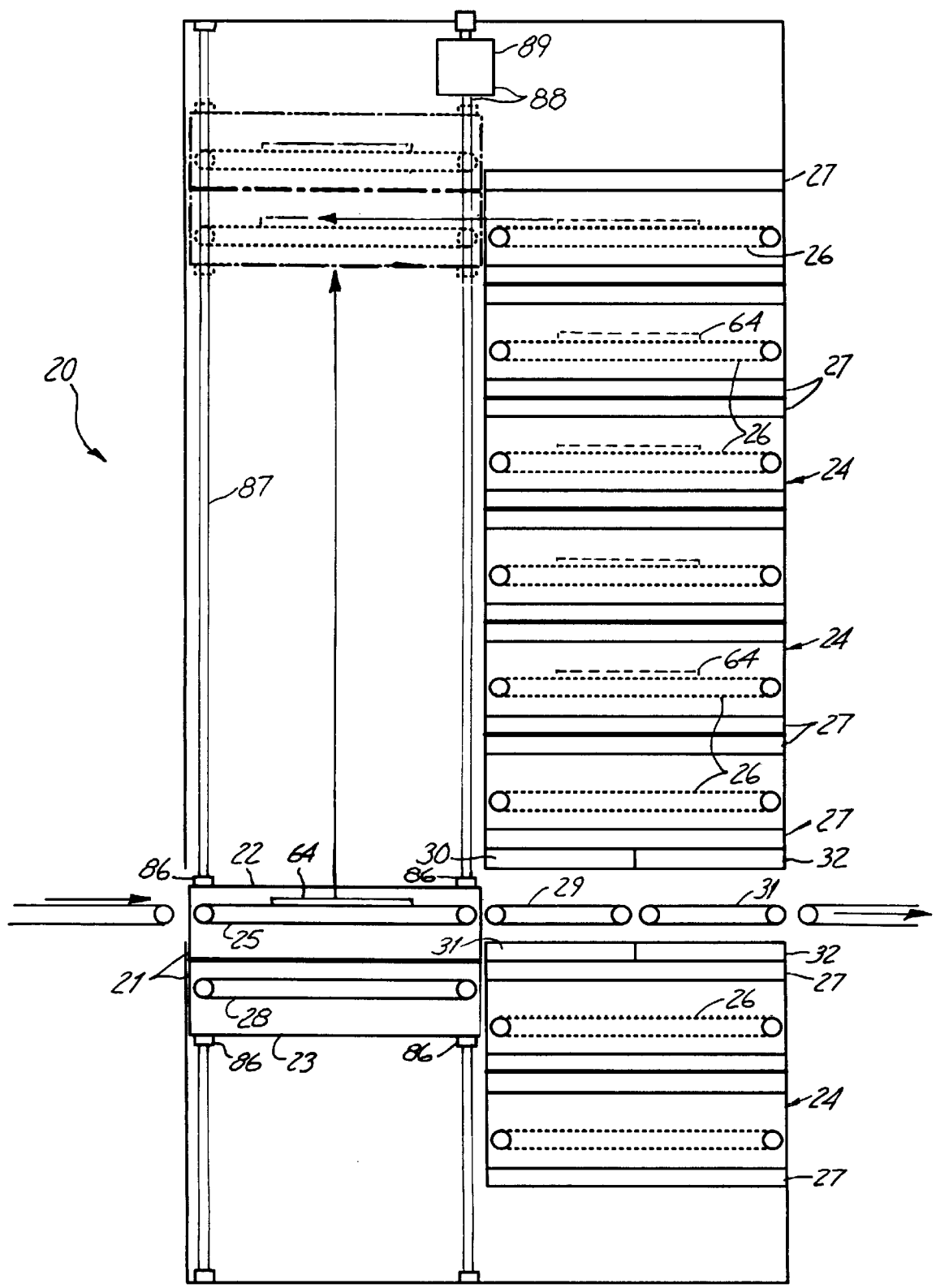
FIG. 28 shows a representational side view of an industrial oven of the present invention indicating oven transport of items to be retrieved and heated.

In oven 20 of the present invention, the processing chambers are stacked vertically above and below the standard pass height (conveyor height above the floor) of the entire production line as indicated in FIG. 2. An elevator carriage, 86, driven up and down a fixed pole, 87, by a ball screw system, 88, having an electric motor, 89, transports PCBs 64 from the standard pass height to and from these processing chambers 24 as shown in FIG. 28 under control of an oven control system (not shown). Elevator 21 accommodates PCBs 64 on upper and lower level portions 22 and 23 to minimize elevator travel, and elevator 21 has separate parallel belt conveyors 25 and 28 on each of these levels, respectively.

Elevator upper level portion 22 is directed by the oven control system to accept incoming unprocessed PCBs 64 from the preceding production line conveyor shown to the left of oven 20 in FIG. 28. Elevator 21 is then directed to travel to the next available processing chamber 24 that may or may not contain a processed PCB 64. If a processed PCB 64 is within that chamber, elevator 21 is vertically positioned by the oven control system so that the elevator lower level portion 23 is aligned with the chamber. That chamber is then directed to unload the processed board 64 onto the elevator lower level conveyor 28 as shown in FIG. 28; then elevator 21 is directed to a position that aligns the elevator upper level portion 22 with that chamber and to load the now empty chamber using upper level conveyor 25 with the unprocessed board 64 carried at upper level portion 22 that was received from the preceding production line conveyor as indicated in FIG. 29.

Figure 29:
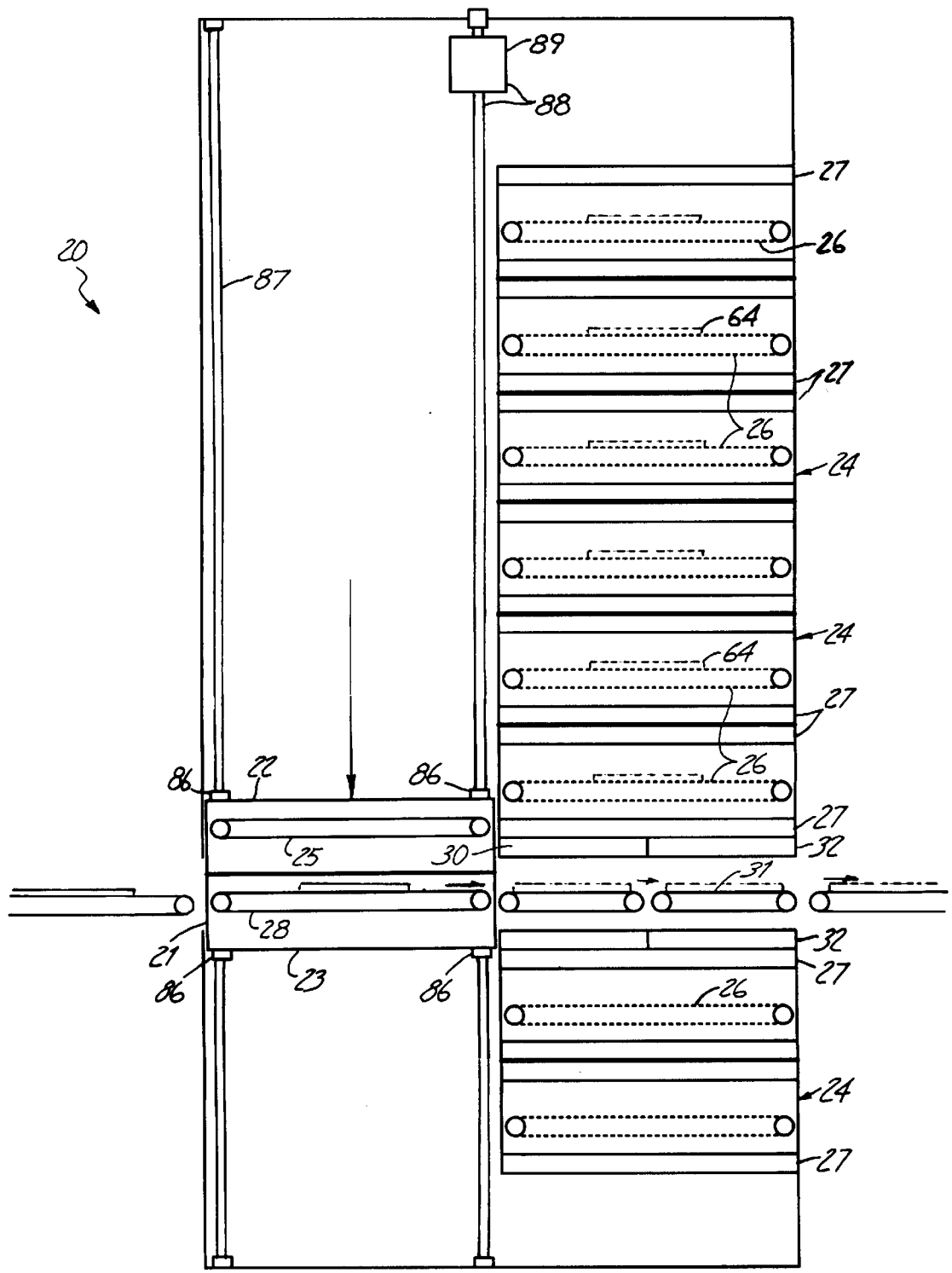
FIG. 29 shows a representational side view of an industrial oven of the present invention indicating oven transport of items to be retrieved after heating.
Figure 30:
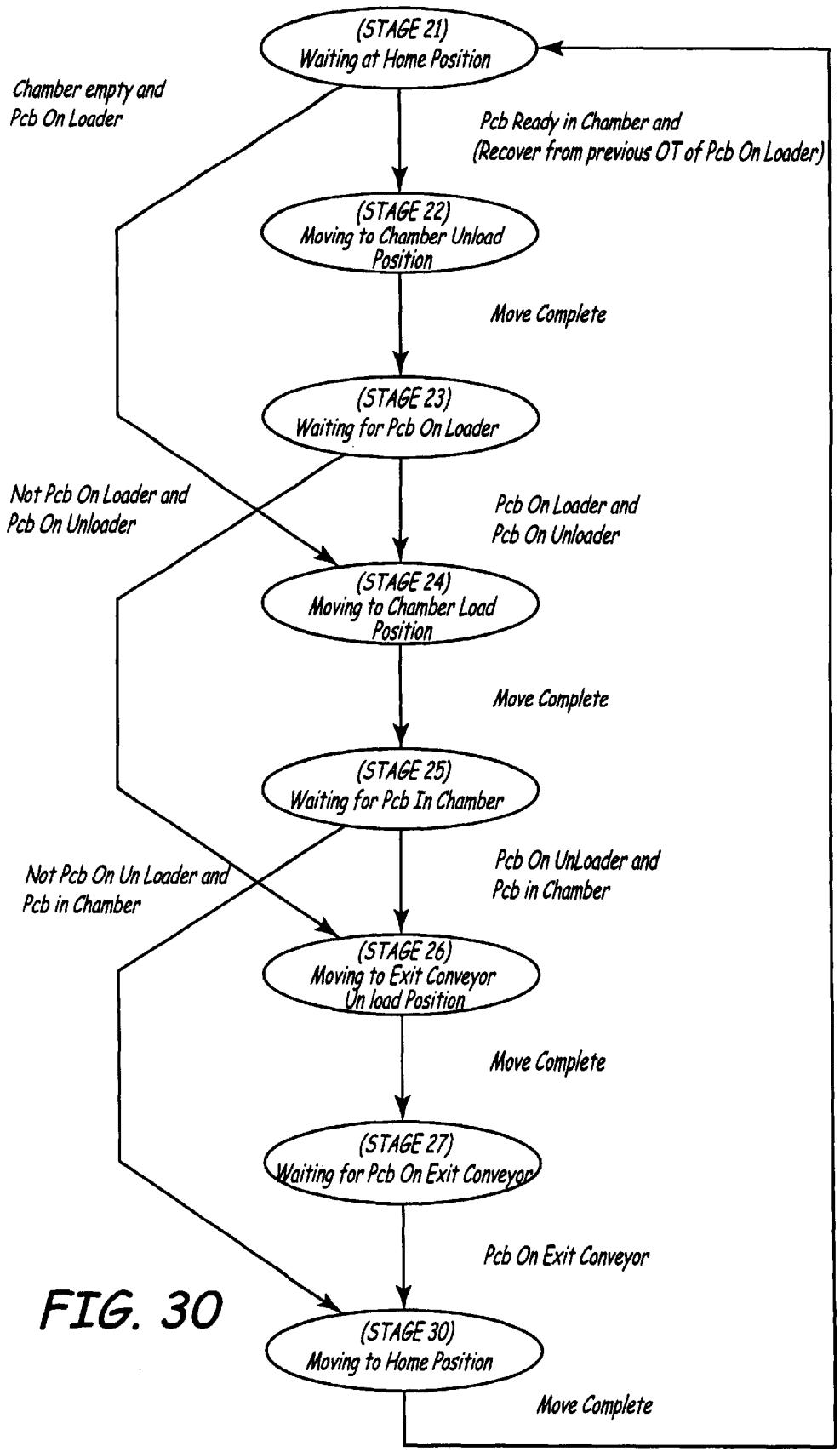
FIG. 30 shows a flow chart representing various oven transport processes.

Elevator 21 is then directed to transport the processed board 64 loaded on elevator lower level portion 23 back to the standard pass height where elevator 21 is then directed to pass that board 64 to the oven final PCB cooling conveyor 29 using elevator lower level conveyor 28 as indicated in FIG. 29. A state diagram illustrating the operation of the PCB transport system in oven 20 of the present invention is shown in FIG. 30.

After the solder in the solder paste on a PCB 64 and its associated circuit components has been reflowed in a processing chamber 24, initial cooling occurs within the chamber to cool the board below solder melting temperatures so that the board is never transported while the solder is in a liquid state. Cooling back to ambient temperature can then continue in the chamber, or to increase oven PCB throughput, board 64 can be removed from the chamber after reaching temperatures less than 165° C. (the temperature at which the conveyor belt of the elevator lower level can perform reliably). After such removal, board 64 can then be returned via elevator 21 under control of the oven to the pass height to be transported through a final board cooling arrangement. This arrangement cools the board to temperatures that can be handled by the following production line (50 to 100° C.).

Figure 31:
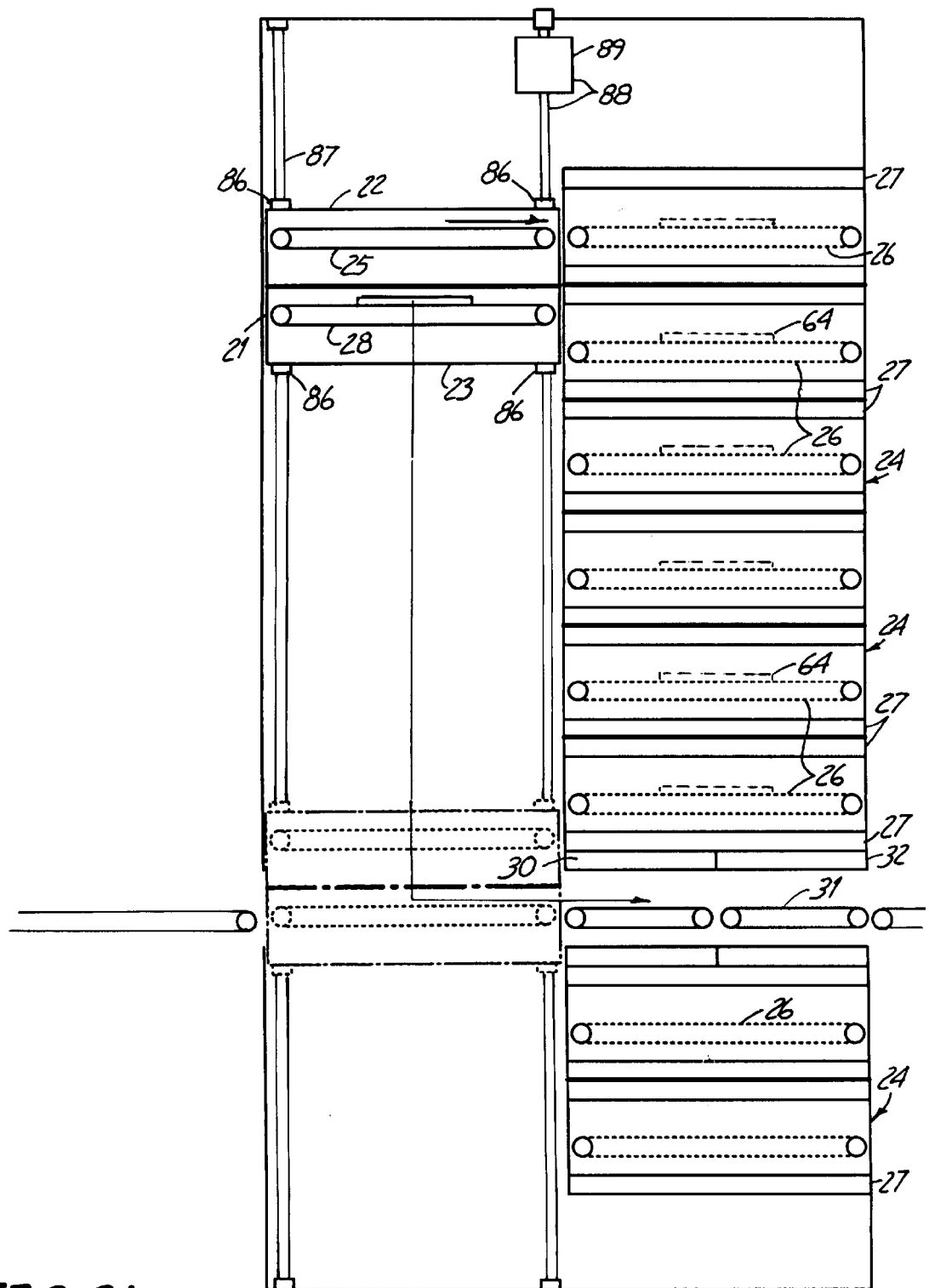
FIG. 31 shows a representational side view of an industrial oven of the present invention further indicating oven transport of items to be retrieved after heating.

Two parallel belt conveyors 29 and 31 in series (one after the other) are used in this final board cooling arrangement to increase the flexibility of the oven in managing how long PCBs 64 stay in cooling. A first PCB 64 can be loaded onto first cooling conveyor 29, and remain stationary there for a selected time. When another PCB 64 arrives for final cooling, the first PCB 64 is moved to second cooling conveyor 31 for a further selected cooling time, and the second PCB 64 is loaded onto first cooling conveyor 29. If final cooling of arriving processed PCBs is not needed, then the two cooling conveyors in the final cooling arrangement can run continuously to provided processed PCBs 64 to the following production line conveyor to the right of oven 20 as indicated in FIG. 31.

Each of elevator upper and lower level conveyors 25 and 28, and each of two cooling arrangement conveyors 29 and 31, has a moving belt on a fixed conveyor travel path side rail at the front side of the conveyor travel path (and front of the oven) and a moving belt on an adjustable conveyor travel path side rail on the rear side of the travel path for adjusting the conveyor path width to accommodate the range of board widths under control of the oven control system. The rails of these conveyors toward the rear of the oven are moved closer to and farther from the corresponding fixed rails toward the front of the oven by a corresponding acme threaded rod through an acme nut. The acme rods all move simultaneously in being connected together in the elevator, and another set of acme rods all move simultaneously in being connected together in the cooling conveyors arrangement, with sprockets, roller chain, and an electric motor (all not shown) for each set, maintaining parallelism constantly.

The board width parameter of PCBs 64 to undergo processing is entered via software and downloaded to the oven central programmable logic controller (PLC) in the oven control system. The PLC directs adjusting the travel path widths of the elevator conveyors based on feedback from a linear position transducer connected to the elevator conveyors adjustable rails. The linear transducer uses relative position resistance to determine its contactor position so, even in the event of power loss, the width is immediately confirmed when power is restored without needing the contactor to be first driven to a home position as a reference. The widths of the cooling elevators are adjusted by adjusting the width of the first cooling elevator in the same manner as the widths of the chamber conveyors to be described below.

Within an oven processing chamber 24, a bidirectional PCB transport system is used to transport PCBs into that chamber to load it for processing and to transport those PCBs back out to unload it after processing, through single opening 75 in chamber frame 74. Loading and unloading PCBs 64 through single opening 75 in a processing chamber 24 allows the oven system to transport PCBs as needed using just a single elevator. A second elevator, or a much more complicated system transport mechanism, is required to have PCBs 64 be transported with respect to processing chambers in a single direction by passing them all the way through the chamber.

This oven processing chamber bidirectional PCB transport system must minimize the thermal effects of the system on the PCB and plenum temperatures, and its construction materials must be able to survive multiple thermal cycles. But unlike other chamber parts, the majority of fatigue occurring in the conveyor parts is from mechanical stresses as the conveyor board transport carrier wraps around the radius of the sprockets or pulleys operating or supporting it (compression) and then returns a straight configuration under the board. In a traditional oven, increasing the bending radius (reducing compression), or utilizing a roller chain, which bends without inducing compression, overcomes excess fatigue. Such measures cannot be used for conveyors in the processing chambers of the oven of the present invention because even the smallest roller chain has significant mass and requires operating about relatively large radii supports.

Figure 32:
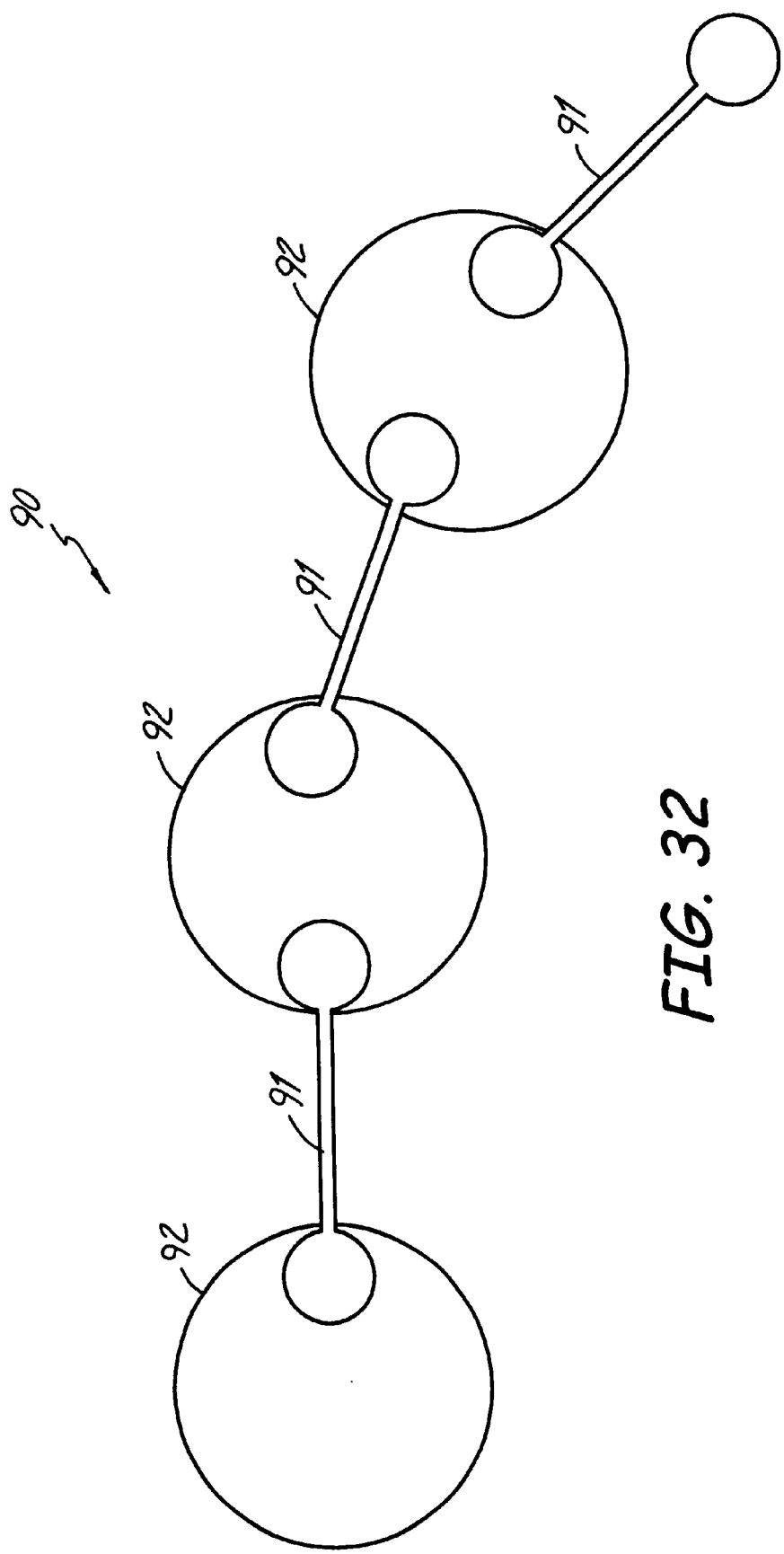
FIG. 32 shows a cross section view of a chamber conveyor carrier medium.

Instead, small diameter bead chain transport conveyor 26 is used in these processing chambers 24. Bead chains for conveyors have several advantages:

1.) Bead chain, 90, has low thermal mass. It is made of very small "bone-shaped" interlinks, 91, connecting small diameter hollow spheres, 92, as can be seen in FIG. 32.

2.) Bead chain does not experience compression when wrapped around a radius because of its geometry. The interlinks simply push into the hollow spheres, and so the chain can be wrapped around very small radii.

3.) Bead chain is readily available in many materials, including 304 stainless steel, which has excellent thermal and strength properties.

4.) Because of the geometry of the spheres, using the chain as the conveyor PCB carrier minimizes contact between the chain and the board to a very small surface area which, in turn, minimizes heat conduction away from the board if the conveyor is of a temperature different from that of the board. The same sphere geometry also increases the normal force between the board and the bead chain conveyor because of the contact area being small which increases the friction force, and reduces relative motion between the board and the conveyor (slippage.)

5.) Bead chain is inexpensive.

A low mass rail, 93, is used to support the bead chain and guide motion of PCBs 64 between the rails. The cross sectional area of this rail is chosen to minimize the mass thereof, to increase stiffness by increasing moment of inertia thereof to maintain straightness, to positively hold bead chain 90 in place relative to the board edge, and to provide a return path for the bead chain as shown in the cross section view of FIG. 33.

Figure 34:
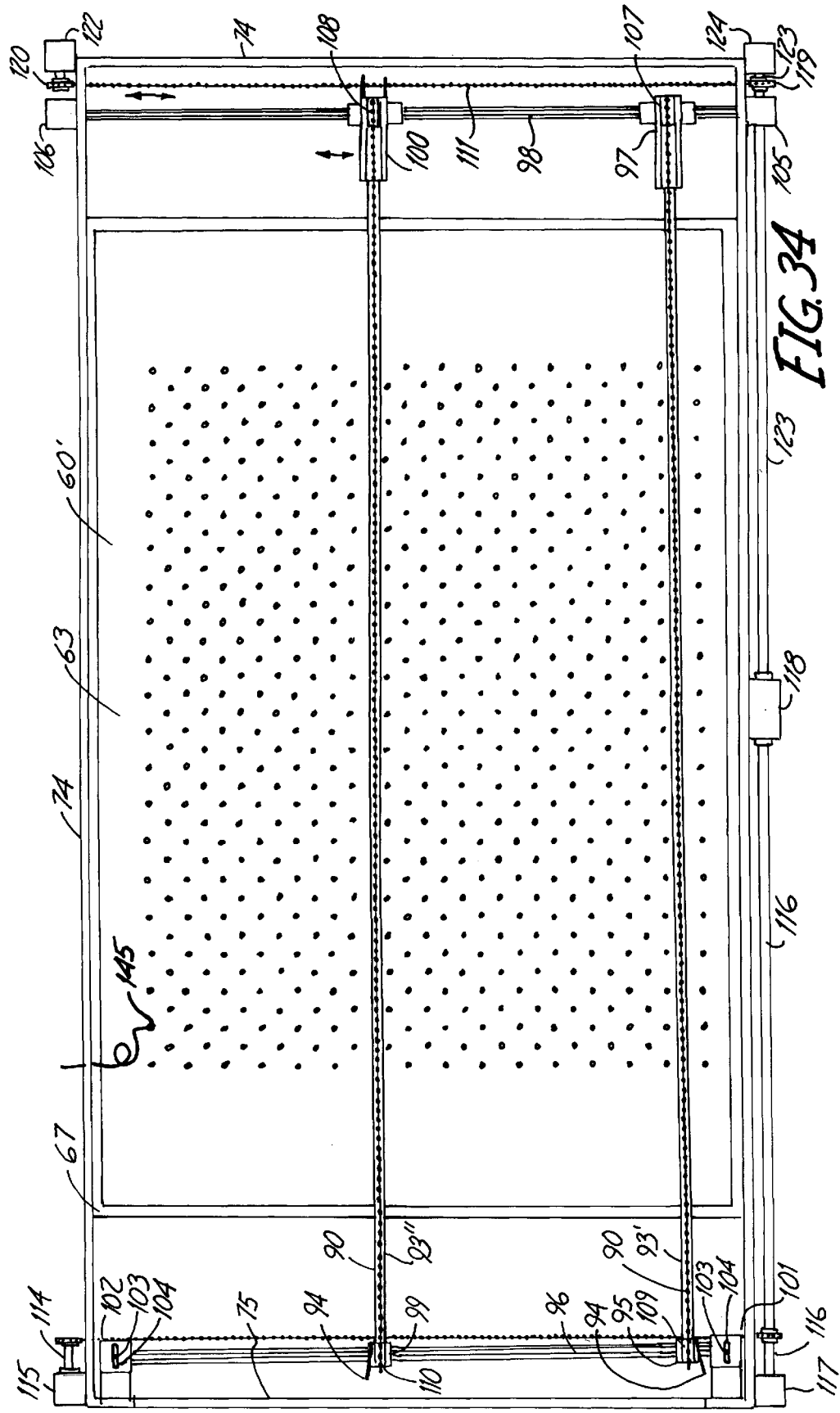
FIG. 34 shows a top view of a partially disassembled oven chamber.
Figure 35:
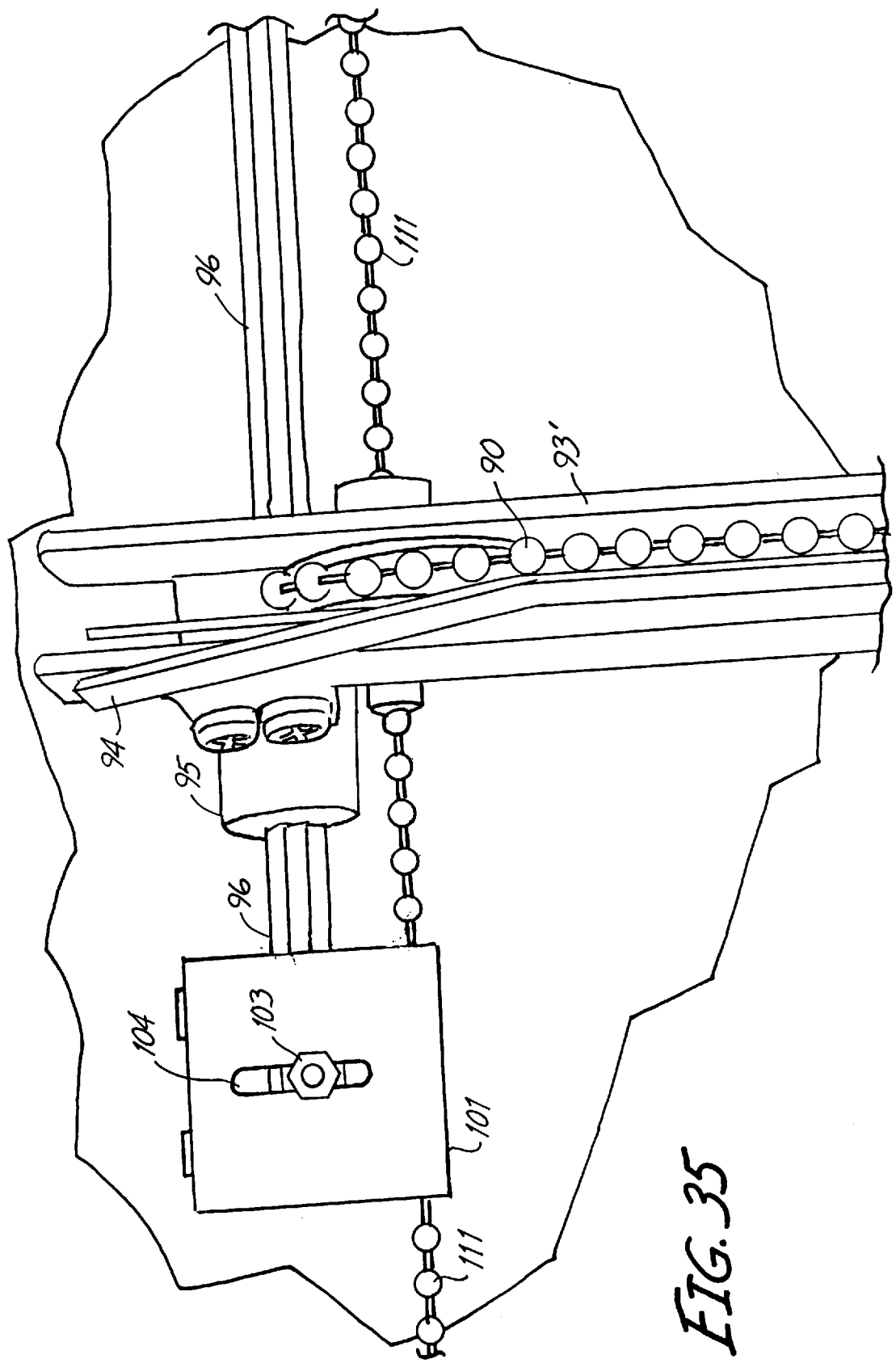
FIG. 35 shows a fragmentary view of a portion of FIG. 34.

In FIG. 34 there is shown a fixed rail, 93', and a moveable rail, 93". At the ends of rails 93' and 93", a lead-in structure, 94, is provided to positively guide slightly misaligned PCBs onto the correct path between these rails as shown in FIGS. 34 and 35A. Fixed rail 93' is mounted by a fixed mount, 95, on a door side support shaft, 96, and by another fixed mount, 97, on a closed far side support shaft, 98. Moveable rail 93" is mounted by a moveable bearing mount, 99, on support shaft 96 and and by a moveable bearing mount, 100, on support shaft 98. Expansion of the length of rail 93' and 93" at elevated temperatures will occur. To keep these rails straight independent of temperature, the mounting therefor on the chamber frame at the door side of chamber 24 does not restrict motion of the rail along the axis of the rail as seen in FIGS. 34 and 35. FIG. 34 is a top view of a chamber 24 with the upper half of the chamber frame and the upper plenum 60' removed. FIG. 35 is a top fragmentary view from the portion of FIG. 34 near mounts 101 and 95. This avoidance of expansion restriction occurs because rails 93' and 93" are mounted by mounts 95 and 99, respectively, on support shaft 96 which in turn has each end in a corresponding one of fixed frame mounts, 101 and 102, with a pin, 103, extending from the side of shaft 96 at each end thereof into a corresponding relatively long slot, 104, in each of mounts 101 and 102.

Support shaft 98, on the other hand, extends through chamber frame 74 at each end to be the extension of the motor shaft of an electric motor, 105, and to rotatably mounted in a shaft end mount, 106. Shaft 98 is affixed to a drive sprocket, 107, in mount 97 about which bead chain 90 on fixed rail 93' is wrapped, and further affixed to a drive sprocket, 108, in mount 100 about which bead chain 90 on moveable rail 93" is wrapped. Bead chain 90 on fixed rail 93' is also wrapped about an idler pulley, 109, in mount 95, and bead chain 90 on moveable rail 93" is also wrapped about an idler pulley, 110, in mount 99. Thus, shaft 98 is also a drive shaft to rotate drive sprockets 107 and 108 to move bead chains 90 on rails 93' and 93" to thereby transport PCBs 64 when rotated by motor 105.

Because of the same advantages as listed above, another bead chain, 111, is also used (as compared to acme threaded rod and nut on elevator and cooling conveyors carriages) for moving adjustable rail 93" of the chamber bead chain conveyor to accommodate PCBs 64 of different widths inside chamber 24 as seen in FIGS. 34 and 35. This choice over acme threaded rods and nuts reduced the mass inside the chamber and increased commonality of parts used in the chambers.

FIG. 34 shows a bead chain 111 at the door side of chamber 24 is wrapped about a drive sprocket, 112, and an idler sprocket, 113, and which is connected to moveable bearing mount 99. Idler sprocket 113 is mounted on an idler sprocket shaft, 114, which is rotatably mounted in an idler mount, 115, supported on chamber frame 74. Drive sprocket 112 is mounted on a drive shaft, 116, extending therethrough to be rotatably mounted, on one end, in a drive mount, 117, and forming an extension of the rotor of an electric motor, 118, at the other end thereof.

Figure 36:
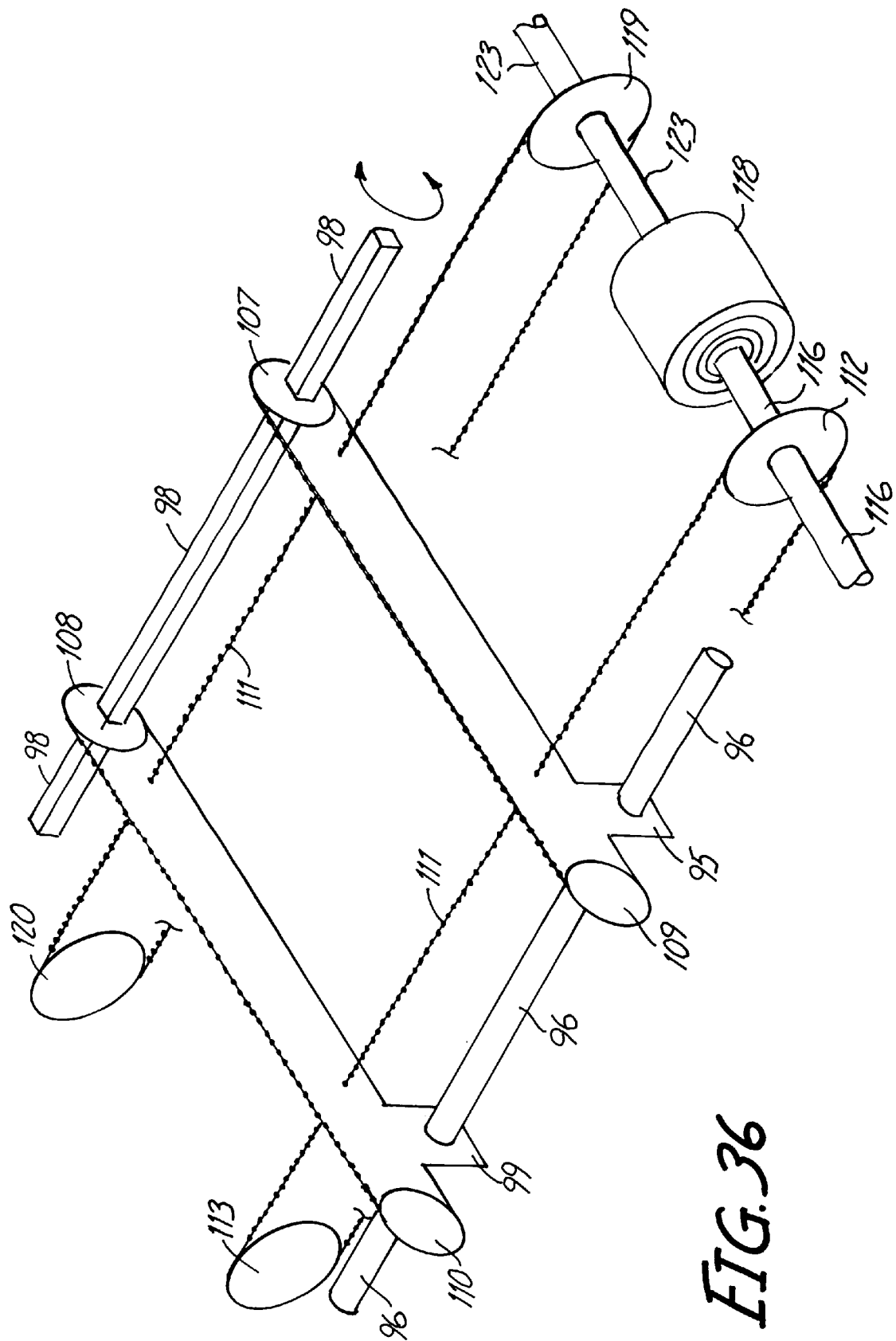
FIG. 36 shows a schematic diagram of the conveyor system shown in FIG. 34.
Figure 37A:
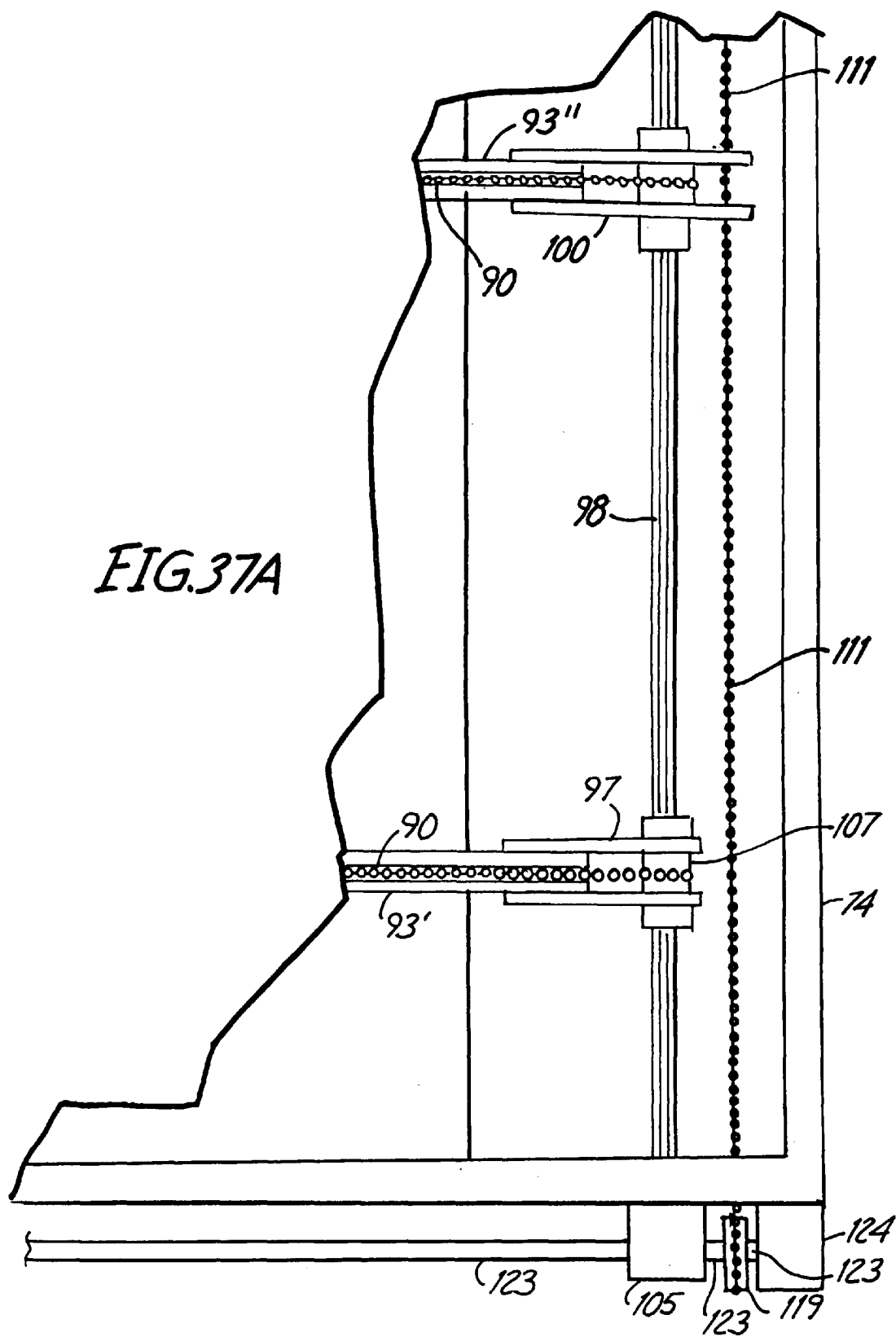
FIGS. 37A shows a fragmentary view of a portion of FIG. 34

Bead chain 111 at the closed far side of chamber 24 is wrapped about another drive sprocket, 119, and an idler sprocket, 120, and is also connected to moveable bearing mount 100. Idler sprocket 120 is mounted on an idler sprocket shaft, 121, which is rotatably mounted in an idler mount, 122, supported on chamber frame 74. Drive sprocket 119 is mounted on a drive shaft, 123, extending therethrough to be rotatably mounted, on one end, in a drive mount, 124, and forming an extension of the rotor of electric motor 118 at the other end thereof. A schematic overview in perspective of the bead chain conveyor system is shown in FIG. 36. A fragmentary view of FIG. 34 near mount 97 and electric motor 105 is shown in FIG. 37A.

The bead chain conveyor in each processing chamber 24 is adjusted by the oven control system for width independent of the widths chosen for the bead chain conveyors in the other chambers. This chamber conveyor width adjustment independence allows for a highly mixed processing of PCB types, although some reduction in capacity would be expected because of the additional time for needed for width adjustment with PCB type changeovers.

Some parts of the processing chamber bead chain conveyor require higher mass for increased reliability. Where this is true, these higher mass parts are located in chamber 24 away from plenum 60' to avoid adverse effects on the chamber PCB heating performance (rate of change and uniformity) and to also improve reliability because these parts thereby avoid extensive thermal cycling.

Figure 37B:
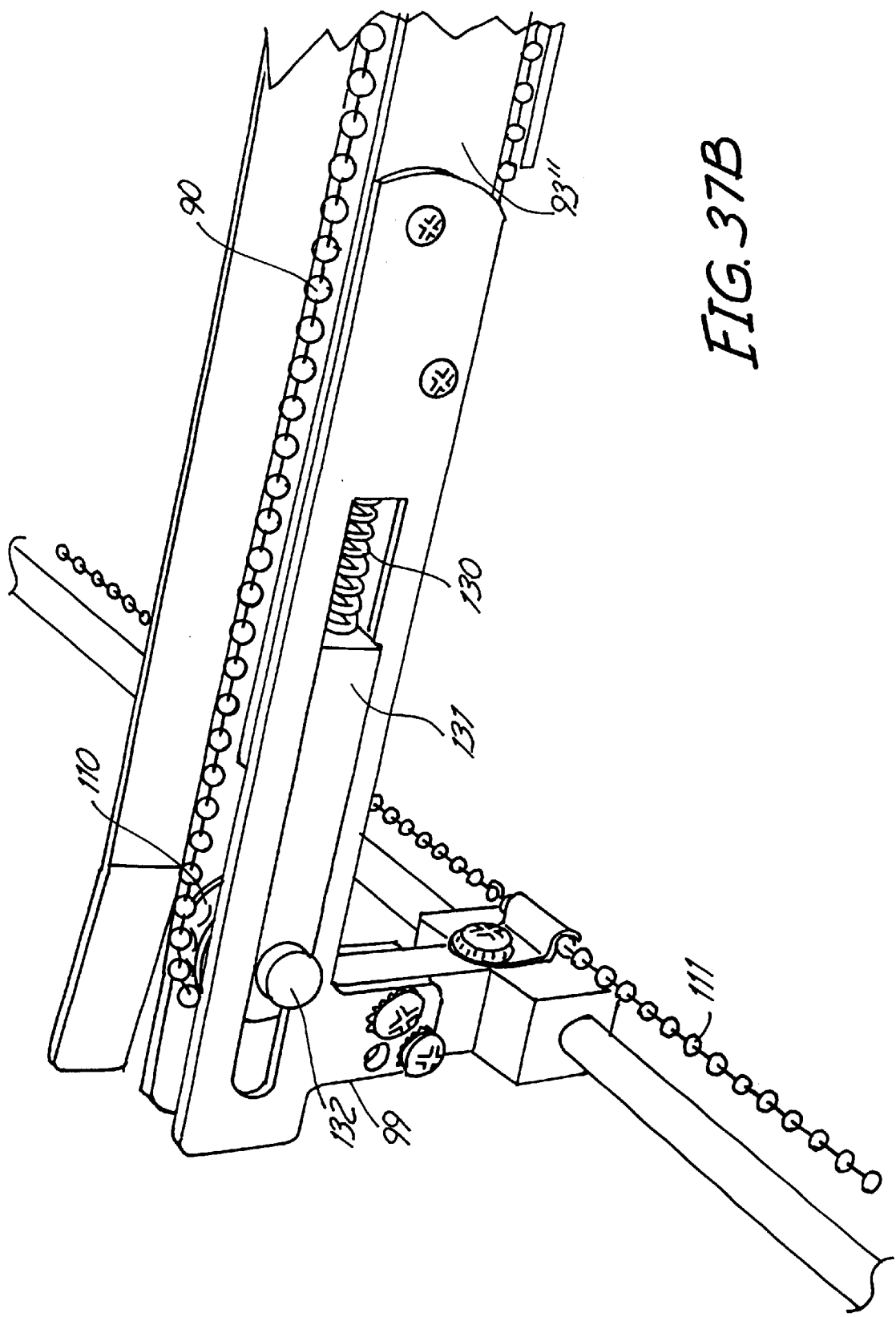
FIG. 37B shows a perspective view of a portion of FIG. 34.

An example of this setback locations scheme is the mechanism that provides tension on bead chain 90 on moveable rail 93" which is located beneath the exhaust duct opening extending across the width of chamber 24 on the door side thereof as seen in FIG. 37B. Providing tension to bead chain 90 is necessary so that, as the bead chain expands during the heating cycle, and stretches over continuous use, the bead chain is positively held in position relative to the rail and drive sprockets. This is accomplished by spring loaded pulley 110 because of a helical spring, 130, acting to expand against both the end of mount 99 affixed to moveable rail 93" and the end of a slider shaft, 131, captured in a channel in mount 99. Pulley 110 is rotatably mounted in the end of slider shaft 131 opposite that end acted on by spring 130 by a pin, 132, each end of which pin slides in a corresponding one of two opposed slots on either side of the channel in mount 99 holding slider shaft 131. Thus, pulley 110 is always pushed away from moveable rail 93" thereby tending to keep bead chain 90 tight.

Figure 38:
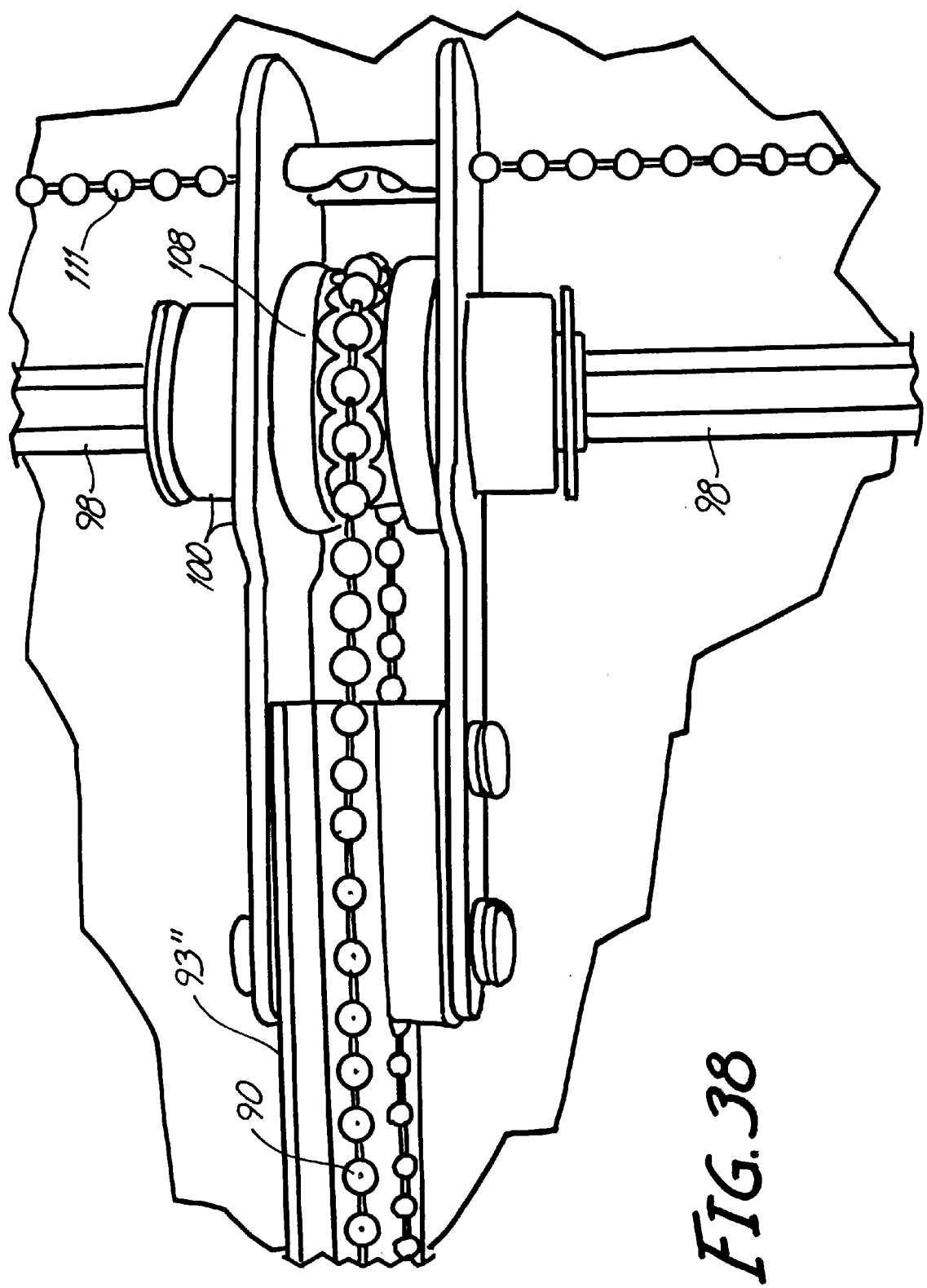
FIG. 38 shows a fragmentary view of a portion of FIG. 34.
Figure 39:
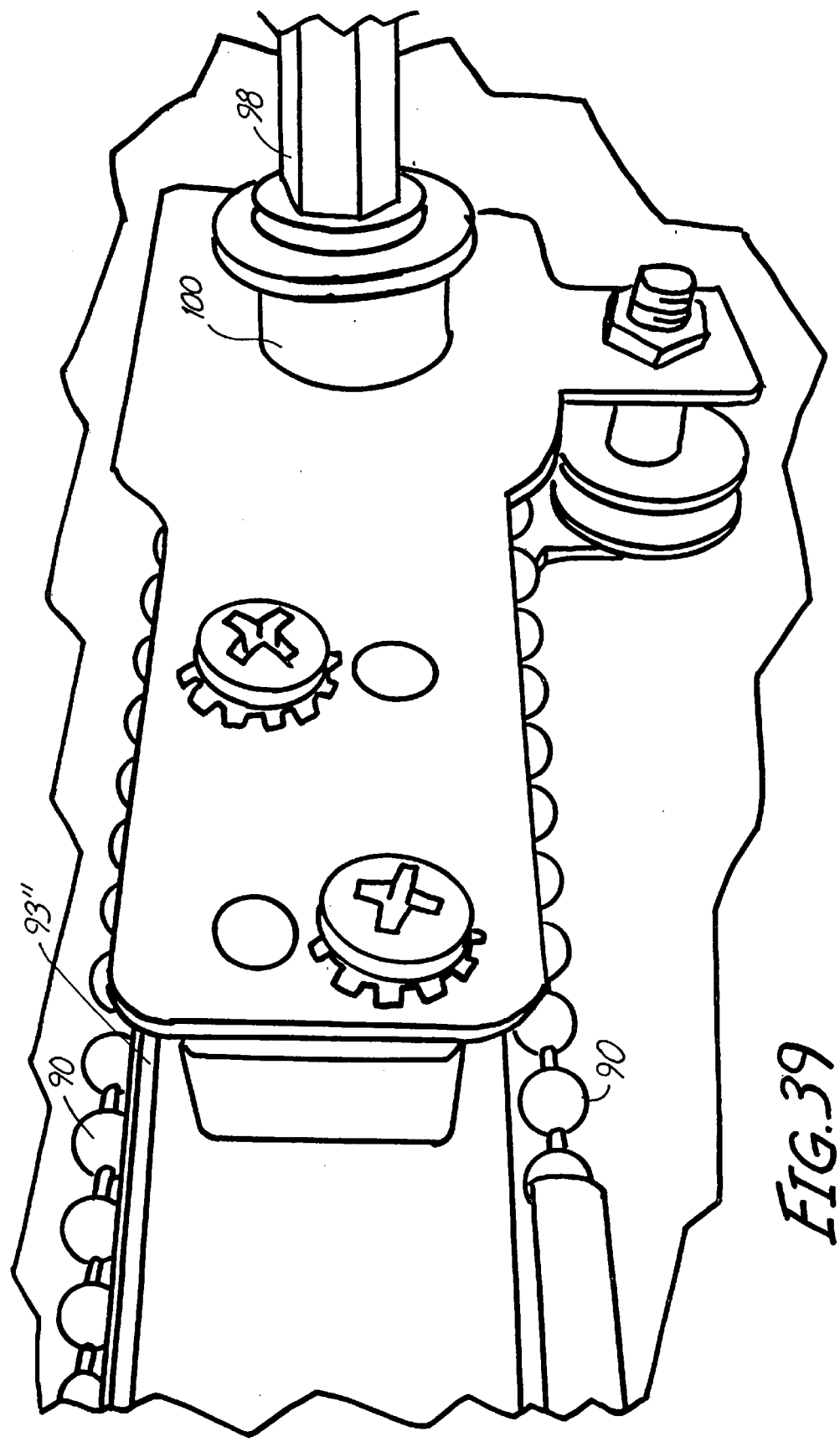
FIG. 39 shows a perspective view of a portion of FIG. 34.

Another example of higher mass components being set back are some located at the opposite end of rail 93" underneath the exhaust exhaust duct opening at the far closed side of chamber 24 such as the drive sprockets, including the moveable bearing mount 100 drive sprocket 108, seen in FIG. 38, the bearings in mount 97 and 100, and the bead chain idler retention pulleys including a pulley, 13, in mount 100 for keeping bead chain 90 against drive sprocket 108 seen in FIG. 39. Both drive motors 105 and 118 (for operating the bead chain conveyor to transport PCBs and for operating the bead chain to provide bead chain conveyor width adjustment, respectively) are located outside chamber 24 completely, as are the sprockets and limit switches for moveable rail width adjustments.

Figure 40:
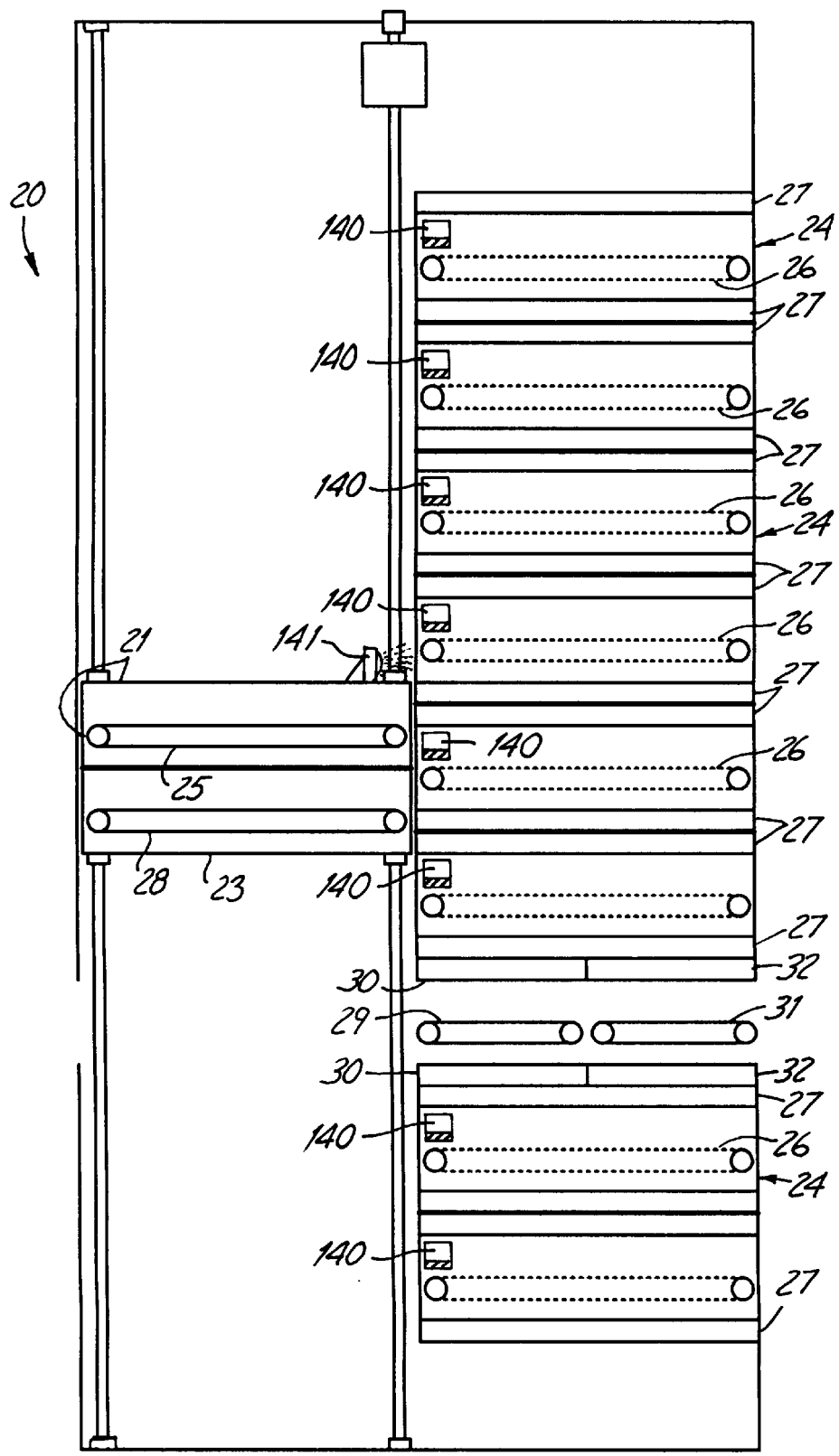
FIG. 40 shows a representational side view of an industrial oven of the present invention with a detection system portion therein.

As described above, width adjustments of belt conveyors 25 and 28 in oven elevator 21 is accomplished with a feedback signal provided by an expensive linear transducer. Not wanting to add mass, or expense for each processing chamber 24, a low mass, inexpensive thin, flat plate serving as a moveable rail position flag, 140, is added to the bead chain conveyor moveable rail 93" within each chamber 24 as seen in the diagrammatic showing thereof in FIG. 40. An optical fiber based sensor, 141, is mounted on the moveable rail of conveyor 25 in elevator 21 to sense these flags in chamber 24 before transporting PCBs 64 in and out of such chambers. A light source in sensor 141 transmits visible light through some optical fibers in a bundle thereof which is lost in chamber 24 unless chamber flag 140 has its thin edge in front of sensor 141 to reflect light back to optical fibers in the bundle that carry impinging light thereon to an optical detector. If a width adjustment of the bead chain conveyor moveable rail 93" in a chamber 24 is necessary, that rail is moved by the oven control system to maximum width and then closed towards minimum width until optical sensor 141 on the moveable rail of conveyor 25 in elevator 21 senses flag 140 in the chamber to thereby assure that moveable rail 93" is aligned with the moveable rail of conveyor 25. Duplication of an expensive linear transducer in every chamber is thus avoided by use of cheaper, single optical sensor 141.

Figure 41:
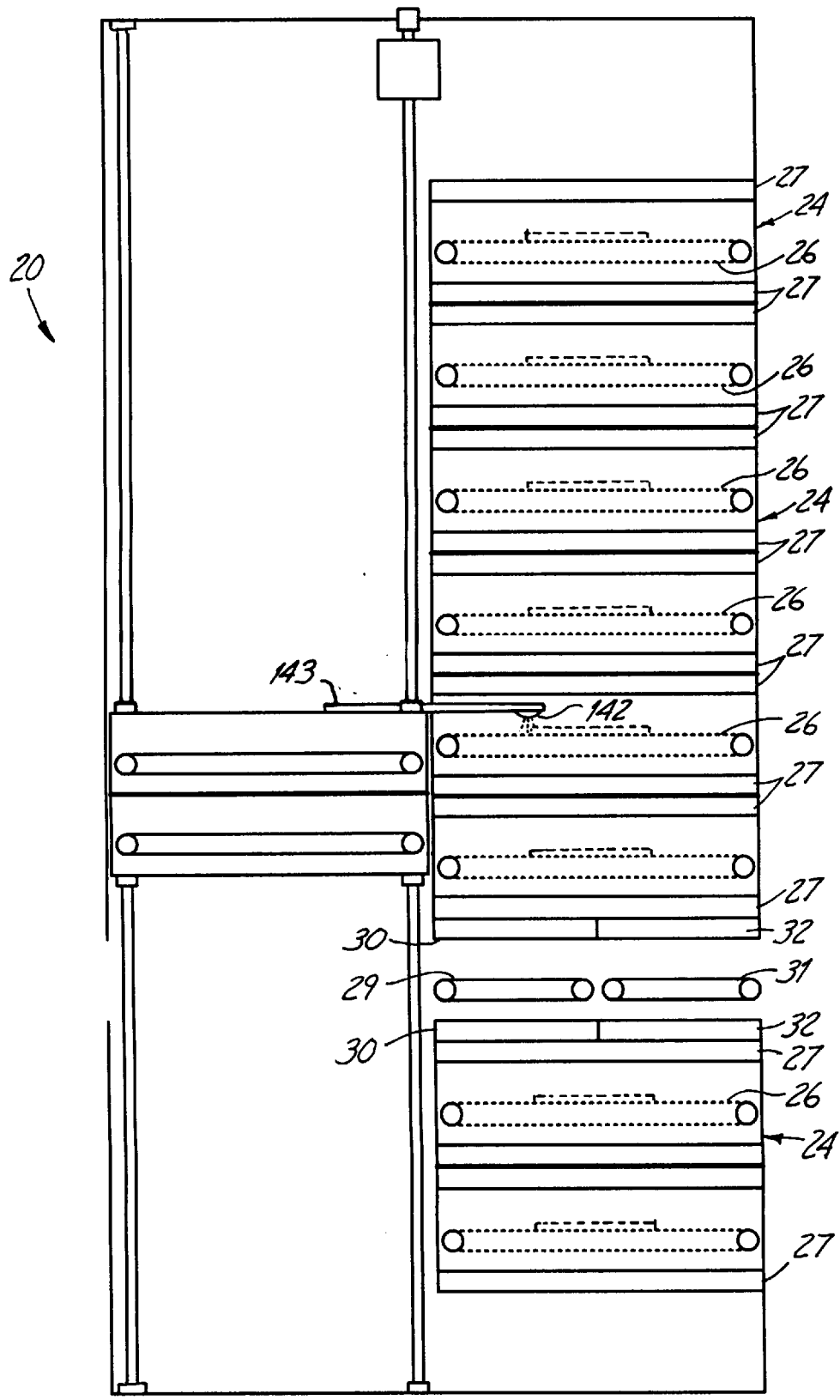
FIG. 41 shows a representational side view of an industrial oven of the present invention with another detection system portion therein.

Another optical sensor, 142, of the same kind is also present on oven elevator 121 mounted on an electric motor driven screw mechanism, 143, that is to insert that sensor under the control of the oven control system into chamber 24 above fixed rail 93 therein to first check for the presence of a processed PCB 64 as indicated in FIG. 41 which is determined by whether such a board is present to reflect light back to that sensor. If no board 64 is detected in the chamber, this sensor is retracted 1" by driven screw mechanism 143, and the unprocessed board on conveyor 25 of elevator 21 is transported into chamber 24 until the trailing edge of the board is detected through light no longer being reflected to sensor 142. This insures each board 64 of the same type is located in all chambers 24 in the same relative location. The distance optical sensor 142 is inserted into a chamber 24 by driven screw mechanism 143 is software adjustable in the oven control system so that odd shaped boards with cut-outs in the trailing edge of the board can still be placed in the proper location in a chamber. This arrangement has the added advantage of being able to move the fixed location of a board 64 in the chamber to avoid adverse effects of the stagnation zone as described above.

Locating optical sensors 141 and 142 on oven elevator 21 improves reliability of the PCB transport system. High quality optical sensors could be used because they were not duplicated across multiple processing chambers, and because being mounted on elevator 21 rather than in chambers 24 allows operating them at lower temperatures.

Creating a oven processing chamber 24 that responds to temperature changes quickly solves only the initial part of the problem. A control scheme for operating oven processing chambers 24 so that they produce the desired results is also necessary. The typical reflow temperature profile has been described in FIG. 3. The temperature of PCBs undergoing processing in oven chambers 24 is to change as a prescribed function of time. The oven starting parameters required to duplicate the desired temperature profile is termed here a recipe. In previous in-line reflow ovens 10 the recipe is created by guessing at the temperatures of oven 10, waiting for the oven temperatures to stabilize, recording the temperatures as a PCB passes through the oven, changing the temperatures and time in the heating zones to better reach the desired profile, and then iterating through these steps until the desired results are reached. An advantage of oven processing chambers 24 of the present invention that dynamically change the temperature surrounding PCBs 64 therein is that computers and software can be used to automate the creation of a recipe.

Figure 42:
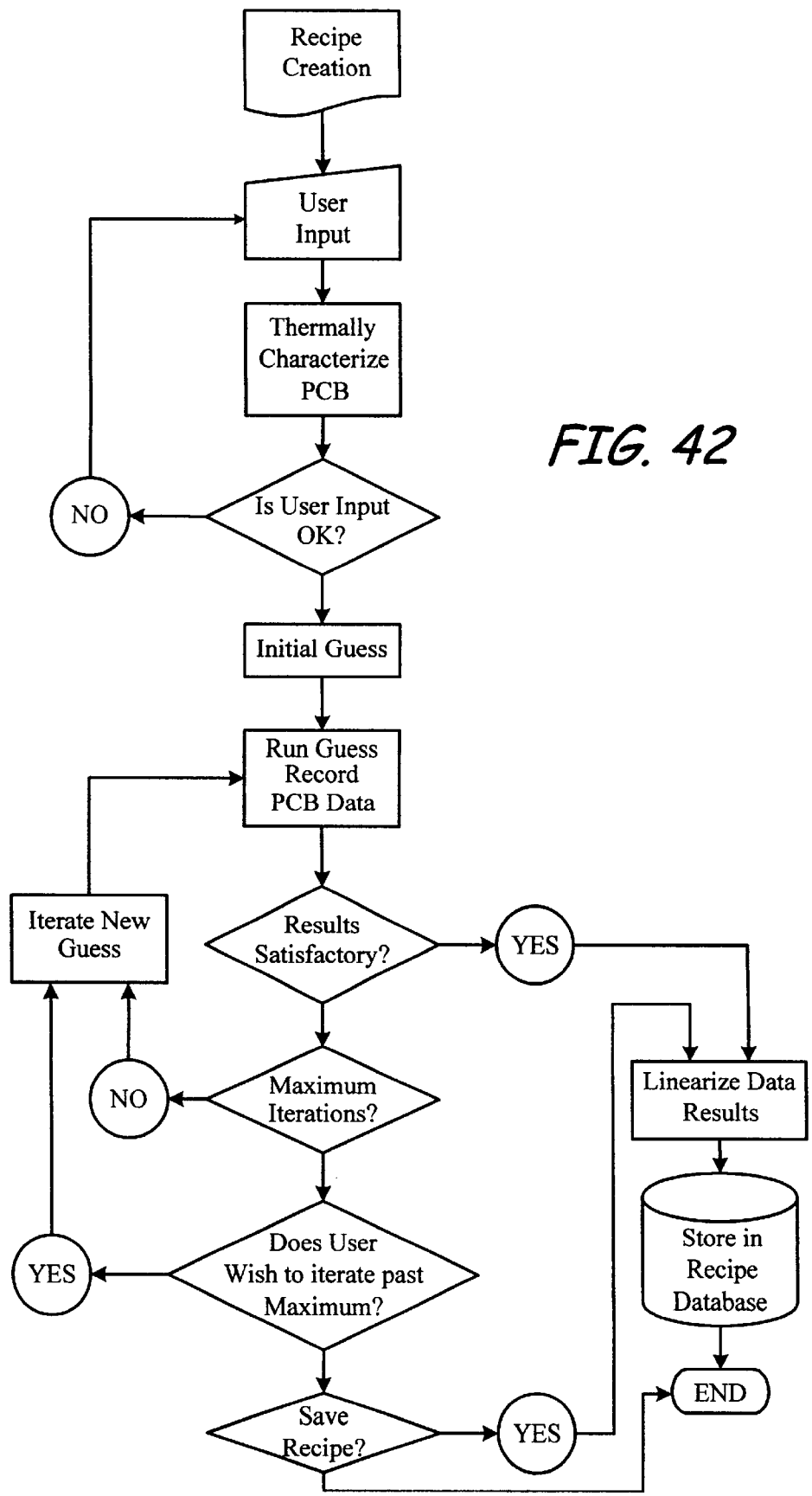
FIG. 42 shows a flow chart for obtaining a procedure to provide a selected temperature sequence for an item.

Although chambers 24 in oven 20 heat and cool fast enough to successfully control the temperature of PCBs 64 undergoing processing therein, there is a slight delay between when electrical power is applied to heaters such as that of FIG. 7 to cause heating of heating elements 49' in each to heat the passing convective fluid and when that hot fluid produced by that power reaches those PCBs. In the chamber design described above this delay is typically between 10 and 15 seconds. Because PCBs 64 for which the temperature needs to be controlled in undergoing processing can vary in mass and size wildly, this delay makes it difficult to create the appropriate temperature profile by using feedback of temperatures from a PCB 64 and closing the loop to adjust the power in real-time. Instead, the needed recipe to meet the desired temperature profile for a particular kind of PCB 64 is created in the manner shown in the flow chart in FIG. 42. Basically, the user enters the desired temperature profile for that kind of PCB, and thereafter, the oven control system takes over and completes the profiling automatically. A PCB of that kind is loaded into an oven chamber 24 and a preset parameter profile, including electrical power and fluid pressure parameters, is applied with respect to that chamber to thermally characterize that PCB through thermocouples mounted thereon at selected locations of primary temperature control interest that are also connected to the control system of oven 20 to supply temperature data thereto. From this information, the parameter profile needed to achieve the temperature profile desired for this PCB is predicted. After cooling PCB 64 to ambient conditions, that PCB is then subjected to the temperature profile resulting from applying the predicted parameter profile. The resulting thermocouple data is examined and the oven automatically adjusts the parameter profile to compensate for any deviation in the measured temperature profile from the desired temperature profile. The oven control system continues this iterative process until a maximum number of iterations are exceeded, or until the desired temperature profile is achieved.

Figure 43:
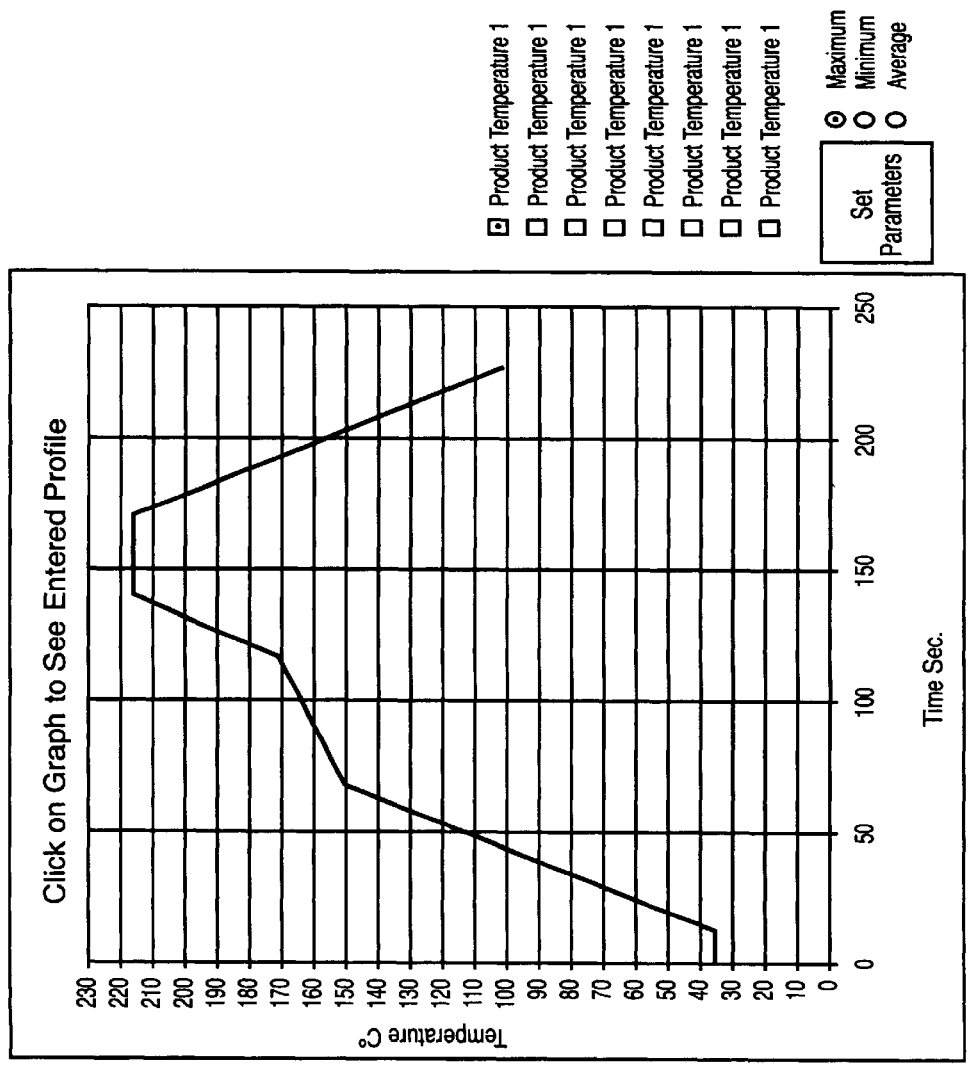
FIG. 43 shows a computer based graphical user's interface used in obtaining the procedure of FIG. 42.

A representation of the computer monitor graphical interface appears in FIG. 43 from which a user inputs into the oven computer the desired temperature profile by entering starting and ending temperatures, slopes, and length of time segments. In addition, the user provides which of up to 8 thermocouples are desired to be used to measure PCB temperatures for establishing the recipe to control the PCB temperature profile. The user determines which statistic to use to establish the recipe from: a) Maximum value of chosen thermocouples, b) Minimum of choice, or c) Average of choice. The user also specifies a maximum PCB temperature above which the oven will abort recipe creation as a safety precaution. Finally, the user selects data from the measured temperature profile of time above a selected temperature and time between two selected temperatures.

Figure 44A:
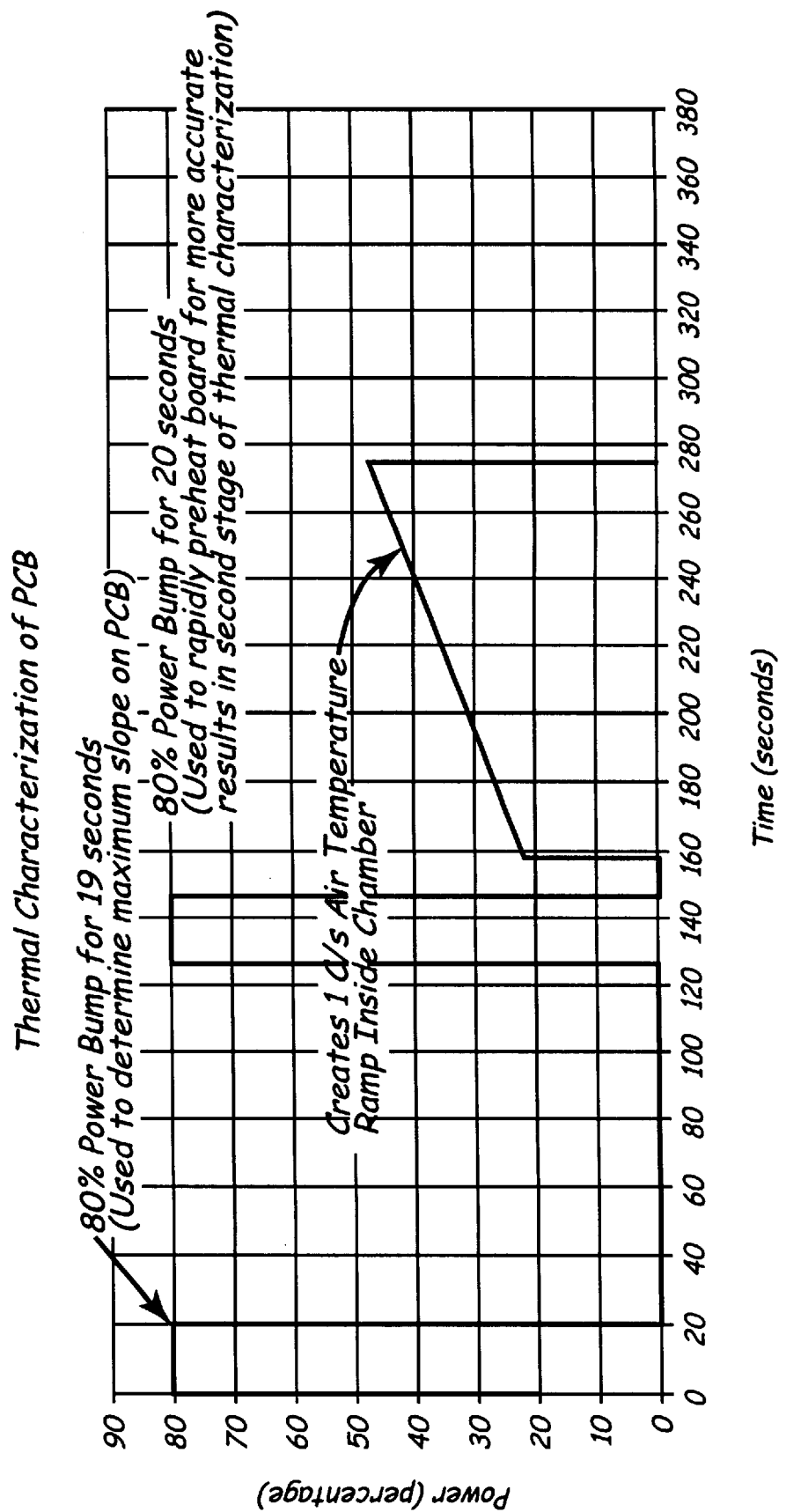
FIG. 44A shows a plot of a predetermined temperature sequence over time used in obtaining the procedure of FIG. 42.
Figure 44B:
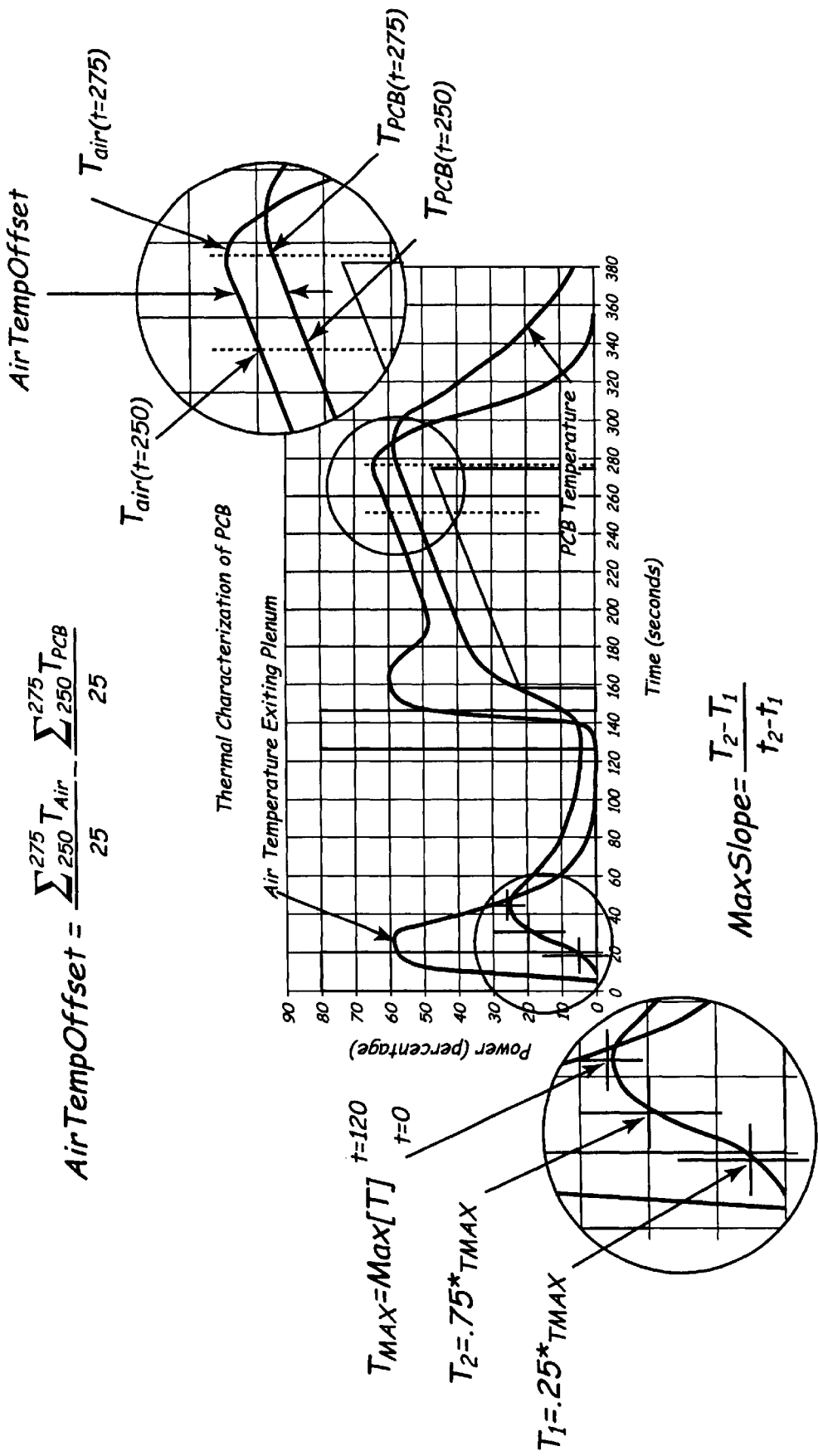
FIG. 44B shows a typical measured temperature response of an item subjected to the temperature sequence of FIG. 44A.
Figure 45:
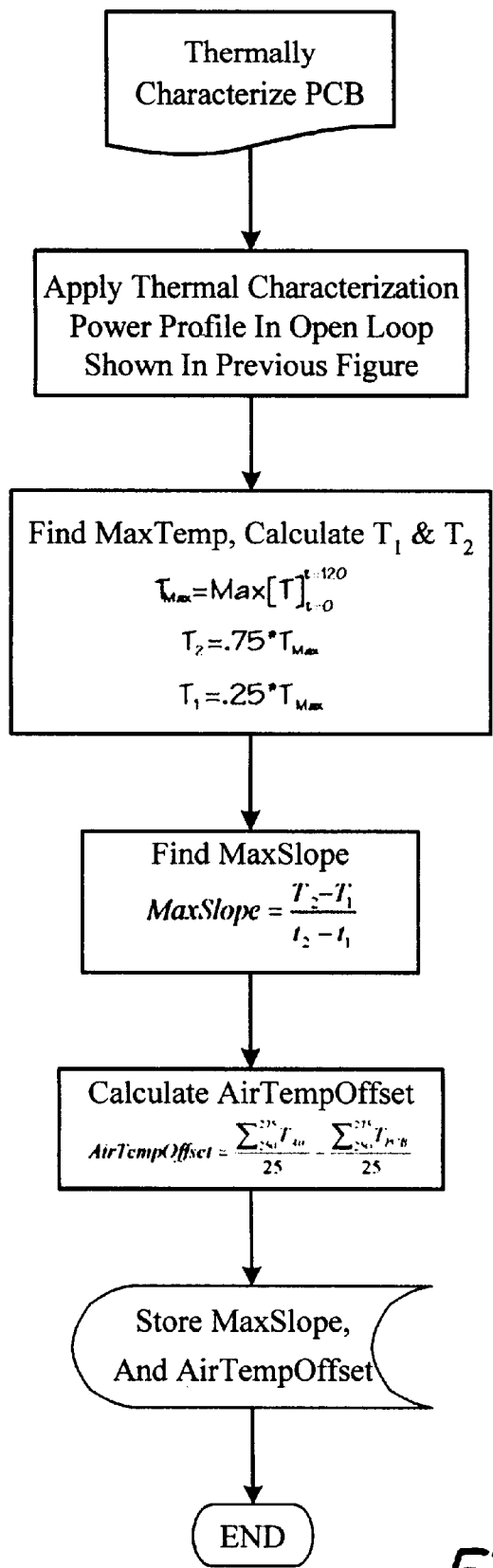
FIG. 45 shows a flow chart of series of undertakings for thermally characterizing an item to determine a temperature sequence to heat that item.
Figure 46:
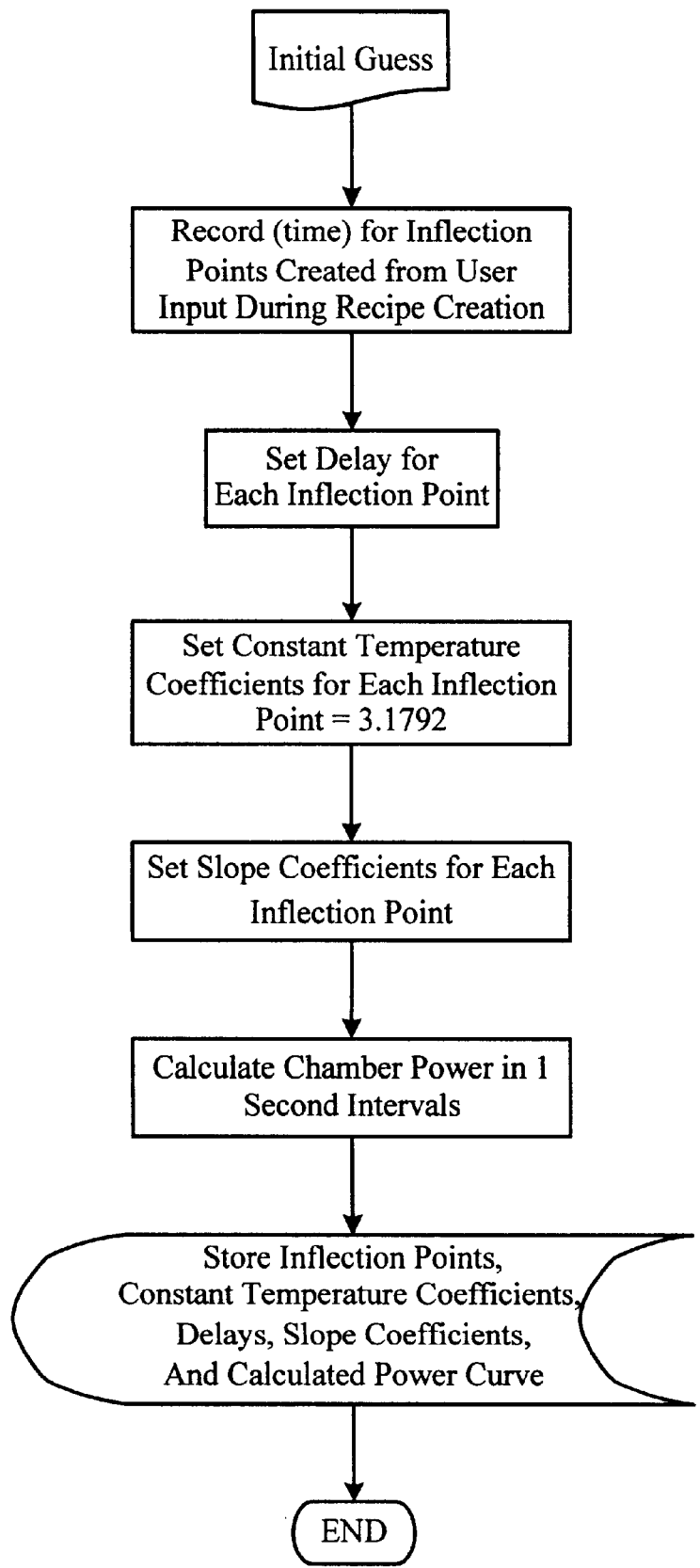
FIGS. 46 through 49 show flow charts of series of undertakings for determining a heater power sequence to provide a corresponding temperature sequence to heat an item.
Figure 47:
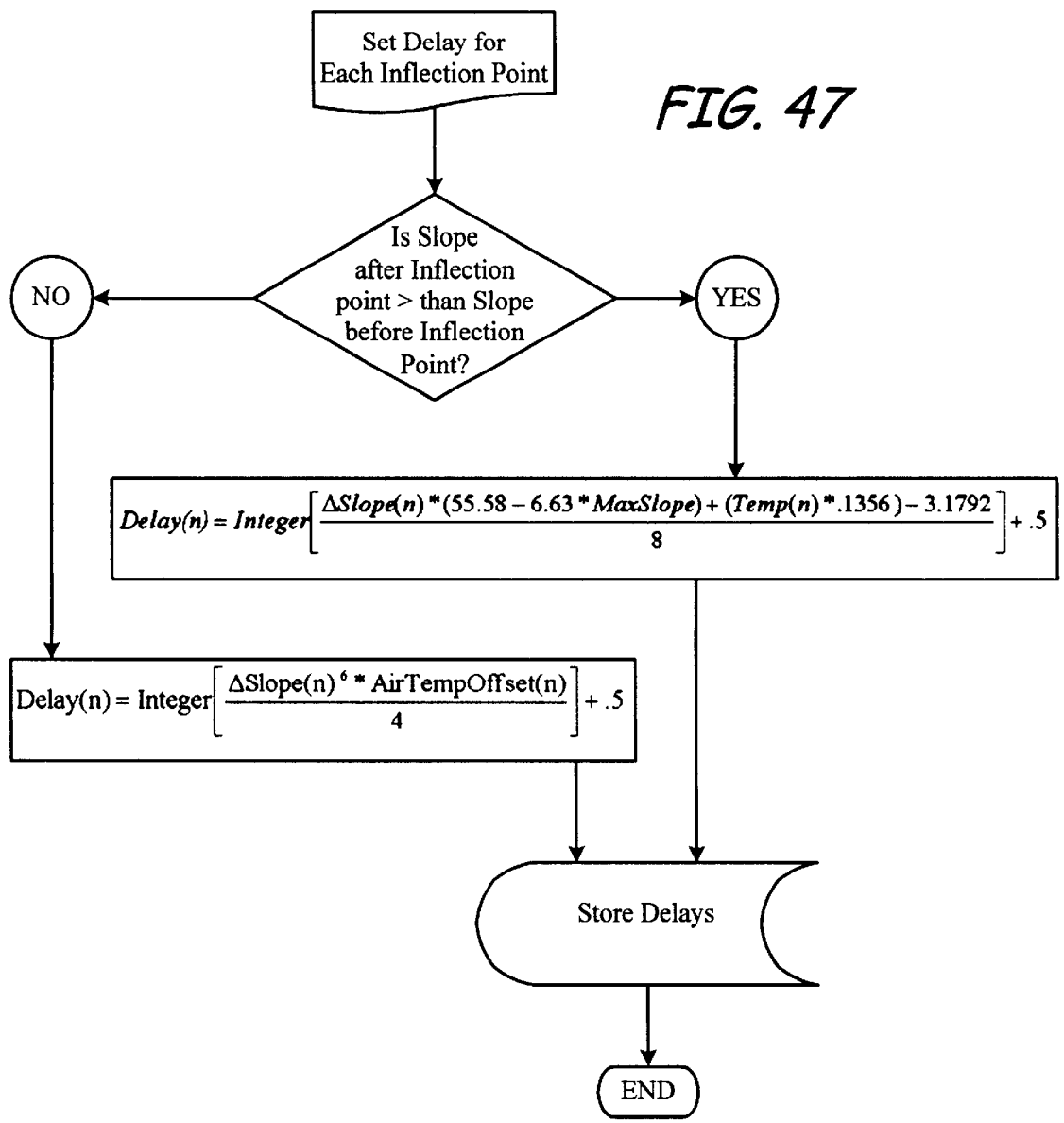
Figure 48:
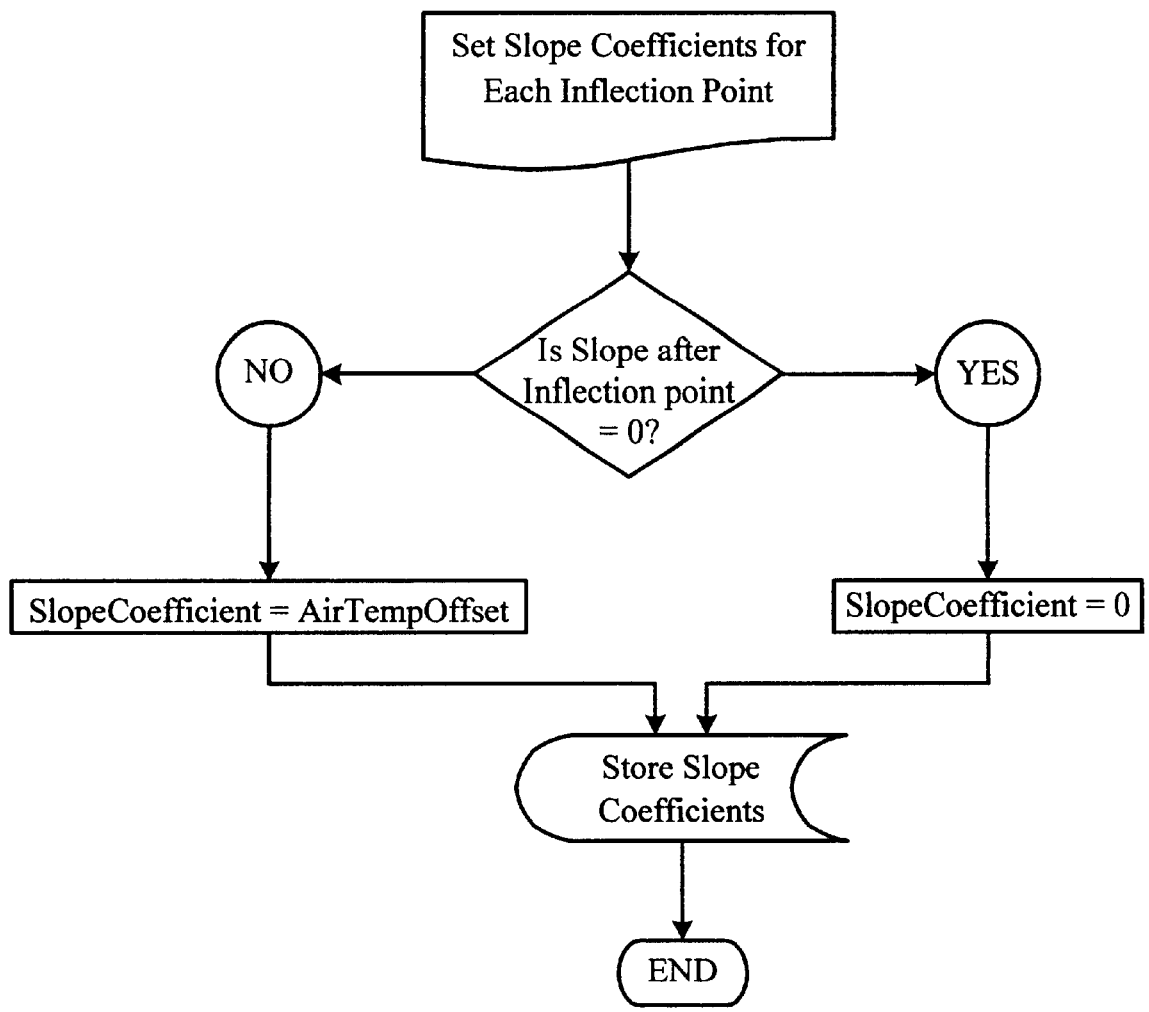
Figure 49:
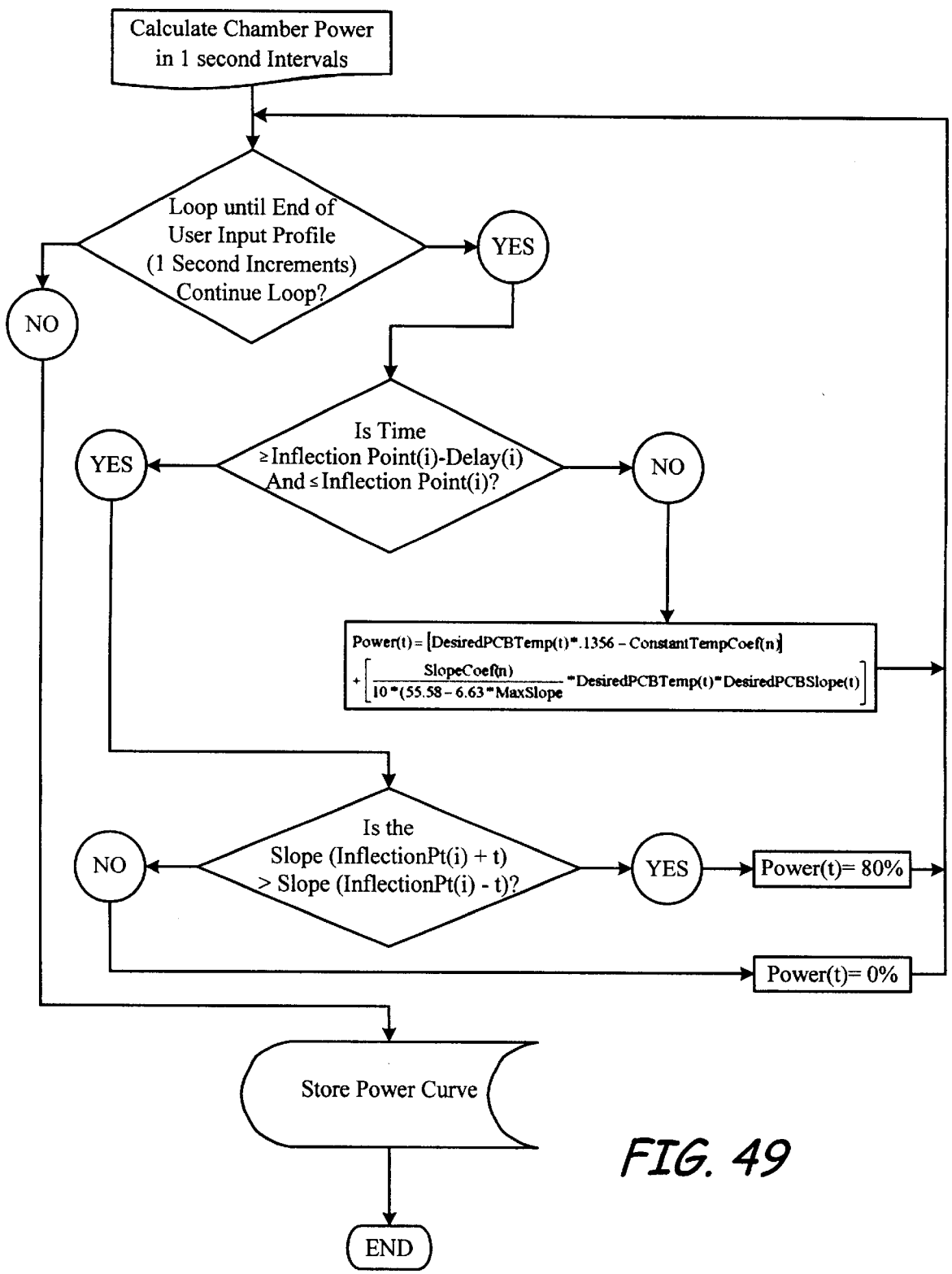

Essentially, the parameters that are applied during the subjecting of a PCB 64 to a temperature profile are the parameters determined in establishing the recipe as a function of the thermal characteristics of the PCB. After the desired temperature profile of the PCB is entered by the user through the graphical interface illustrated in FIG. 43, a sample board with thermocouples appropriately mounted thereon is loaded into a chamber 24 and a preset power vs. time curve shown in FIG. 44A is applied to that chamber while recording the temperature response of the PCB. A sample temperature response of a typical PCB is illustrated in FIG. 44B as a result of being subjected to heating following the sequence of FIG. 44A. From the response, the PCB can be characterized following the steps shown in the flow chart of FIG. 45. The MaxSlope, the maximum temperature change per time that the chamber can induce into the sample PCB, is calculated by linearizing the change in temperature from 25% to 75% of the peak temperature reached after the initial characterization bump.

$T_{MAX}$=Maximum $[T_{PCB}]$ from time 0 to 120 seconds $T_1 = 0.25 * T_{MAX}$ $T_2 = 0.75 * T_{MAX}$ And MaxSlope=$(T_2-T_1)(t_2-t_1)$ Another PCB characterization parameter, the AirTempOffset, is determined by heating the chamber at a continuous heating rate of 1° C./s thereby forcing a similar rate of temperature change in the PCB of about 1° C./s. Then the AirTempOffset is calculated by quantifying the temperature delta between the chamber air temperature and the sample board temperature. This is illustrated in FIG. 44B.

From these two parameters, the initial characterization of the board is complete, and chamber heating and responsiveness has previously been characterized based on theoretical design parameters previously discussed with empirical confirmation. To duplicate the temperature profile the user has inputted through the graphical interface in FIG. 43, control of the heating profile centers around controlling the temperature profile around the inflection points (where the desired slope is changing), and controlling the temperature profile during the constant slope portions.

Controlling the temperature profile of a board around inflection points of a temperature profile is a matter of controlling the amount of time the power is maximized (turned on 80% to later compensate for low line voltage) or minimized (turned off 0%) this delay is calculated different if the change in slope is increasing (delay is function of change in slope, the maximum slope board can be successfully heated at, and the desired temperature of the board) or if the change in slope is decreasing (delay is a function of the desired change in slope, and the temperature offset). Applying these parameters, an initial power curve is predicted surrounding the inflection points.

Controlling the temperature profile of a board during a constant slope portion of the profile can be thought of as the power required to maintain the board at an elevated temperature due to losses from the board and the chamber and the additional power required to increase the temperature of the board. The power required to maintain an elevated temperature is compensated for with a factor called the constant temperature coefficient and has been empirically determined to be 3.1792 for this configuration chamber as a good starting point. Increasing or decreasing the temperature of the board at a constant slope is simply a matter of controlling the temperature of the plenum at the same constant slope but at specified temperature, AirTempOffset, above (slope going up) or specified temperature below (slope going down) the board, this temperature offset is determined during the board characterization step as described above, the AirTempOffset actually changes slightly over a long portion of constant slope because the losses of the board change as it heats up so the AirTempOffset is converted to a slope coefficient during recipe iteration. The power during a constant slope portion of the temperature profile is a function of the desired temperature of the board, the losses to the plenum structure at that temperature in the plenum (constant temperature coefficient) and the rate of temperature change (slope coefficient) desired.

The initial prediction of the required power curve based on the above described variables is detailed in the flow charts in FIGS. 46 to 49. After applying the predicted parameters in open loop, the results are compared to the desired results, and a new power profile is iterated from the results.

Figure 50:
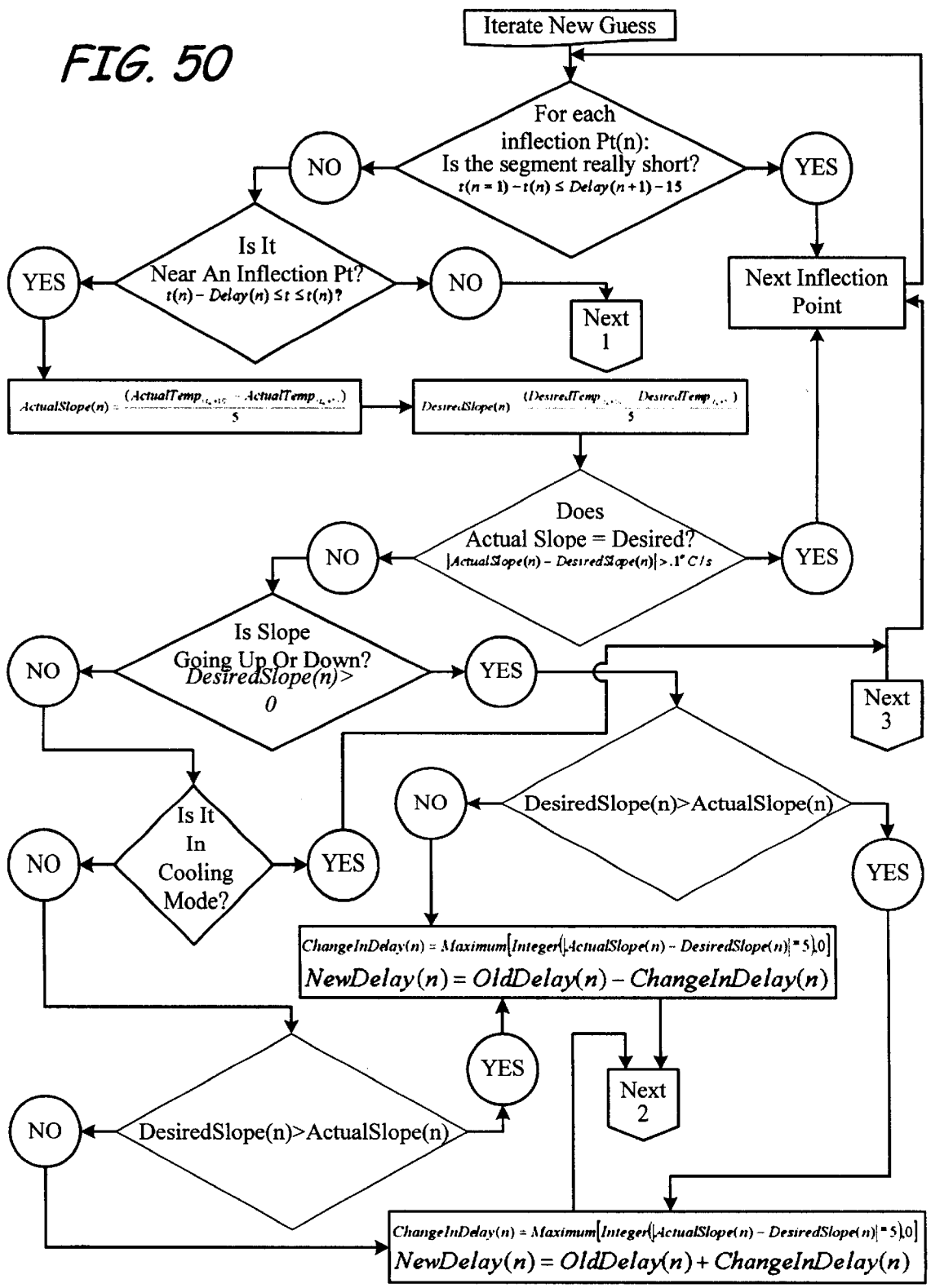
FIGS. 50, 51 and 52 show flow charts of series of undertakings for iteratively adjusting a previously determined heater power sequence to provide a corresponding temperature sequence to heat an item.
Figure 51:
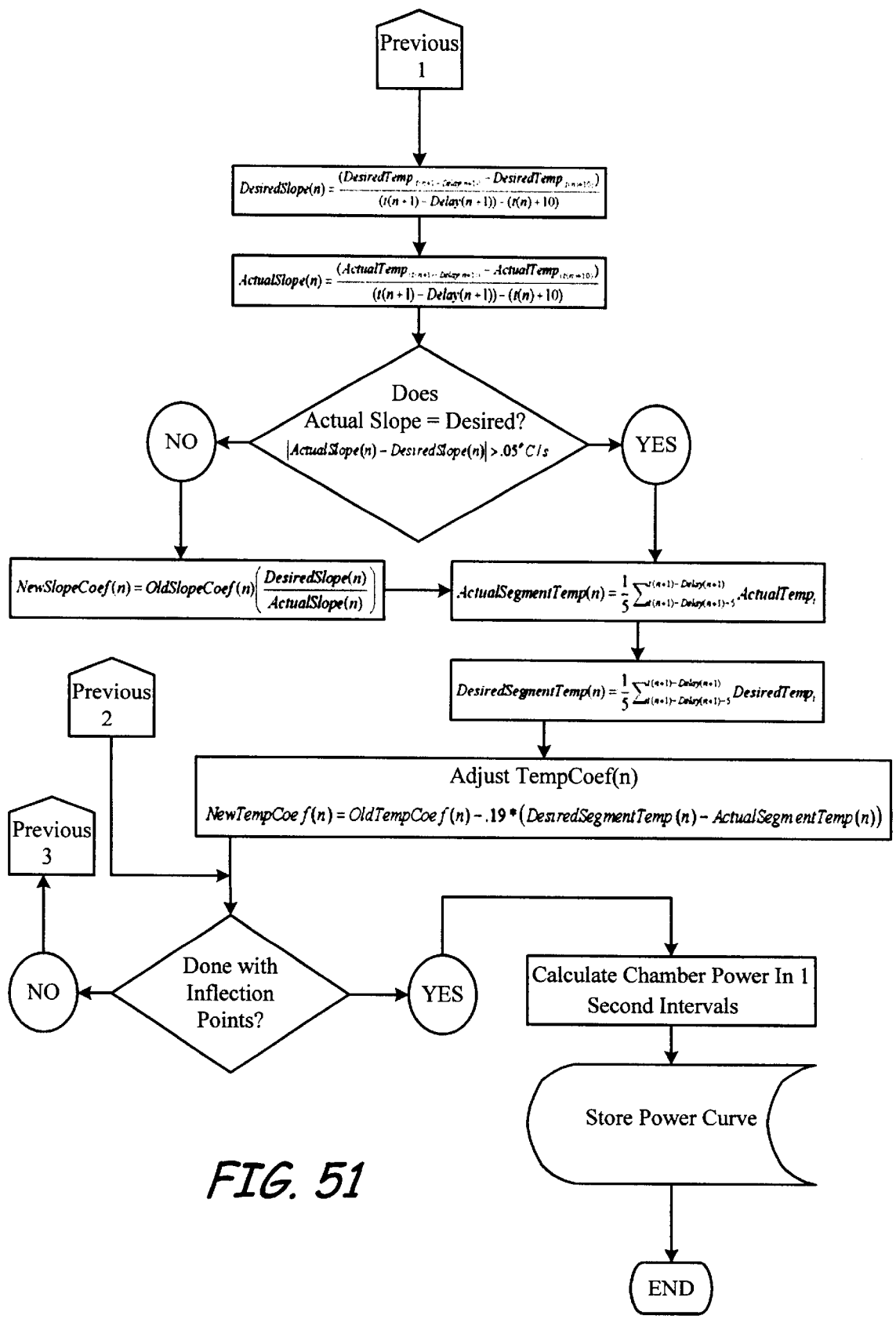
Figure 52:
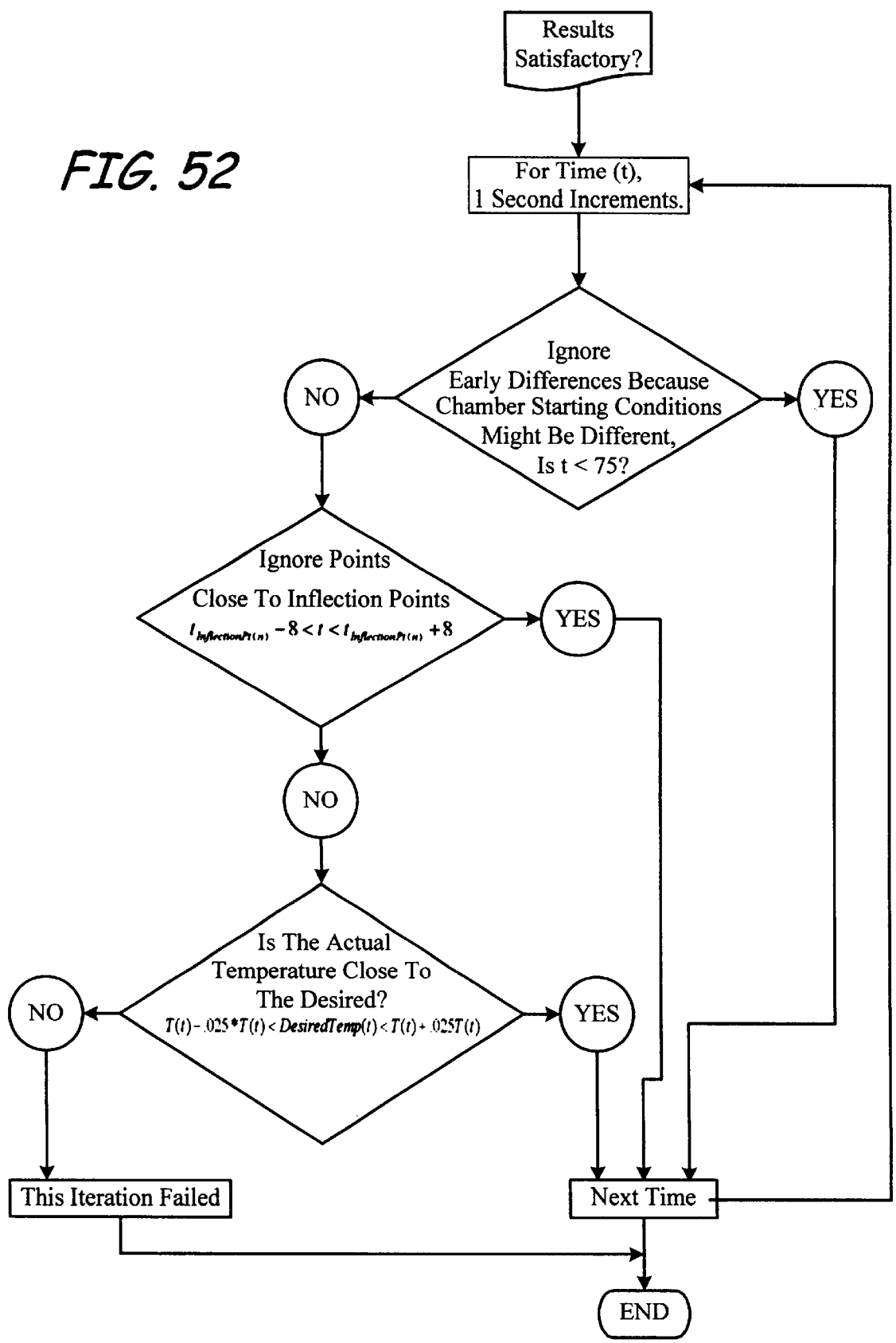

During iterative determination of the recipe, the delay time is empirically increased and decreased to get the desired results. Likewise the slope coefficient is adjusted if the desired slope does not match the actual, and the control temperature coefficient is adjusted if the slope is correct, but the board is above or below the desired temperature during that particular segment of the temperature profile. The steps in doing so and the equations governing the adjustments are appropriately illustrated in the flow charts of FIGS. 50, 51 and 52. During iterative determination of the recipe, the parameters are adjusted and iterations continue until satisfactory results are obtained, or until the maximum number of iterations selected by the user has been exceeded.

Figure 53:
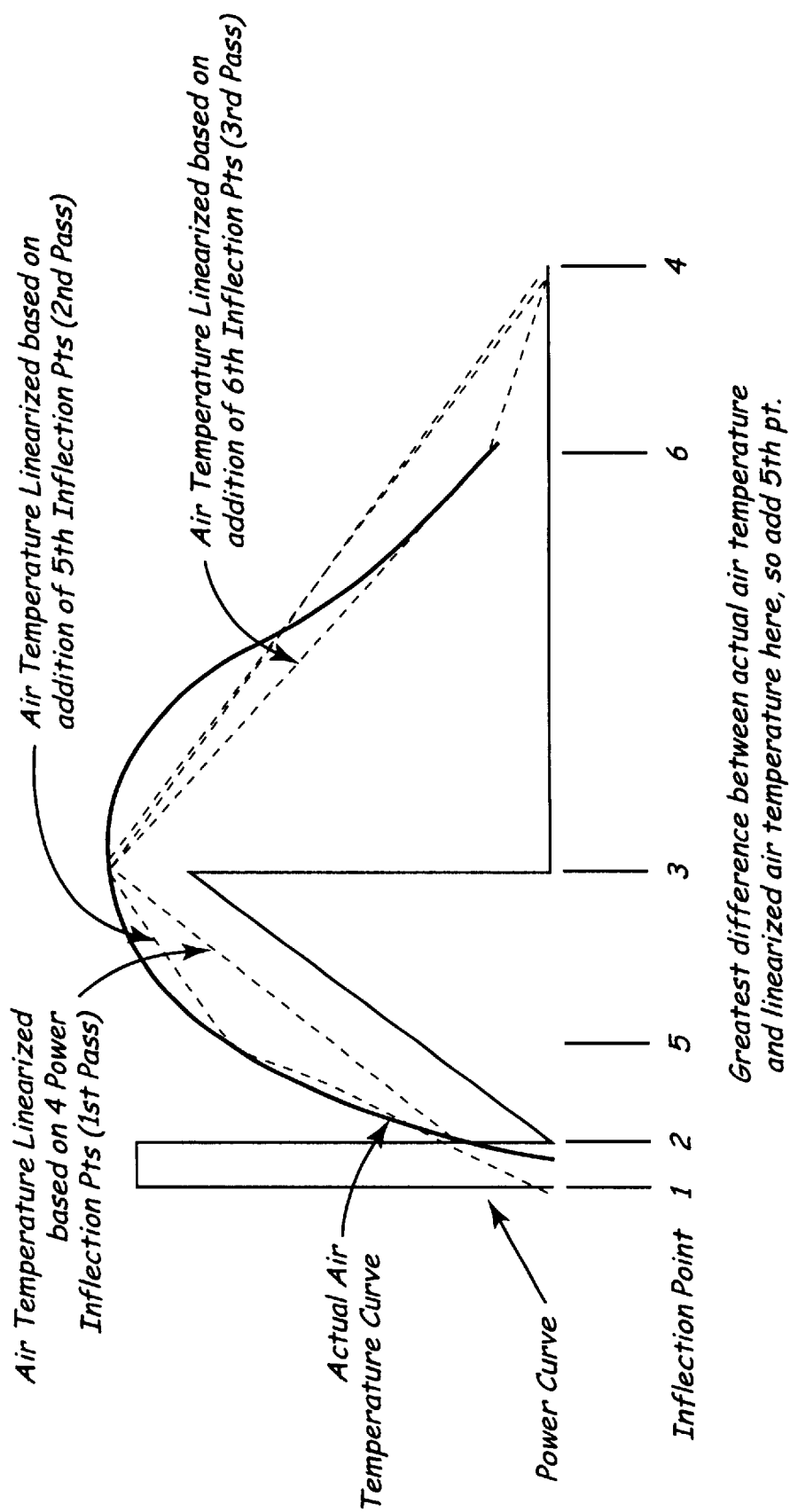
FIG. 53 shows a plot and graphical representation of a data linearizing process.
Figure 54:
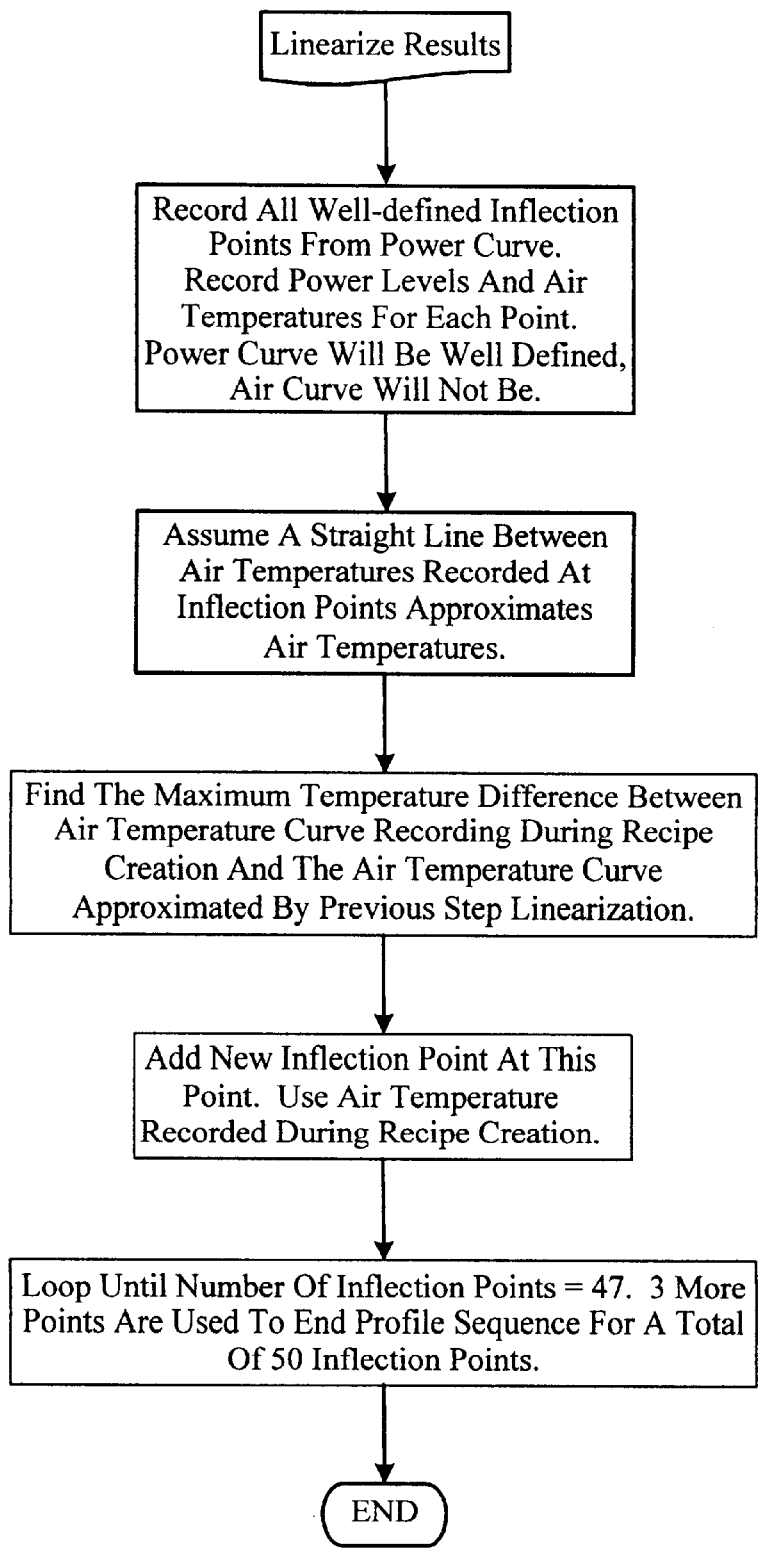
FIG. 54 shows a flow chart of series of undertakings for linearizing data.

During the creation of a recipe, temperature information feedback from chamber 24 is recorded every second. When satisfactory results are obtained, the electrical power profile to create the desired board temperature profile and the resulting response of the chamber is recorded and stored as a baseline for reproducing the results during future PCB production. Because the of unwieldy nature of a large database to be transferred to the PLC, and from one oven system 20 to another, the database is compressed by linearizing the data as indicated in the graph of FIG. 53 by following the process set out in the flow chart of FIG. 54.

Figure 55:
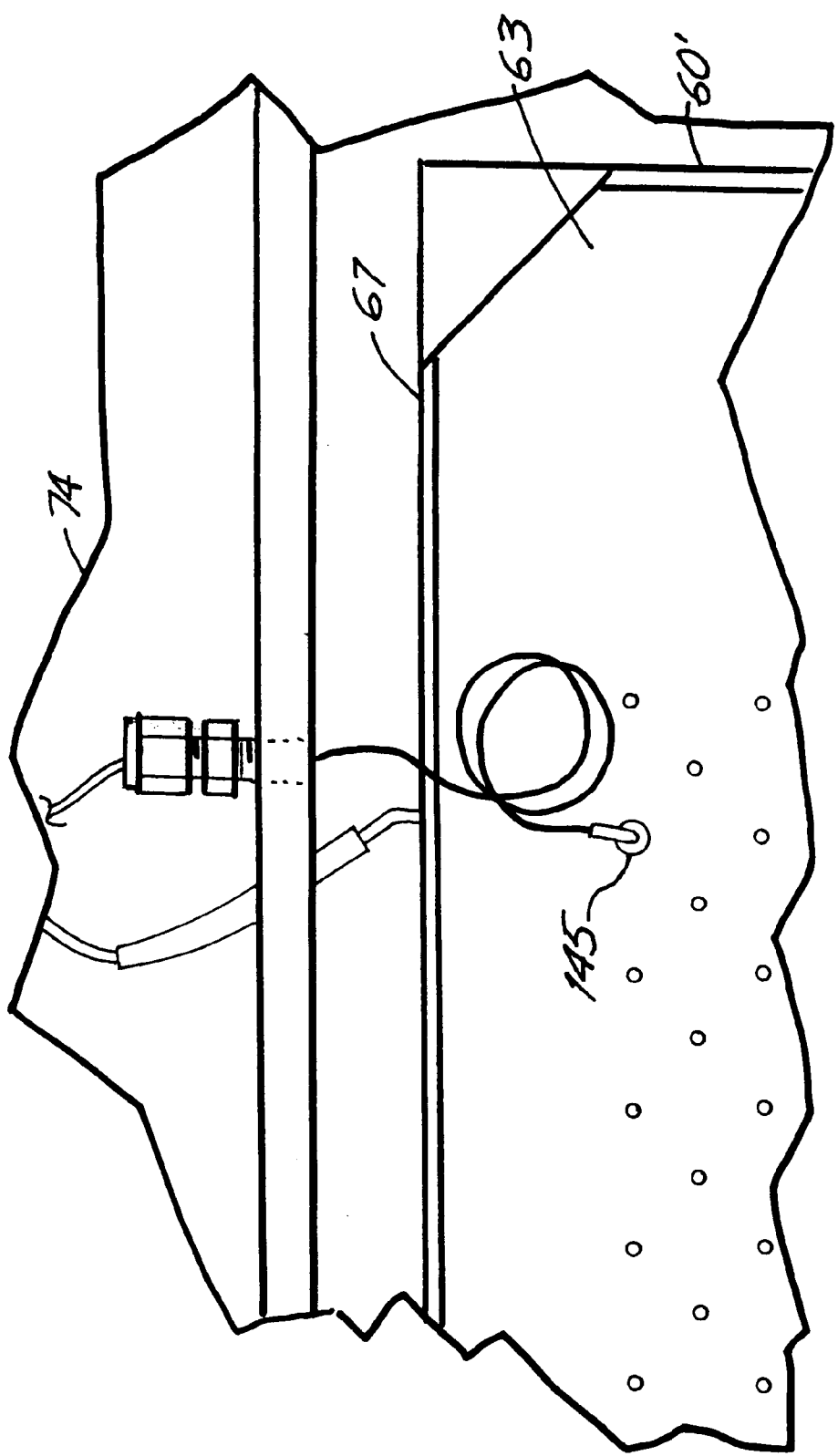
FIG. 55 shows a fragmentary view of FIG. 34.

The parameters that are recorded each second and then linearized during recipe creation are the following:

1.) % electrical power applied to upper and lower heating elements 49' in the heaters.
2.) Output air temperature from plenums 60', top and bottom, via K-type thermocouples, 145, mounted on the surface of plenums 60' as seen for a lower plenum 60' in FIG. 55.
3.) Pressure in plenums 60', top and bottom, via pressure transducers mounted on exit foils 63.
4.) Input electrical power line voltage.
5.) Position of fluid flow valve in the heater of FIG. 7 (on choosing the related cooling method described in connection with that heater or otherwise the on or off status of a separate cooling fan), based on magnetic positioning sensor on the air cylinder operating the valve.

This feedback determines whether the chamber is in heating or cooling mode. Power is not applied to the heaters unless air is flowing through them.

Figure 56:
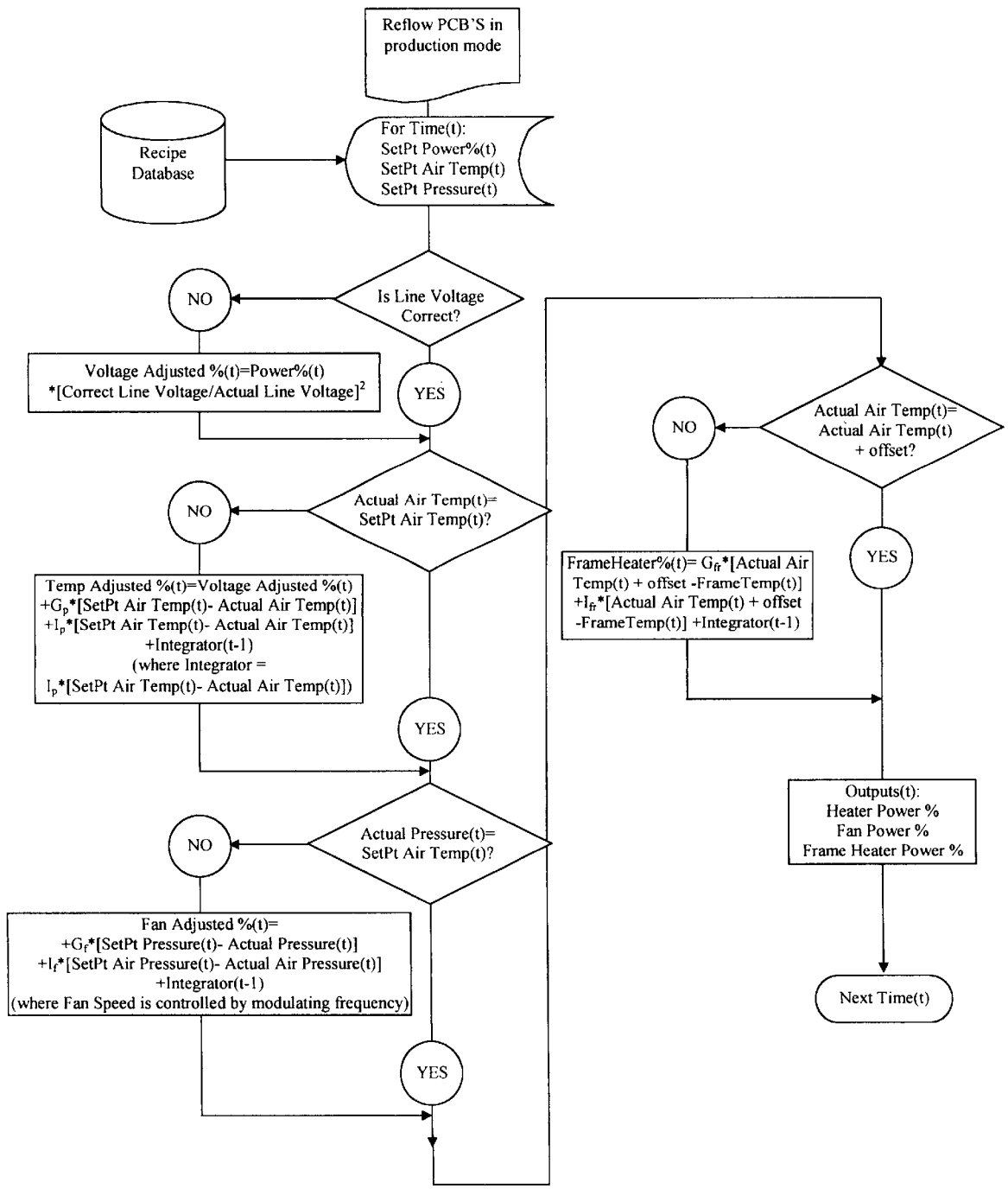
FIG. 56 shows a flow chart of series of undertakings for controlling the power to heating elements.

Once the recipe has been created to provide a desired temperature profile, the temperature profile to which PCBs 64 of that kind are subjected in an oven chamber 24 must be consistent from PCB to PCB regardless of varying starting conditions. During the processing of PCBs 64 received from preceding in-line conveyors for finished board production, when no feedback of temperatures from PCBs undergoing processing are available, the primary outputs that need to be controlled to control the PCB temperature profile are the velocity of the impingement jets (pressure inside plenum controlled by varying the fan speed of heater fan 46) and temperature of the impingement jets (monitored by thermocouple held in the same plane as exit foils 63 and varied by adjusting electrical power to heating elements 49' of the heaters). By far the dominant factor for controlling the temperature profile of a board 64 is the electrical power to the heater heating elements so during production processing of boards, the heating element electrical power sequence curve over the heating duration determined and recorded during recipe creation is reproduced to serve as source of operation direction commands in a feedback control system provided in the oven control system for controlling the delivery of electric power in this duration to the heating elements of the heaters by tracking these commands, and which power delivery is adjusted minutely as needed based on feedback information of deviations in the temperature of the impingement jets and the electrical power line voltage during chamber operations from expected values therefor set out in the recipe. This closed loop feedback arrangement is illustrated in the flow chart of FIG. 56 and specifically, to consistently duplicate the process repeatedly in a chamber 24, the electrical power to the heater heating elements is constantly adjusted using the following formula (for the convective fluid being air):

$$Power\ \% = RecipePower(t) * \left[\frac{ExpectedLineVoltage}{ActualLineVoltage}\right]^2 +$$
$$G * (RecipeAirTemp - ActualAirTemp) +$$
$$I * \int (RecipeAirTemp - ActualAirTemp).$$

The coefficients G and I are values that are factory set so that the actual air temperature tracks the desired temperature as close as possible. Adjustments are also made in real-time for variations in input line voltage. Airflow is controlled by adjusting the fan speed by varying the frequency to the fan motor based on pressure feedback from inside the plenum.

The expansion of frame 67, because it is heated, keeps the foil in tension during profiling. The frame temperature required to keep exit foil 63 flat is a function of the foil temperature. Because the foil is such low mass, the output air temperature is a good representative of the foil temperature. The setpoint temperature of frame 67 is an elevated offset temperature of the measured air temperature exiting the foil. Frame 67 is controlled at a factory-preset offset elevated above the measured air temperature exiting foils 63 using a standard PID closed loop control.

The pressure in plenums 60' is a function of the flow rate into chamber 24 containing them, which is controlled by controlling the fan speed. This is also recorded and stored in the recipe. The pressure is measured with a pressure transducer and the fan speed is adjusted by varying the frequency on the voltage input into the electric motor for fan 46.

Also recorded and stored in the recipe is whether chamber 24 is in the heating or cooling mode. This is the valve in the heater of FIG. 7 equipped with a duct divider to permit fan 46 therein to be used as a cooling fan, as described above, that is pneumatically controlled. The valve is a two position valve that is either positioned in full cooling or full heating position. The valve is such as to be impossible to be held at some intermediate position. Magnetic reed switches sense whether the valve is moved into the correct position to validate the position and detect fault positions based on low compressed air pressure.

During production, adjusting the electric power to the heater elements 49' in the heater of FIG. 7 constantly controls the temperature exiting plenum 60'. If the air exceeds a maximum safety temperature, the PLC attempts to shut off the power to all the heaters. An additional K-type thermocouple monitoring air temperature inside chamber monitors the air temperature midway between the upper and lower air plenum and monitors for a maximum safety temperature that is greater than the temperature controlled via the PLC. If the PLC is unable to shut down power to the heaters, this additional thermocouple is connected to the emergency stop circuitry which will shut electrical power off entirely to oven system 20. A third safety circuit exists. A thermostat is mounted external to each chamber frame 74. This is also connected to the emergency stop circuitry which will shut power off entirely to oven system 20 if the chamber frame exceeds a safe temperature.

Not only is consistency important regardless of the starting condition of an oven chamber 24, it is also important that the profile is repeatable between all of oven chambers 24. Each chamber is calibrated to a "gold" printed circuit board and "gold" profile. The gold board is loaded into the chamber 24 to be calibrated. This chamber is then warmed up to 220° C. After 20 minutes the temperatures of the chamber air and gold board are compared. The difference between the air and board temperatures is entered as a temperature offset at 220° C. for this chamber serial number. The temperature offset at 20° C. is 0. Therefore the temperature offset at any temperature can be calculated by $$TemperatureOffset_T = \left(\frac{MeasuredTemp - 20}{200}\right) * TemperatureOffset_{T-220}.$$

The temperature displayed by the software on the computer monitor screen and used in calculations becomes the measured temperature+the air temperature offset.

A power offset is also employed to ensure process repeatability between chambers 24. To determine the power offset calibration number, the "gold" board is loaded into a chamber 24 and processed in closed loop with a "gold" profile. The peak temperature the "gold" board reaches is compared to a standard. A small power offset is added to every point on the profile until the peak temperature on the board matches the standard. Any power profile run in the chamber 24 is adjusted by adding the power offset. Both calibration tests are run twice to confirm the calibration numbers are correct. These are stored in the PLC associated with the chamber, and recorded at the factory.

Thin stainless steel foils as the material to construct plenums 60' for oven chambers 24 meets the requirements of low thermal mass, high mechanical strength, and resistance to fatigue after undergoing multiple thermal cycles. However, manufacturing structures with complicated shapes using such materials poses difficult manufacturing problems. The greatest of these is the tendency of the already thin stainless steel to stretch and tear during drawing and forming operations. A forming operation that allows "free-flow" of the material sheet, i.e. unrestricted motion of a stainless steel sheet parallel to the local direction of extent of the sheet as it is formed into the desired shapes, followed by a trim operation was necessary.

A development male and female die set, made of aluminum, provided the basis for forming the initially flat stainless steel sheets into the desired shapes, and were given a high degree of polish to allow the stainless foil to flow freely during forming operations. Clearances greater than ten times the material segments being formed were necessary as well to allow the material to flow freely and to prevent significant cold working of the stainless which would cause hardening and cracking. In areas of the die set where there wasn't a significant amount of extra material, radii of 0.125 in. were formed so the sheet material could easily flow. In other areas where the sheet material needed to be compressed into a double thickness to prevent drawing, radii of 0.375 in. were required. As a result, forming all six finger ducts and feeder duct for oven chamber plenums from a single sheet of stainless steel foil required either too large a radius between a finger duct and the feeder duct such that the pressure drop along the feeder duct would not be uniform, or an unacceptable risk of drawing the material to the point of tearing. Thus, the finger ducts and the feeder duct were manufactured separately.

Permanent tooling was machined upon completion of the development of the die set and the forming procedures. The female portion of the die set was manufactured out of heat-treated tool steel. This material was chosen because after the polishing operation it would not wear or scratch easily. The male portion of the die was made out of 60–80 durometer rubber. During the forming operation, the rubber limited maximum compression force and allowed the stainless steel sheet material to freely flow. Crinkles in the foil at the ends of the feeder duct and fingers were acceptable because the geometry was consistent.

Following the forming of plenum stainless steel components, they are combined to complete plenum and chamber assemblies. Spot welding provides repeatable results by controlling the current and length of the electrical heating pulse. A pizza cutter's spot welding tip provides a uniform row of spot welds along a seam with good consistent results.

Adhesives have difficulty in forming a strong mechanical bond to shiny stainless steel foil which is exacerbated by the elevated operating temperatures and multiple heating and cooling cycles undergone by plenums 60' during PCB processing. However, adhesives were used with mechanical tabs connecting frame heater 70 to plenum frame 67 that were added to physically hold the cable frame heater in place. Ceramic adhesives loaded with 304SS powder matched the coefficient of thermal expansion of both plenum frame 67 and cable heater 70. For consistent results, it was necessary to roughen the surface of the frame through sand blasting it at low-pressure. These adhesives provided a uniform conduction path to frame 67 and prevented localized hotspots on heater 70, which could cause premature heater failure.

Tooling is used to hold finger ducts 62 and feeder duct 61 in place during the spot welding of them to middle plenum foil 66. Next, the plenum frame 67 halves sandwiched around middle foil 66 are welded together. The thicker material of frame 67, with an additional material in-between, requires more current for a longer dwell time to successfully spot weld these parts together. The additional heat generated during this stage provides the greatest risk of possibly warping parts during this process. Spot welds, added on alternating sides, while moving around the perimeter of plenum frame 67 minimizes this effect and ensures that the frame remains flat. Back foil 65 is then added by spot welding to create the back pressure plenum. Lastly, exit foil 63 is pulled taut over plenum frame 67 to maintain flatness during the last spot welding process affixing it to the rest of the plenum.

Although the present invention has been described with reference to preferred embodiments, workers skilled in the art will recognize that changes may be made in form and detail without departing from the spirit and scope of the invention.

What is claimed is:

1. An oven compartment for subjecting items to a selected heating sequence, said oven compartment comprising:
    a compartment container having a transport opening therein to permit selectively entering said items into portions of interior regions thereof and a first heat flow opening therein to permit forcing a heating fluid into other portions of said interior regions thereof; and
    a first plenum structure located in said interior regions of said compartment container having a perforated surface adjacent to which an entered item from said transport opening can be positioned with there being a first heating duct extending between said first heat flow opening and said first plenum structure to allow providing heating fluid at locations near said perforated surface thereof, said first plenum structure having a material mass and a specific heat allowing a rate of change of temperature thereof exceeding one degree Centigrade per second for a selected maximum temperature differential between heating fluid and any said entered items positioned adjacent to said perforated surface at selected heating fluid pressures at said perforated surface.

2. The device of claim 1 wherein said material mass of said first plenum structure is formed of stainless steel and said perforated surface is a surface of an exit wall in said first plenum structure having a thickness less than 0.010 in.

3. The device of claim 1 wherein said perforated surface is a surface of an exit wall in said first plenum structure held in a surrounding first plenum structure frame at one end of that frame and spaced apart from a perforated center wall also held in said frame with a back wall further held in that frame on an opposite side of said center wall and spaced apart therefrom.

4. The device of claim 3 further comprising a feeder duct mounted on said perforated center wall having said first heating duct connected to an end thereof so as to be capable of receiving heating fluid therefrom and a plurality of extension ducts mounted on said perforated center wall connected to, and extending away at an angle from, said feeder duct so as to each be capable of receiving heating fluid therefrom.

5. The device of claim 3 wherein said compartment container further has a cooling flow opening therein with there being a cooling duct extending between said cooling flow opening and said first plenum structure, and connected thereto so as to allow providing cooling fluid between said back wall and said perforated center wall.

6. The device of claim 1 wherein said perforated surface is a surface of an exit wall in said first plenum structure held in a surrounding first plenum structure frame at one end of that frame and spaced apart from a back wall also held in said frame.

7. The device of claim 6 further comprising a feeder duct mounted on said perforated exit wall having said first heating duct connected to an end thereof so as to be capable of receiving heating fluid therefrom and a plurality of extension ducts mounted on said perforated exit wall connected to, and extending away at an angle from, said feeder duct so as to each be capable of receiving heating fluid therefrom.

8. The device of claim 1 wherein said compartment container has a compartment conveyor therein extending between said transport opening and a location at which an entered item is adjacent to said perforated surface, said compartment conveyor having a moveable bead chain for carrying an entered item in being transported from said transport opening to being adjacent to said perforated surface.

9. The device of claim 1 further comprising an oven in which said oven compartment is supported, said oven having an elevator therein containing two conveyors adjacent to one another on sides thereof oriented substantially perpendicular to directions of travel permitted to said elevator.

10. The device of claim 1 wherein said allowed rate of change of temperature exceeds two degrees Centigrade per second.

11. The device of claim 1 wherein said allowed rate of change of temperature exceeds three degrees Centigrade per second.

12. The device of claim 1 wherein said allowed rate of change of temperature exceeds four degrees Centigrade per second.

13. The device of claim 1 wherein said compartment container further has a cooling flow opening therein with there being a cooling duct extending between said cooling flow opening and said first plenum structure to allow providing cooling fluid at locations near said perforated surface thereof.

14. The device of claim 1 wherein said compartment container further has a second heat flow opening therein, and further comprising a second plenum structure located in said interior regions of said compartment container having a perforated surface adjacent to which an entered item from said transport opening can also be concurrently positioned with there being a second heating duct extending between said second heat flow opening and said second plenum structure to allow providing heating fluid at locations near said perforated surface thereof, said second plenum structure having a material mass and a specific heat allowing a rate of change of temperature thereof exceeding one degree Centigrade per second for a selected maximum temperature differential between heating fluid and any said entered items positioned adjacent to said perforated surface at selected heating fluid pressures at said perforated surface.

15. A method for heating items entered into a compartment container of an oven compartment in an oven having a first plenum structure with a perforated surface through which a heating fluid previously heated by a heater, to an extent determined by operating a heater control, is directed onto such items, said method comprising:

obtaining a control representation of a selected set of values for said heater control versus time over a selected heating duration based on a acquiring and maintaining a fixed temperature difference between said first plenum structure and temperatures specified in a heating specification for a selected kind of item to be heated, and directing heating fluid for said heating duration onto an item entered into said compartment container to be positioned adjacent said perforated surface of said first plenum structure which heating fluid has been previously heated by said heater through operating said heater control to follow said control representation as selectively further adjusted based on measurements of heating fluid near said perforated surface performed during said heating duration.

16. The method of claim 15 wherein said obtaining of a control representation of a selected set of values for said heater control versus time over a selected heating duration is accomplished by estimating an initial representation of a selected set of values for said heater control versus time over a selected heating duration, directing heating fluid for said heating duration onto a test item entered into said compartment container to be positioned adjacent said perforated surface of said first plenum structure which heating fluid has been previously heated by said heater through operating said heater control to follow said estimated representation, and measuring temperatures of locations on said test item and of heating fluid near said perforated surface during said heating duration, and reestimating an iterated representation of a selected set of values for said heater control versus time over a selected heating duration based on results of said measuring.

17. The method of claim 15 wherein said directing of heating fluid for said heating duration onto an item entered into said compartment container positioned adjacent said perforated surface of said first plenum structure is accomplished by operating said heater control near a point in time during said heating duration where increasing temperature is specified in said heating specification at values to cause substantially that maximum rate of heating of heating fluid of which said heater is capable followed by operating said heater control at values to cause rates of heating of heating fluid to equal or exceed rates of temperature change immediately following said point in time specified in said heating specification.

18. The method of claim 15 wherein said substantially fixed temperature difference is one hundred degrees Centigrade or less.

* * * * *

UNITED STATES PATENT AND TRADEMARK OFFICE
CERTIFICATE OF CORRECTION

PATENT NO.    : 6,533,577 B2
DATED         : March 18, 2003
INVENTOR(S)   : Bradley C. Anderson et al.

It is certified that error appears in the above-identified patent and that said Letters Patent is hereby corrected as shown below:

Column 7,
Line 40, delete "modem", insert -- modern --

Column 17,
Line 57, delete "wanner", insert -- warmer --

Signed and Sealed this

Twenty-ninth Day of July, 2003

JAMES E. ROGAN
*Director of the United States Patent and Trademark Office*